United States Patent
Kobayashi

(10) Patent No.: US 7,681,111 B2
(45) Date of Patent: Mar. 16, 2010

(54) DISK ARRAY DEVICE, PARITY DATA GENERATING CIRCUIT FOR RAID AND GALOIS FIELD MULTIPLYING CIRCUIT

(75) Inventor: Eiji Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/190,306

(22) Filed: Aug. 12, 2008

(65) Prior Publication Data

US 2009/0024879 A1 Jan. 22, 2009

Related U.S. Application Data

(62) Division of application No. 10/989,439, filed on Nov. 17, 2004, now Pat. No. 7,437,658.

(30) Foreign Application Priority Data

Nov. 17, 2003 (JP) ............................. 2003-386997

(51) Int. Cl.
 *G06F 11/00* (2006.01)
(52) U.S. Cl. ........................ 714/801; 714/781; 714/819; 714/763
(58) Field of Classification Search ................. 714/763, 714/781, 799, 819
 See application file for complete search history.

(56) References Cited

U.S. PATENT DOCUMENTS

| | | | |
|---|---|---|---|
| 5,499,253 A | 3/1996 | Lary | |
| 6,148,430 A | 11/2000 | Weng | |
| 6,523,054 B1 | 2/2003 | Kamijo | |
| 7,003,715 B1 | 2/2006 | Thurston | |
| 7,133,889 B2 * | 11/2006 | Parthasarathy et al. | 708/492 |
| 2004/0078643 A1 * | 4/2004 | Ghosh et al. | 714/6 |

FOREIGN PATENT DOCUMENTS

| | | |
|---|---|---|
| JP | 9-218877 | 8/1997 |
| JP | 2000-259359 | 9/2000 |

OTHER PUBLICATIONS

Plank, "A Tutorial on Reed-Solomon Coding for Fault-Tolerance in RAID-like Systems", Software-Practice and Experience, John Wiley & Sons, Ltd., USA, vol. 27(9), Sep. 1997, pp. 995-1012.

* cited by examiner

*Primary Examiner*—Esaw T Abraham
(74) *Attorney, Agent, or Firm*—Young & Thompson

(57) ABSTRACT

In this parity data generating circuit, a Galois field multiplying calculation is realized by performing data conversion by index table information generated from a Galois field multiplying table so that data for RAID6 are generated. A table check circuit inspects nonconformity of the index table information in advance by using results in which the Galois field multiplying table is indexed from different directions constructed by the longitudinal direction and the transversal direction. Data and parity for making the multiplying calculation are decomposed into plural data and parities by using this table check circuit, and index table information different from each other are allocated to these data and parities. Thus, a longitudinal index table making circuit and a transversal index table making circuit themselves are checked.

15 Claims, 28 Drawing Sheets

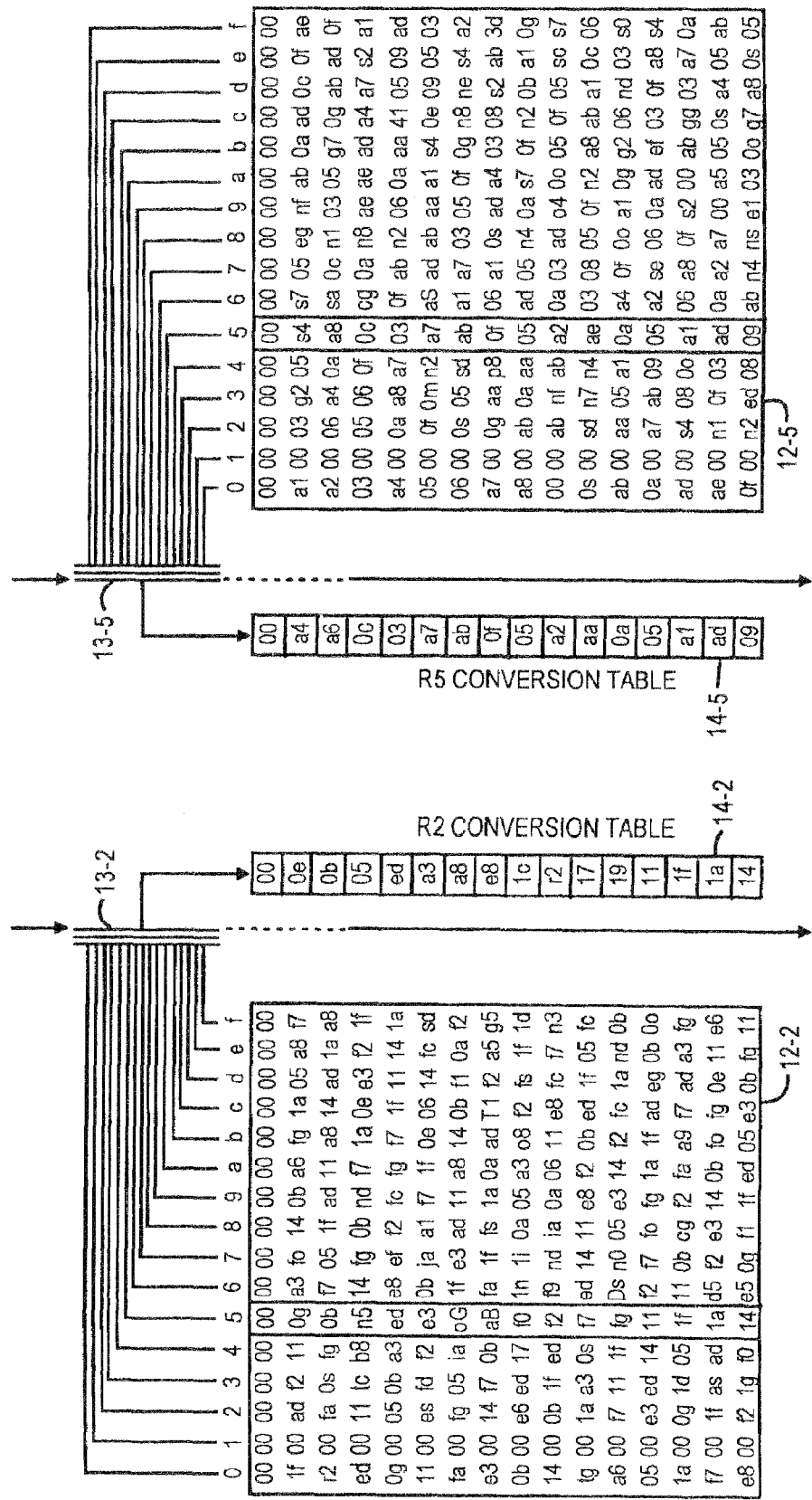

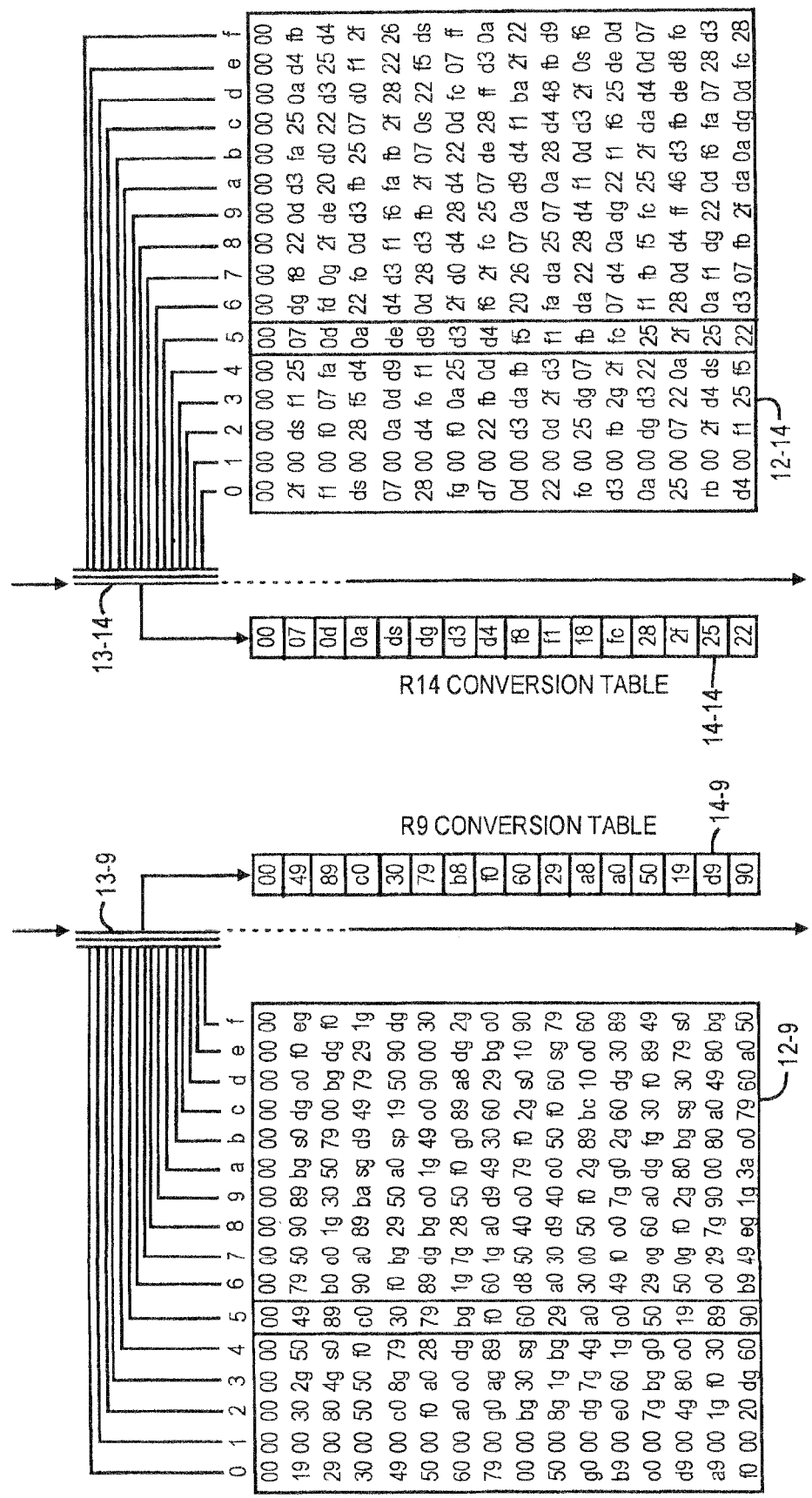

DISK ARRAY DEVICE, PARITY DATA GENERATING CIRCUIT FOR RAID AND GALOIS FIELD MULTIPLYING CIRCUIT

This application claims priority to prior application JP 2003-386997, the disclosure of which is incorporated herein by reference.

BACKGROUND OF THE INVENTION

1. Field of the Invention

The present invention relates to a disk array device, a parity data generating circuit for RAID (Redundant Array of Independent Disks) and a Galois field multiplying circuit, and particularly, relates to a disk array device of RAID6, a parity data generating circuit for RAID and a Galois field multiplying circuit requiring high reliability and high performance.

2. Description of the Related Art

In the disk array device for storing important data, reliability is increased by a RAID technique or the like conventionally known, and plural RAID systems of RAID0 to RAID5 have been defined. However, in recent years, a system of RAID6 improving these plural RAID systems has appeared and a further improvement of reliability is required.

The reliability of hardware of the disk array device itself is also required. In data transfer, a mechanism for adding a check code of data guarantee such as parity and ECC (Error Correcting Code) and preventing the transfer data from being changed into another code has been indispensable.

In particular, in the RAID6 recently defined, it is necessary to multiply the Galois field upon treating data. With respect to its arithmetic results, a new mechanism for improving reliability such as reflection of parity for securing the justifying property of data is required.

For example, a RAID device for realizing the RAID6 by using an extension Galois field $GF(2^4)$ capable of treating 16 kinds of data in the calculation of parity is known (see Japanese Unexamined Patent Publication (JP-A) No. 2000-259359). Hereinafter, the extension Galois field is suitably simply called Galois field.

FIG. 1 shows a circuit construction for generating parity data for RAID in the prior art. In transfer data 20-1 from a memory, the circuit is constructed such that data 20-2, parity 20-3 and a multiplication coefficient 204 of the Galois field with respect to these data 20-2 are transferred. With respect to the data 20-2 themselves, a parity check is made by a parity check circuit 20-5 (see "A Tutorial on Reed-Solomon Coding for Fault-Tolerance in RAID-like System" James S. Plank, Department of Computer Science University of Tennessee, Feb. 19, 1999)

An arithmetic calculation using a Galois field multiplying circuit 20-6 is made by designating the multiplication coefficient 20-4 for these data 20-2 so that data 20-7 for RAID are generated. After this generation, the parity for the data 20-7 is generated by a parity generating circuit 20-8. Thus, the justifying property of the data 20-2 from the memory is guaranteed by the parity check circuit 20-5.

In a data guaranteeing circuit in the conventional method as shown in FIG. 1, there is an effect in a logic failure or the like. However, no failure of hardware can be found when a breaking point is narrowed down to a certain one point as in deterioration due to a change with the passage of time within LSI (Large Scaled Integration) and a short circuit.

This problem will be explained in the circuit construction of FIG. 1. Specifically, a state guaranteeing no data 20-2 is attained because no parity error can be detected even if the parity error is generated when the parity check circuit 20-5 for guaranteeing data is broken.

Further, data having no problem are used upon checking the error. However, when the Galois field multiplying circuit 20-6 is broken, its arithmetic result is converted into data except for an object and parity 20-12 is simultaneously newly given again by the parity generating circuit 20-8 existing after this conversion. No parity error is detected even when the data 20-7 are converted in error. The parity data Q for RAID finally generated cause a data changing state, which becomes a fatal wound as a disk array system.

In order to avoid such a problem, proposal has been made of a conventional technique for doubling the Galois field multiplying circuit 20-6 itself and comparing the mutual arithmetic results. However, when an error signal itself showing the comparing result is broken by a short circuit, no effect can be shown at all.

In the disk array device of RAID6 requiring high reliability, the event that these abnormal data are considered as effective data should not be caused.

SUMMARY OF THE INVENTION

It is a first object of the present invention to provide a disk array device of RAID6 of high reliability capable of reliably guaranteeing data by parity with respect to the data, a check code of ECC even in the Galois field multiplying circuit.

It is a second object of the present invention to provide a parity data generating circuit for RAID for realizing the disk array device of RAID6 and reliably preventing the data change including a failure and checking the justifying property of the data.

It is a third object of the present invention to provide a Galois field multiplying circuit suitably used in the parity data generating circuit for RAID for realizing the disk array device of RAID6.

It is a fourth object of the present invention to provide a parity data generating method for RAID for realizing the disk array device of RAID6 and reliably preventing the data change including a failure and checking the justifying property of the data.

A disk array device of the present invention is characterized in that data are converted by using a Galois field multiplying table symmetrical longitudinally and transversally and made by a multiplying calculation of the Galois field of $GF(2^4)$, and index table information of the transversal direction and index table information of the longitudinal direction are extracted from the Galois field multiplying table, and a failure of a circuit is detected by comparing both the index table information.

The disk array device of the present invention is also characterized in that two kinds of index table information for data for making the multiplying calculation and index table information for a check code annexed to these data are generated as the index table information.

The disk array device of the present invention is further characterized in that the failure of the circuit is detected by arithmetically performing an XOR logic operation of a bit unit of the index table information, and detecting that it is a value except for zero.

Furthermore, the disk array device of the present invention is characterized in that the data for making the multiplying calculation of the Galois field are decomposed into plural data, and processing is performed by dividing these data into decomposing data for performing the conversion by using the index table information of the longitudinal direction, and decomposing data for performing the conversion by using the index table information of the transversal direction.

The disk array device of the present invention is also characterized in that the check code annexed to the data for making the multiplying calculation of the Galois field is decomposed into plural check codes, and processing is performed by dividing these check codes into a decomposing check code for performing the conversion by using the index table information of the longitudinal direction, and a decomposing check code for performing the conversion by using the index table information of the transversal direction.

The disk array device of the present invention is further characterized in that the decomposing check code with respect to the decomposing data is converted by using the index table information of the longitudinal direction when these decomposing data are converted by using the index table information of the transversal direction, and the decomposing check code with respect to the decomposing data is converted by using the index table information of the transversal direction when these decomposing data are converted by using the index table information of the longitudinal direction, so that the decomposing data and the decomposing check code as a pair are converted by using the index table information different from each other.

Furthermore, the disk array device of the present invention is characterized in that the index table information of the longitudinal direction is a longitudinal conversion table for data, and the index table information of the transversal direction is a transversal conversion table for data.

The disk array device of the present invention is also characterized in that the index table information of the longitudinal direction is a longitudinal conversion table for data and a longitudinal inverting table for a check code, and the index table information of the transversal direction is a transversal conversion table for data and a transversal inverting table for a check code.

Further, the disk array device of the present invention is characterized in that the check code is parity with respect to the data.

Furthermore, the disk array device of the present invention is characterized in that the check code is ECC with respect to the data.

On the other hand, the disk array device of the present invention is characterized in that data are converted by using a Galois field multiplying table symmetrical longitudinally and transversally and made by a multiplying calculation of the Galois field of $GF(2^4)$, and index table information of the transversal direction and index table information of the longitudinal direction are extracted from the Galois field multiplying table, and a failure of a circuit is detected by comparing both the index table information.

The parity data generating circuit for RAID in the present invention is also characterized in that two kinds of index table information for data for making the multiplying calculation and index table information for a check code annexed to these data are generated as the index table information.

The parity data generating circuit for RAID in the present invention is further characterized in that the failure of the circuit is detected by arithmetically performing an XOR logic operation of a bit unit of the index table information, and detecting that it is a value except for zero.

Furthermore, the parity data generating circuit for RAID in the present invention is characterized in that the data for making the multiplying calculation of the Galois field are decomposed into plural data, and processing is performed by dividing these data into decomposing data for performing the conversion by using the index table information of the longitudinal direction, and decomposing data for performing the conversion by using the index table information of the transversal direction.

The parity data generating circuit for RAID in the present invention is also characterized in that the check code annexed to the data for making the multiplying calculation of the Galois field is decomposed into plural check codes, and processing is performed by dividing these check codes into a decomposing check code for performing the conversion by using the index table information of the longitudinal direction, and a decomposing check code for performing the conversion by using the index table information of the transversal direction.

The parity data generating circuit for RAID in the present invention is further characterized in that the decomposing check code with respect to the decomposing data is converted by using the index table information of the longitudinal direction when these decomposing data are converted by using the index table information of the transversal direction, and the decomposing check code with respect to the decomposing data is converted by using the index table information of the transversal direction when these decomposing data are converted by using the index table information of the longitudinal direction, so that the decomposing data and the decomposing check code as a pair are converted by using the index table information different from each other.

Furthermore, the parity data generating circuit for RAID in the present invention is characterized in that the Galois field multiplying circuit has a Galois field multiplying table; a longitudinal index table making circuit for generating the index table information of the longitudinal direction by indexing the Galois field multiplying table from the longitudinal direction by using a multiplication coefficient; a transversal index table making circuit for generating the index table information of the transversal direction by indexing the Galois field multiplying table from the transversal direction by using the multiplication coefficient; a table check circuit for checking whether the generated index table information is correct; an upper order data converting circuit and a lower order data converting circuit for dividing data from the generated index table information into an upper order data portion and a lower order data portion and converting these data into data for RAID; and an upper order parity inverting circuit and a lower order parity inverting circuit for dividing parity with respect to the data from the generated index table information into an upper order parity portion and a lower order parity portion and converting this parity into parity with respect to the data for RAID.

The parity data generating circuit for RAID in the present invention is also characterized in that the Galois field multiplying circuit has a Galois field multiplying table; a longitudinal index table making circuit for generating the index table information of the longitudinal direction by indexing the Galois field multiplying table from the longitudinal direction by using a multiplication coefficient; a transversal index table making circuit for generating the index table information of the transversal direction by indexing the Galois field multiplying table from the transversal direction by using the multiplication coefficient; a table check circuit for checking whether the generated index table information is correct; an even data converting circuit and an odd data converting circuit for dividing data from the generated index table information into an even data position and an odd data position and converting these data into data for RAID; and an even parity inverting circuit and an odd parity inverting circuit for dividing parity with respect to the data from the generated index table information into an even parity position and an odd parity position and converting this parity into parity with respect to the data for RAID.

The parity data generating circuit for RAID in the present invention is further characterized in that the Galois field multiplying circuit has a Galois field multiplying table; a longitudinal index table making circuit for generating the index table information of the longitudinal direction by indexing the Galois field multiplying table from the longitudinal direction by using a multiplication coefficient; a transversal index table making circuit for generating the index table information of the transversal direction by indexing the Galois field multiplying table from the transversal direction by using the multiplication coefficient; a table check circuit for checking whether the generated index table information is correct; an upper order data converting circuit and a lower order data converting circuit for dividing data from the generated index table information into an upper order data portion and a lower order data portion and converting these data into data for RAID; and an ECC converting circuit for converting ECC with respect to the data into ECC with respect to the data for RAID.

Furthermore, the parity data generating circuit for RAID in the present invention is characterized in that the index table information of the longitudinal direction is a longitudinal conversion table for data, and the index table information of the transversal direction is a transversal conversion table for data.

The parity data generating circuit for RAID in the present invention is also characterized in that the index table information of the longitudinal direction is a longitudinal conversion table for data and a longitudinal inverting table for a check code, and the index table information of the transversal direction is a transversal conversion table for data and a transversal inverting table for a check code.

The parity data generating circuit for RAID in the present invention is further characterized in that the check code is parity with respect to the data.

Furthermore, the parity data generating circuit for RAID in the present invention is characterized in that the check code is ECC with respect to the data.

The parity data generating circuit for RAID in the present invention is also characterized in that the parity data generating circuit for RAID comprises:

a Galois field multiplying table having a conversion table for data and a conversion table for parity;

a longitudinal index table making circuit for generating a longitudinal inverting table for parity and a longitudinal converting table for data by indexing the Galois field multiplying table from the longitudinal direction by using a multiplication coefficient;

a transversal index table making circuit for generating a transversal converting table for data and a transversal inverting table for parity by indexing the Galois field multiplying table from the transversal direction by using the multiplication coefficient;

an upper order data converting circuit for selecting the longitudinal converting table for data generated by the longitudinal index table making circuit by each decomposing data of an upper order data portion of data, and obtaining a multiplying result of the Galois field;

a lower order data converting circuit for selecting the transversal converting table for data generated by the transversal index table making circuit by each decomposing data of a lower order data portion of data, and obtaining a multiplying result of the Galois field;

an upper order parity inverting circuit for obtaining an inverting result of an upper order parity portion in which an XOR logic operation is performed with respect to each decomposing parity of the upper order parity portion of the parity and the multiplying result of the Galois field obtained by selecting the transversal inverting table for parity generated by the transversal index table making circuit by each decomposing data of the upper order data portion of the data;

a lower order parity inverting circuit for obtaining an inverting result of the lower order parity in which the XOR logic operation is performed with respect to each decomposing parity of the lower order parity portion of the parity and the multiplying result of the Galois field obtained by selecting the longitudinal inverting table for parity generated by the longitudinal index table making circuit by each decomposing data of the upper order data portion of the data;

a table check circuit for data conversion for comparing and checking the longitudinal converting table for data generated by the longitudinal index table making circuit and the transversal converting table for data generated by the transversal index table making circuit;

a table check circuit for parity inversion for comparing and checking the longitudinal inverting table for parity generated by the longitudinal index table making circuit, and the transversal inverting table for parity generated by the transversal index table making circuit;

a first table zero check circuit for checking that the XOR logic of each bit series of the longitudinal converting table for data generated by the longitudinal index table making circuit, or the transversal converting table for data generated by the transversal index table making circuit is zero;

a second table zero check circuit for checking that the XOR logic of a bit series of the longitudinal inverting table for parity generated by the longitudinal index table making circuit, or the transversal inverting table for parity generated by the transversal index table making circuit is zero;

a parity check circuit for checking the parity of data by using the data generated by the upper order data converting circuit and the lower order data converting circuit, and the parity generated by the upper order parity inverting circuit and the lower order parity inverting circuit;

an XOR circuit for performing the XOR logic arithmetic operation with respect to the data generated by the upper order data converting circuit and the lower order data converting circuit, and the parity generated by the upper order parity inverting circuit and the lower order parity inverting circuit; and a buffer for accumulating the arithmetic result of the XOR circuit as parity data for RAID.

The parity data generating circuit for RAID in the present invention is further characterized in that the parity data generating circuit for RAID comprises:

a Galois field multiplying table having a conversion table for data and a conversion table for parity;

a longitudinal index table making circuit for generating a longitudinal inverting table for parity and a longitudinal converting table for data by indexing the Galois field multiplying table from the longitudinal direction by using a multiplication coefficient;

a transversal index table making circuit for generating a transversal converting table for data and a transversal inverting table for parity by indexing the Galois field multiplying table from the transversal direction by using the multiplication coefficient;

an even data converting circuit for selecting the longitudinal converting table for data generated by the longitudinal index table making circuit by each decomposing data of an even data position of data, and obtaining a multiplying result of the Galois field;

an odd data converting circuit for selecting the transversal converting table for data generated by the transversal index table making circuit by each decomposing data of an odd data position of data, and obtaining a multiplying result of the Galois field;

an even parity inverting circuit for obtaining an inverting result of the even parity in which an XOR logic operation is performed with respect to each decomposing parity of the upper order parity portion of the parity and the multiplying result of the Galois field obtained by selecting the transversal inverting table for parity generated by the transversal index table making circuit by each decomposing data of the even data position of the data;

an odd parity inverting circuit for obtaining an inverting result of the odd parity in which the XOR logic operation is performed with respect to each decomposing parity of the lower order parity portion of the parity and the multiplying result of the Galois field obtained by selecting the longitudinal inverting table for parity generated by the longitudinal index table making circuit by each decomposing data of the odd data position of the data;

a table check circuit for data conversion for comparing and checking the longitudinal converting table for data generated by the longitudinal index table making circuit and the transversal converting table for data generated by the transversal index table making circuit;

a table check circuit for parity inversion for comparing and checking the longitudinal inverting table for parity generated by the longitudinal index table making circuit, and the transversal inverting table for parity generated by the transversal index table making circuit;

a first table zero check circuit for checking that the XOR logic of each bit series of the longitudinal converting table for data generated by the longitudinal index table making circuit, or the transversal converting table for data generated by the transversal index table making circuit is zero;

a second table zero check circuit for checking that the XOR logic of a bit series of the longitudinal inverting table for parity generated by the longitudinal index table making circuit, or the transversal inverting table for parity generated by the transversal index table making circuit is zero;

a parity check circuit for checking the parity of data by using the data generated by the upper order data converting circuit and the lower order data converting circuit, and the parity generated by the upper order parity inverting circuit and the lower order parity inverting circuit;

an XOR circuit for performing the XOR logic arithmetic operation with respect to the data generated by the upper order data converting circuit and the lower order data converting circuit, and the parity generated by the upper order parity inverting circuit and the lower order parity inverting circuit; and a buffer for accumulating the arithmetic result of the XOR circuit as parity data for RAID.

Furthermore, the parity data generating circuit for RAID in the present invention is characterized in that the parity data generating circuit for RAID comprises:

a Galois field multiplying table having a conversion table for data and a conversion table for parity;

an ECC converting table corresponding to each decomposing data of the data;

a longitudinal index table making circuit for generating a longitudinal inverting table for parity and a longitudinal converting table for data by indexing the Galois field multiplying table from the longitudinal direction by using a multiplication coefficient;

a transversal index table making circuit for generating a transversal converting table for data and a transversal inverting table for parity by indexing the Galois field multiplying table from the transversal direction by using the multiplication coefficient;

an ECC index table making circuit for generating a conversion table for ECC by indexing the ECC converting table by using the multiplication coefficient;

an upper order data converting circuit for selecting the longitudinal converting table for data generated by the longitudinal index table making circuit by each decomposing data of an upper order data portion of data, and obtaining a multiplying result of the Galois field;

a lower order data converting circuit for selecting the transversal converting table for data generated by the transversal index table making circuit by each decomposing data of a lower order data portion of data, and obtaining a multiplying result of the Galois field;

an ECC converting circuit for selecting the ECC converting table generated by the ECC index table making circuit by each decomposing data of the data, and converting the ECC with respect to the data into ECC with respect to data for RAID;

a table check circuit for data conversion for comparing and checking the longitudinal converting table for data generated by the longitudinal index table making circuit and the transversal converting table for data generated by the transversal index table making circuit;

a table check circuit for parity inversion for comparing and checking the longitudinal inverting table for parity generated by the longitudinal index table making circuit, and the transversal inverting table for parity generated by the transversal index table making circuit;

a first table zero check circuit for checking that the XOR logic of each bit series of the longitudinal converting table for data generated by the longitudinal index table making circuit, or the transversal converting table for data generated by the transversal index table making circuit is zero;

a second table zero check circuit for checking that the XOR logic of a bit series of the longitudinal inverting table for parity generated by the longitudinal index table making circuit, or the transversal inverting table for parity generated by the transversal index table making circuit is zero;

an ECC check circuit for checking the ECC with respect to the data by using the data generated by the upper order data converting circuit and the lower order data converting circuit and the ECC generated by the ECC converting circuit;

an XOR circuit for performing the XOR logic arithmetic operation with respect to the data generated by the upper order data converting circuit and the lower order data converting circuit and the ECC generated by the ECC converting circuit; and a buffer for accumulating the arithmetic result of the XOR circuit as parity data for RAID.

On the other hand, a Galois field multiplying circuit of the present invention is characterized in that the Galois field multiplying circuit comprises a Galois field multiplying table; a longitudinal index table making circuit for generating the index table information of the longitudinal direction by indexing the Galois field multiplying table from the longitudinal direction by using a multiplication coefficient; a transversal index table making circuit for generating the index table information of the transversal direction by indexing the Galois field multiplying table from the transversal direction by using the multiplication coefficient; an upper order data converting circuit and a lower order data converting circuit for dividing data from the generated index table information into an upper order data portion and a lower order data portion and converting these data into data for RAID; and an upper order parity inverting circuit and a lower order parity inverting circuit for dividing parity with respect to the data from the generated index table information into an upper order parity portion and a lower order parity portion and converting this parity into parity with respect to the data for RAID.

The Galois field multiplying circuit of the present invention is also characterized in that the Galois field multiplying circuit comprises a Galois field multiplying table; a longitudinal index table making circuit for generating the index table information of the longitudinal direction by indexing the Galois field multiplying table from the longitudinal direction by using a multiplication coefficient; a transversal index table making circuit for generating the index table information of the transversal direction by indexing the Galois field multiplying table from the transversal direction by using the multiplication coefficient; an even data converting circuit and an odd data converting circuit for dividing data from the generated index table information into an even data position and an odd data position and converting these data into data for RAID; and an even parity inverting circuit and an odd parity inverting circuit for dividing parity with respect to the data from the generated index table information into an even parity position and an odd parity position and converting this parity into parity with respect to the data for RAID.

The Galois field multiplying circuit of the present invention is further characterized in that the Galois field multiplying circuit comprises a Galois field multiplying table; a longitudinal index table making circuit for generating the index table information of the longitudinal direction by indexing the Galois field multiplying table from the longitudinal direction by using a multiplication coefficient; a transversal index table making circuit for generating the index table information of the transversal direction by indexing the Galois field multiplying table from the transversal direction by using the multiplication coefficient; an upper order data converting circuit and a lower order data converting circuit for dividing data from the generated index table information into an upper order data portion and a lower order data portion and converting these data into data for RAID; and an ECC converting circuit for converting ECC with respect to the data into ECC with respect to the data for RAID.

Furthermore, the Galois field multiplying circuit of the present invention is characterized in that the Galois field multiplying circuit comprises:

a Galois field multiplying table having a conversion table for data and a conversion table for parity;

a longitudinal index table making circuit for generating a longitudinal inverting table for parity and a longitudinal converting table for data by indexing the Galois field multiplying table from the longitudinal direction by using a multiplication coefficient;

a transversal index table making circuit for generating a transversal converting table for data and a transversal inverting table for parity by indexing the Galois field multiplying table from the transversal direction by using the multiplication coefficient;

an upper order data converting circuit for selecting the longitudinal converting table for data generated by the longitudinal index table making circuit by each decomposing data of an upper order data portion of data, and obtaining a multiplying result of the Galois field;

a lower order data converting circuit for selecting the transversal converting table for data generated by the transversal index table making circuit by each decomposing data of a lower order data portion of data, and obtaining a multiplying result of the Galois field;

an upper order parity inverting circuit for obtaining an inverting result of an upper order parity portion in which an XOR logic operation is performed with respect to each decomposing parity of the upper order parity portion of the parity and the multiplying result of the Galois field obtained by selecting the transversal inverting table for parity generated by the transversal index table making circuit by each decomposing data of the upper order data portion of the data; and a lower order parity inverting circuit for obtaining an inverting result of the lower order parity in which the XOR logic operation is performed with respect to each decomposing parity of the lower order parity portion of the parity and the multiplying result of the Galois field obtained by selecting the longitudinal inverting table for parity generated by the longitudinal index table making circuit by each decomposing data of the upper order data portion of the data.

The Galois field multiplying circuit of the present invention is also characterized in that the Galois field multiplying circuit comprises:

a Galois field multiplying table having a conversion table for data and a conversion table for parity;

a longitudinal index table making circuit for generating a longitudinal inverting table for parity and a longitudinal converting table for data by indexing the Galois field multiplying table from the longitudinal direction by using a multiplication coefficient;

a transversal index table making circuit for generating a transversal converting table for data and a transversal inverting table for parity by indexing the Galois field multiplying table from the transversal direction by using the multiplication coefficient;

an even data converting circuit for selecting the longitudinal converting table for data generated by the longitudinal index table making circuit by each decomposing data of an even data position of data, and obtaining a multiplying result of the Galois field;

an odd data converting circuit for selecting the transversal converting table for data generated by the transversal index table making circuit by each decomposing data of an odd data position of data, and obtaining a multiplying result of the Galois field;

an even parity inverting circuit for obtaining an inverting result of the even parity in which an XOR logic operation is performed with respect to each decomposing parity of the upper order parity portion of the parity and the multiplying result of the Galois field obtained by selecting the transversal inverting table for parity generated by the transversal index table making circuit by each decomposing data of the even data position of the data; and an odd parity inverting circuit for obtaining an inverting result of the odd parity in which the XOR logic operation is performed with respect to each decomposing parity of the lower order parity portion of the parity and the multiplying result of the Galois field obtained by selecting the longitudinal inverting table for parity generated by the longitudinal index table making circuit by each decomposing data of the odd data position of the data.

The Galois field multiplying circuit of the present invention is further characterized in that the Galois field multiplying circuit comprises:

a Galois field multiplying table having a conversion table for data and a conversion table for parity;

an ECC converting table corresponding to each decomposing data of the data;

a longitudinal index table making circuit for generating a longitudinal inverting table for parity and a longitudinal converting table for data by indexing the Galois field multiplying table from the longitudinal direction by using a multiplication coefficient;

a transversal index table making circuit for generating a transversal converting table for data and a transversal inverting table for parity by indexing the Galois field multiplying table from the transversal direction by using the multiplication coefficient;

an ECC index table making circuit for generating a conversion table for ECC by indexing the ECC converting table by using the multiplication coefficient;

an upper order data converting circuit for selecting the longitudinal converting table for data generated by the longitudinal index table making circuit by each decomposing data of an upper order data portion of data, and obtaining a multiplying result of the Galois field;

a lower order data converting circuit for selecting the transversal converting table for data generated by the transversal index table making circuit by each decomposing data of a lower order data portion of data, and obtaining a multiplying result of the Galois field; and an ECC converting circuit for selecting the ECC converting table generated by the ECC index table making circuit by each decomposing data of the data, and converting the ECC with respect to the data into ECC with respect to data for RAID.

In addition, a parity data generating method for RAID in the present invention is characterized in that data are converted by using a Galois field multiplying table symmetrical longitudinally and transversally and made by a multiplying calculation of the Galois field of $GF(2^4)$, and index table information of the transversal direction and index table information of the longitudinal direction are extracted from the Galois field multiplying table, and a failure of a circuit is detected by comparing both the index table information.

The parity data generating method for RAID in the present invention is also characterized in that two kinds of index table information for data for making the multiplying calculation and index table information for a check code annexed to these data are generated as the index table information.

The parity data generating method for RAID in the present invention is further characterized in that the value of zero is detected by arithmetically performing an XOR logic operation of a bit unit of the index table information.

Furthermore, the parity data generating method for RAID in the present invention is characterized in that the data for making the multiplying calculation of the Galois field are decomposed into plural data, and processing is performed by dividing these data into decomposing data for performing the conversion by using the index table information of the longitudinal direction, and decomposing data for performing the conversion by using the index table information of the transversal direction.

The parity data generating method for RAID in the present invention is also characterized in that the check code annexed to the data for making the multiplying calculation of the Galois field is decomposed into plural check codes, and processing is performed by dividing these check codes into a decomposing check code for performing the conversion by using the index table information of the longitudinal direction, and a decomposing check code for performing the conversion by using the index table information of the transversal direction.

The parity data generating method for RAID in the present invention is further characterized in that the decomposing check code with respect to the decomposing data is converted by using the index table information of the longitudinal direction when these decomposing data are converted by using the index table information of the transversal direction, and the decomposing check code with respect to the decomposing data is converted by using the index table information of the transversal direction when these decomposing data are converted by using the index table information of the longitudinal direction, so that the decomposing data and the decomposing check code as a pair are converted by using the index table information different from each other.

Furthermore, the parity data generating method for RAID in the present invention is characterized in that the parity data generating method includes a process for generating the index table information of the longitudinal direction by indexing the Galois field multiplying table from the longitudinal direction by using a multiplication coefficient; a process for generating the index table information of the transversal direction by indexing the Galois field multiplying table from the transversal direction by using the multiplication coefficient; a process for checking whether the generated index table information is correct; a process for dividing data from the generated index table information into an upper order data portion and a lower order data portion and converting these data into data for RAID; and a process for dividing parity with respect to the data from the generated index table information into an upper order parity portion and a lower order parity portion and converting this parity into parity with respect to the data for RAID.

The parity data generating method for RAID in the present invention is also characterized in that the parity data generating method includes a process for generating the index table information of the longitudinal direction by indexing the Galois field multiplying table from the longitudinal direction by using a multiplication coefficient; a process for generating the index table information of the transversal direction by indexing the Galois field multiplying table from the transversal direction by using the multiplication coefficient; a process for checking whether the generated index table information is correct; a process for dividing data from the generated index table information into an even data position and an odd data position and converting these data into data for RAID; and a process for dividing parity with respect to the data from the generated index table information into an even parity position and an odd parity position and converting this parity into parity with respect to the data for RAID.

The parity data generating method for RAID in the present invention is further characterized in that the parity data generating method includes a process for generating the index table information of the longitudinal direction by indexing the Galois field multiplying table from the longitudinal direction by using a multiplication coefficient; a process for generating the index table information of the transversal direction by indexing the Galois field multiplying table from the transversal direction by using the multiplication coefficient; a process for checking whether the generated index table information is correct; a process for converting data from the generated index table information into data for RAID; and a process for converting ECC with respect to the data into ECC with respect to the data for RAID.

Furthermore, the parity data generating method for RAID in the present invention is characterized in that the index table information of the longitudinal direction is a longitudinal conversion table for data, and the index table information of the transversal direction is a transversal conversion table for data.

The parity data generating method for RAID in the present invention is also characterized in that the index table information of the longitudinal direction is a longitudinal conversion table for data and a longitudinal inverting table for a check code, and the index table information of the transversal direction is a transversal conversion table for data and a transversal inverting table for a check code.

The parity data generating method for RAID in the present invention is further characterized in that the check code is parity with respect to the data.

Furthermore, the parity data generating method for RAID in the present invention is characterized in that the check code is ECC with respect to the data.

FIG. 2 shows the construction of a parity data generating circuit for RAID for realizing RAID6 of the present invention.

The present invention is characterized in the following construction. Namely, the Galois field multiplying circuit 1-21 has the Galois field multiplying table 1-11 therein. The Galois field multiplying circuit 1-21 also has a longitudinal index table making circuit 1-9 for generating the index table information of the longitudinal direction by indexing the Galois field multiplying table 1-11 from the longitudinal direction by using the multiplication coefficient 1-4; a transversal index table making circuit 1-10 for generating the index table information of the transversal direction by similarly indexing the Galois field multiplying table 1-11 from the transversal direction by using the multiplication coefficient 1-4; an upper order data converting circuit 1-5 and a lower order data converting circuit 1-6 for converting data 1-2 from the generated index table information into data 1-12 for RAID; and an upper order parity inverting circuit 1-7 and a lower order parity inverting circuit 1-8 for similarly converting parity 1-3 with respect to the data 1-2 into parity 1-13 with respect to the data 1-12 for RAID. In addition, the Galois field multiplying circuit 1-21 has a table check circuit 1-14 for checking whether the generated index table information is correct.

Then, it is characterized in that the present invention has the parity check circuit 1-15 for converting the upper order data portion of the data 1-12 and the lower order parity portion of the parity 1-3 by the index table information indexed from the longitudinal direction, and inspecting the data 1-12 and the parity 1-13 as converting results of the lower order data portion of the data 1-12 and the upper order parity portion of the parity 1-3 by the index table information indexed from the transversal direction. Thus, it is possible to check that the multiplying calculation of the Galois field is made without any error. Accordingly, the parity data generating circuit for RAID able to generate reliable data for RAID6 is provided.

With respect to an arithmetic formula of RAID6 itself in the present invention, the following arithmetic formulas (formulas 1 and 2) are used as a base. However, the definitions of these formulas themselves, etc. are already known by the non-patent literature 1, etc. Simultaneously, the arithmetic formulas themselves in the multiplying calculation of the Galois field are generally known arithmetic calculations. Therefore, the detailed proofs and contents of these formulas are not described here.

Formula for realizing RAID6:

When n data series are set to D0, D1, D2, . . . , D(n−1), its two parity data P and Q use the following two formulas.

$$P = D0 + D1 + D2 + \ldots + D(n-1) \quad \text{[Formula 1]}$$

$$Q = D0 + 2D1 + 3D2 + \ldots + nD(n-1) \quad \text{[Formula 2]}$$

In the notation of the above formulas 1 and 2, the multiplying calculation shows the multiplying calculation of the Galois field, and the adding calculation shows exclusive OR using the XOR logic.

The parity data generating circuit for RAID realizing RAID6 of high reliability for making the multiplying calculation of the Galois field can be provided by the circuit construction of the present invention.

A hardware failure of the Galois field multiplying circuit itself can be found by the construction for simultaneously indexing one Galois field multiplying table in the longitudinal direction and the transversal direction and comparing the index results.

Further, even when one of the index results is broken, the hardware failure can be reliably found by an error such as a parity error, an ECC error, etc. by the construction using the index table information indexed from a different direction in the conversion of data, its parity, a check code such as ECC, etc.

Further, even when the parity check circuit, etc. for checking the result of the multiplying calculation of the Galois field are broken and the failure of the Galois field multiplying circuit itself is generated at this breaking time, the check code before the conversion is propagated in shape and all the failure factors are reflected in the generated check code. Therefore, output data and the check code are perfectly guaranteed, and a circuit for judging no output data as correct data in error by the circuit failure is obtained. Thus, the parity data generating circuit for RAID of higher reliability can be provided.

Further, in a flowing path of data, the Galois field multiplying circuit itself is realized by one stage of selectors. Therefore, the Galois field multiplying circuit can also resist data transfer of very high speed.

DESCRIPTION OF THE PREFERRED EMBODIMENTS

The embodiments of the present invention will next be explained in detail with reference to the drawings.

Embodiment 1

Figure 3:
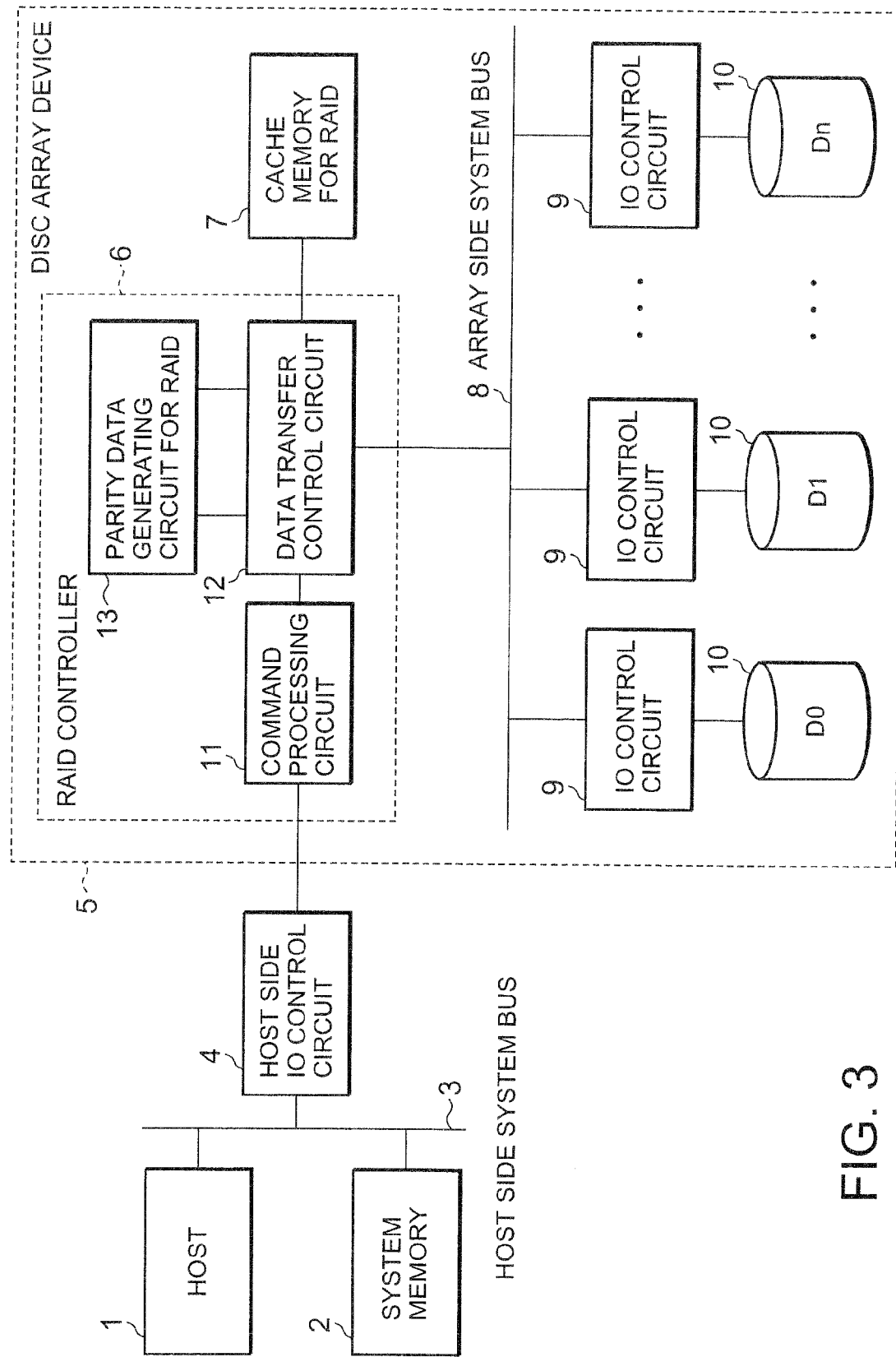
FIG. 3 is a circuit block diagram showing the construction of a disk array system in which the parity data generating circuit for RAID in the present invention is arranged.

Referring to FIG. 3, a main portion of a disk array system according to an embodiment 1 of the present invention comprises a host 1, a system memory 2, a host side system bus 3 connected to the host 1 and the system memory 2, a host side IO control circuit 4 connected to the host side system bus 3, and a disk array device 5 connected to the host side IO control circuit 4.

The disk array device 5 comprises a RAID controller 6 connected to the host side IO control circuit 4, a cache memory 7 for RAID connected to the RAID controller 6, an array side system bus 8 connected to the RAID controller 6, n (n is plural) IO control circuits 9 such as SCSI (Small Computer System Interface) connected to the array side system bus 8, and n hard disk devices 10 respectively connected to each IO control circuit 9.

The RAID controller 6 includes a command processing circuit 11 connected to the host side IO control circuit 4, a data transfer control circuit 12 connected to the command processing circuit 11, the array side system bus 8 and the cache memory 7 for RAID, and a parity data generating circuit 13 for RAID connected to the data transfer control circuit 12.

Figure 1:
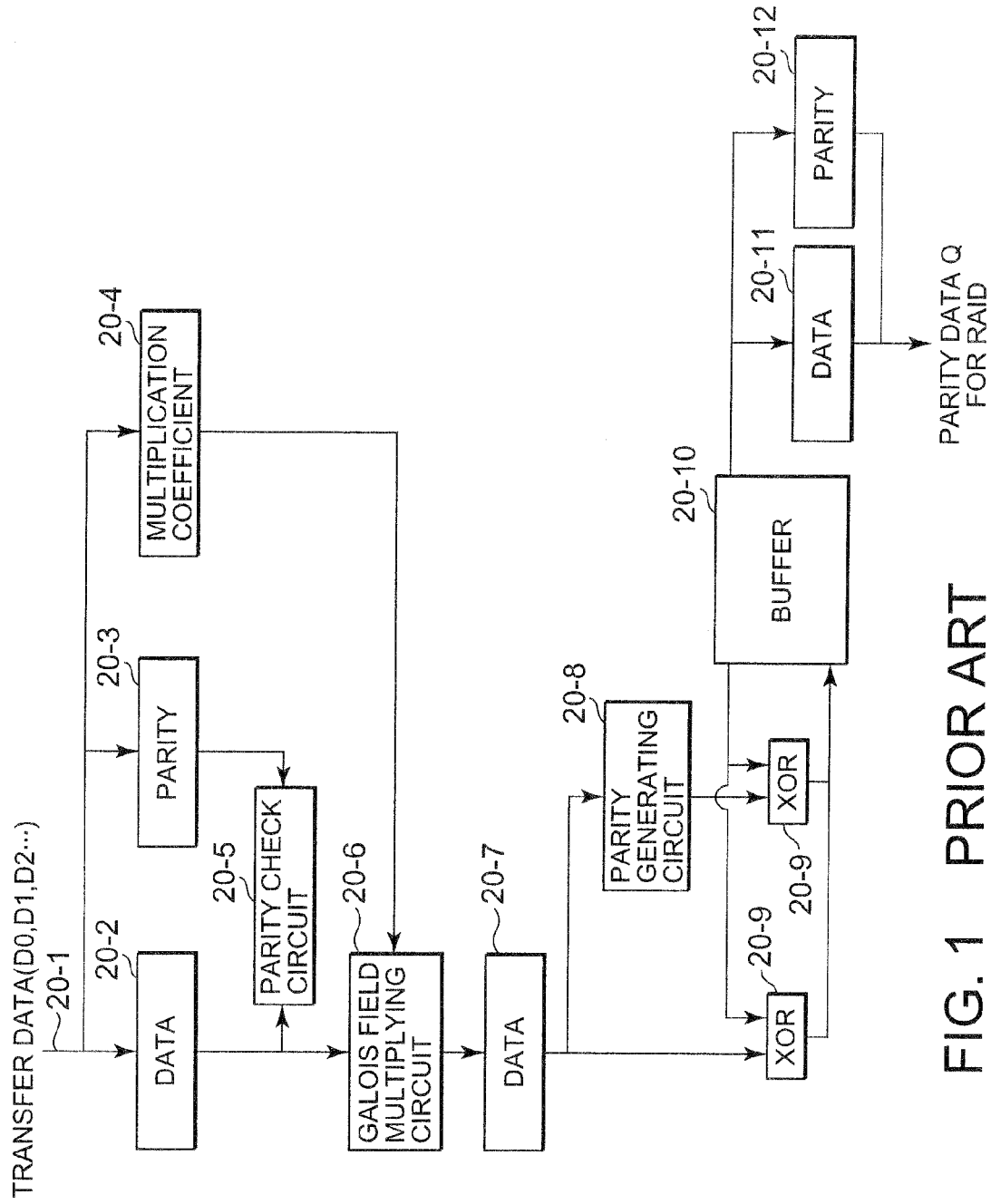
FIG. 1 is a view showing the construction of a circuit for generating parity data for RAID in the prior art.
Figure 2:
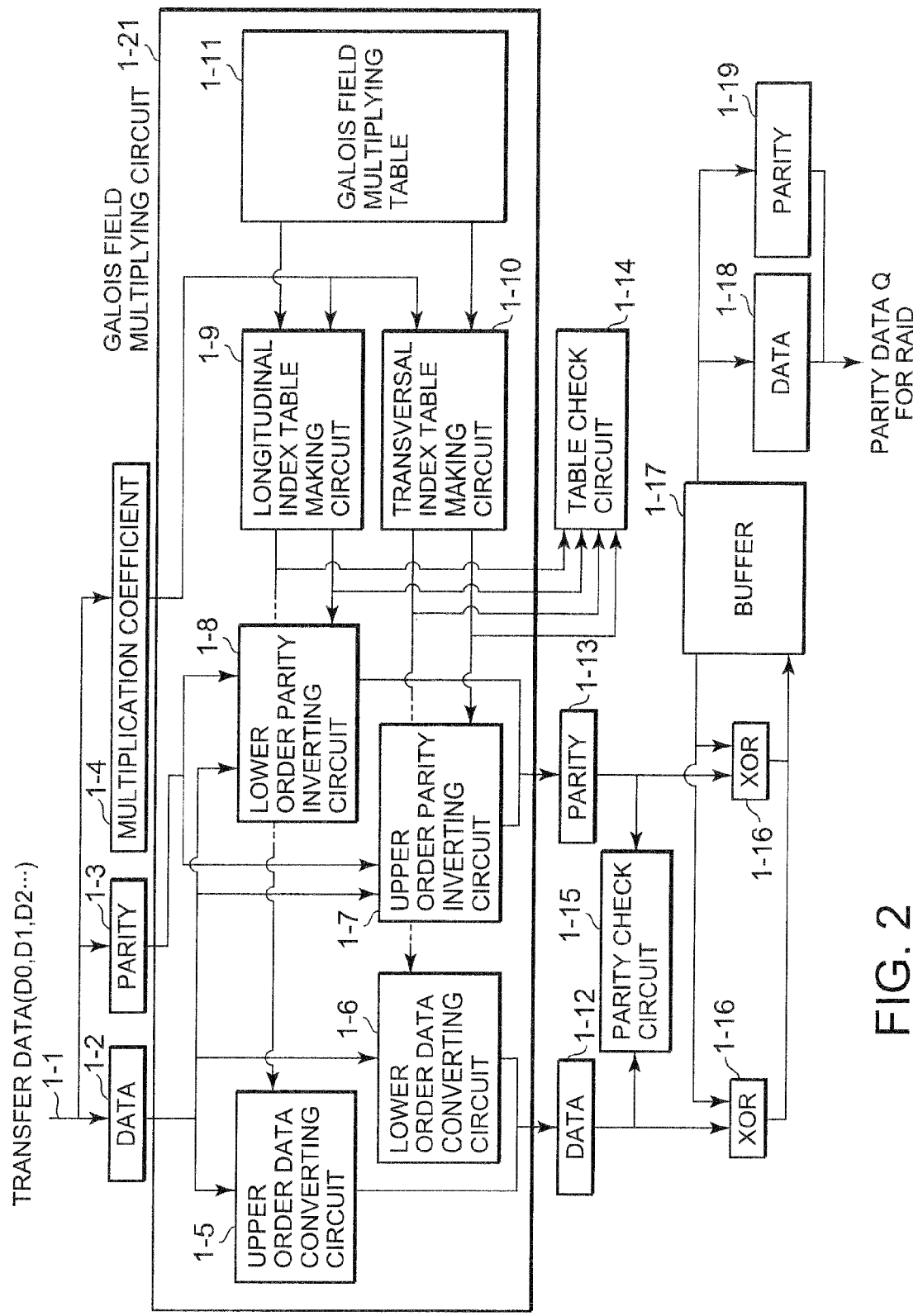
FIG. 2 is a circuit block diagram showing the construction of a parity data generating circuit for RAID in accordance with an embodiment 1 of the present invention.

FIG. 2 is a circuit block diagram showing the construction of the parity data generating circuit 13 for RAID for realizing RAID6 in accordance with the embodiment 1 of the present invention.

The parity data generating circuit 13 for RAID comprises a Galois field multiplying circuit 1-21, a table check circuit 1-14, a parity check circuit 1-15, two XOR circuits 1-16 and a buffer 1-17. The Galois field multiplying circuit 1-21 inputs data 1-2, parity 1-3 and a multiplication coefficient 1-4 thereto and makes a Galois field multiplying calculation. The table check circuit 1-14 checks whether index table information (a longitudinal inverting table 3-12 for parity, a longitudinal converting table 3-13 for data, a transversal converting table 3-14 for data, and a transversal inverting table 1-15 for parity shown in FIG. 4) generated in the Galois field multiplying circuit 1-21 is correct. The parity check circuit 1-15 checks the parity by using data 1-12 and parity 1-13 generated by the Galois field multiplying circuit 1-21. The XOR circuit 1-16 performs an XOR logic arithmetic operation with respect to the data 1-12 and the parity 1-13 generated by the Galois field multiplying circuit 1-21. The buffer 1-17 accumulates the arithmetic result of the XOR circuit 1-16 as parity data Q for RAID.

The Galois field multiplying circuit 1-21 comprises a Galois field multiplying table 1-11, a longitudinal index table making circuit 1-9, a transversal index table making circuit 1-10, an upper order data converting circuit 1-5, a lower order data converting circuit 1-6, an upper order parity inverting circuit 1-7 and a lower order parity inverting circuit 1-8. The longitudinal index table making circuit 1-9 indexes the Galois field multiplying table 1-11 from the longitudinal direction by using the multiplication coefficient 1-4 and generates index table information of the longitudinal direction. Similarly, the transversal index table making circuit 1-10 indexes the Galois field multiplying table 1-11 from the transversal direction by using the multiplication coefficient 1-4 and generates index table information of the transversal direction. The upper order data converting circuit 1-5 and the lower order data converting circuit 1-6 convert the data 1-2 into the data 1-12 for RAID from the generated index table information. Similarly, the upper order parity inverting circuit 1-7 and the lower order parity inverting circuit 1-8 convert the parity 1-3 with respect to the data 1-2 into the parity 1-13 with respect to the data 1-12 for RAID.

Figure 4A:
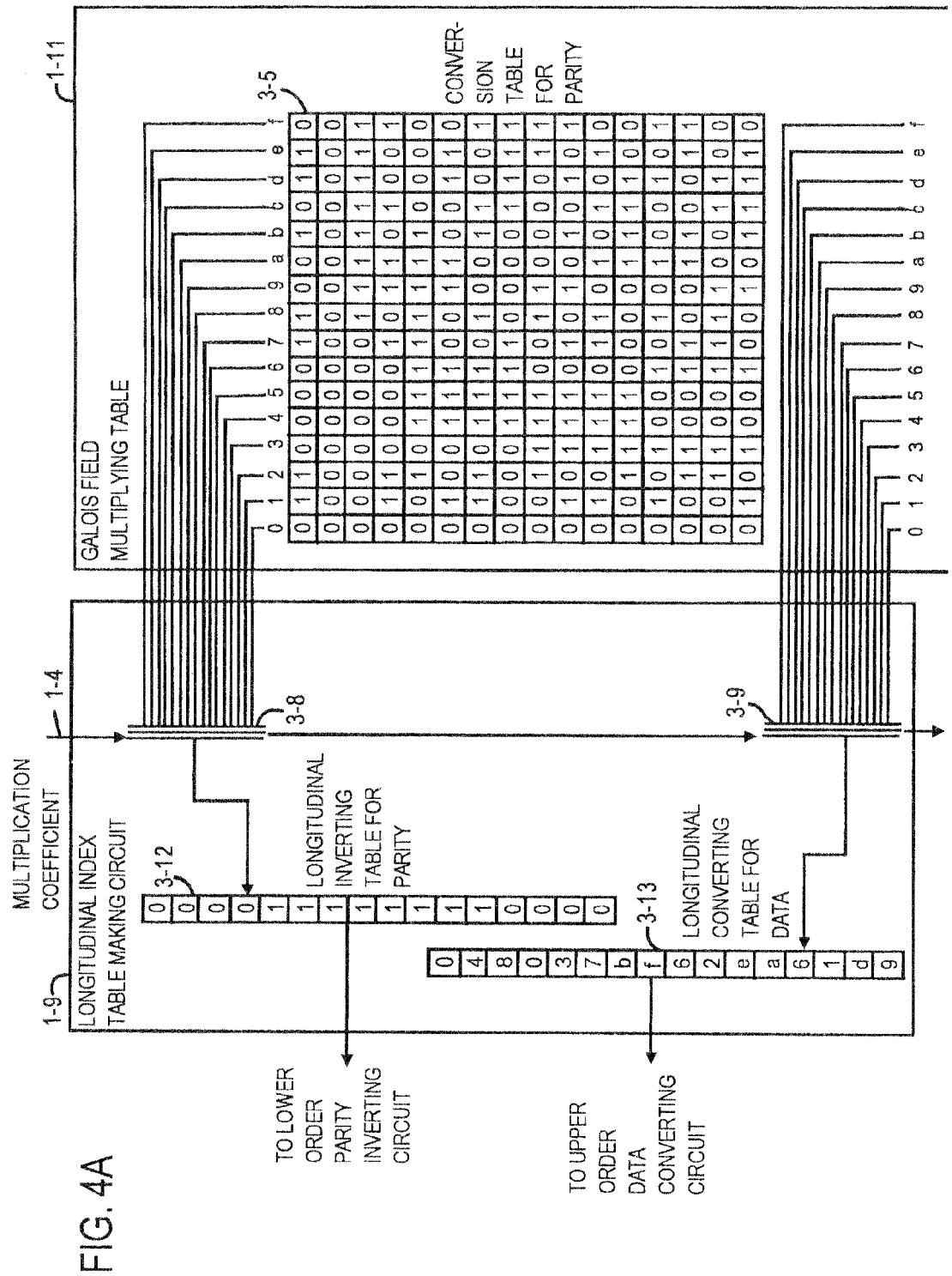
FIG. 4 is a view showing the details of a Galois field multiplying table, a longitudinal index table making circuit and a transversal index table making circuit shown in FIG. 2.
Figure 4B:
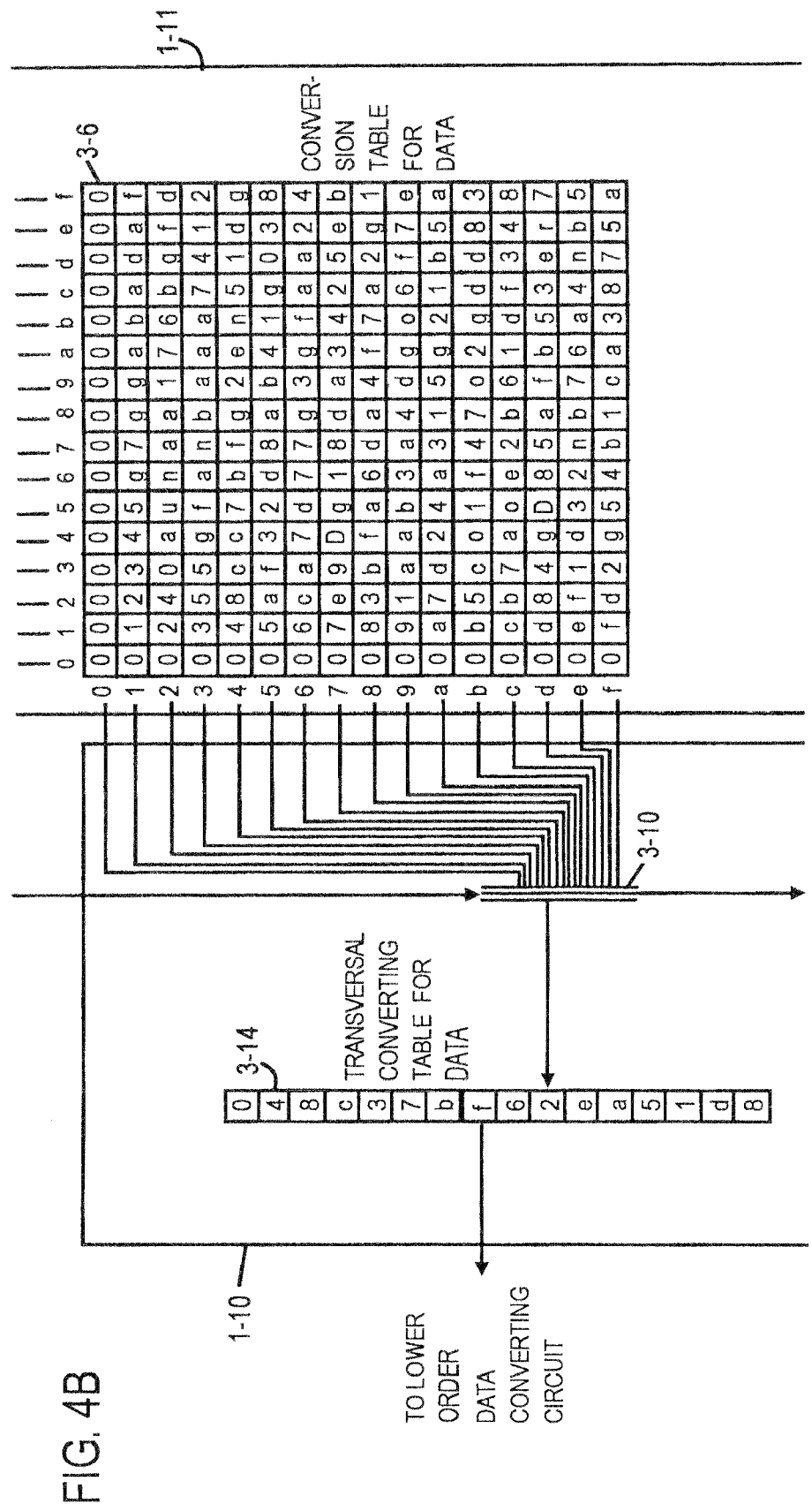
Figure 4C:
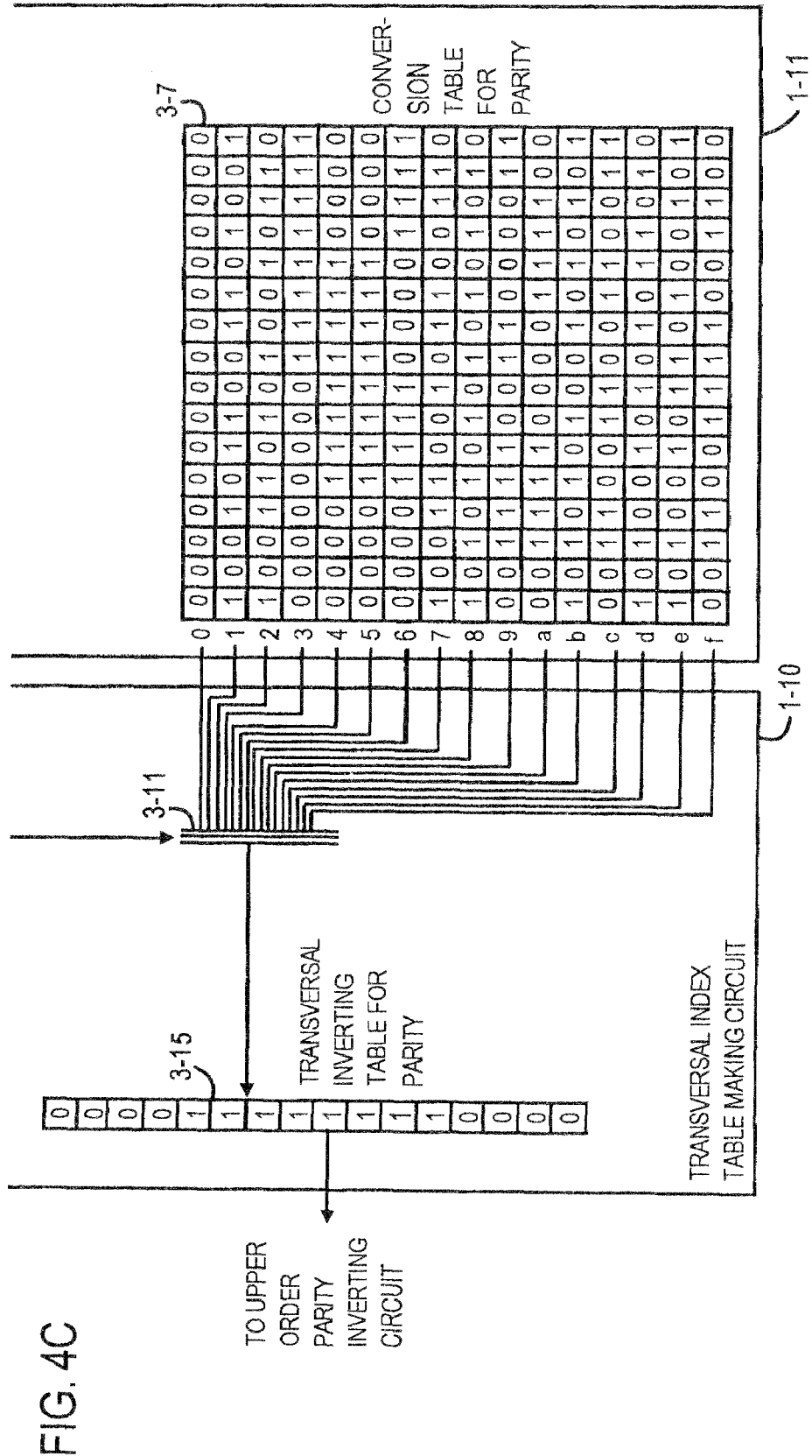

FIG. 4 shows the concrete circuit construction of the Galois field multiplying table 1-11, the longitudinal index table making circuit 1-9 and the transversal index table making circuit 1-10.

A calculating example of the parity will first be explained.

Since each hard disk device 10 is divided into blocks in a four-bit unit, sixteen kinds of data from 0 to 15 can be stored to each block.

Therefore, the parity is calculated by using the extension Galois field $GF(2^4)$ cable of treating the sixteen kinds of data. This extension Galois field $GF(2^4)$ can make adding (subtracting), multiplying and dividing calculations within the defined kind of data. The adding (subtracting) calculation is made by using XOR logic. The multiplying calculation is made by the use of a conversion table 3-6 for data as multiplying results of the extension Galois field $GF(2^4)$. The dividing calculation is quoted by performing a reverse subtracting operation with respect to the conversion table 3-6 for data.

The conversion table 3-6 for data is a table in which the extension Galois field $GF(2^4)$ is calculated by using $X^4+X+1$ as an irreducible polynomial of the fourth order on a Galois field $GF(2)$.

A brief explanation of the extension Galois field $GF(2^4)$ and a making example of the conversion table 3-6 for data will next be explained.

In the Galois field $GF(2)$, two kinds of 0 and 1 are elements, and the adding, subtracting, multiplying and dividing calculations can be made therebetween. In contrast to this, in the extension Galois field $GF(2^m)$, there are 2m elements, and the adding, subtracting, multiplying and dividing calculations can be made freely therebetween. $2^m$ represents the m-th power of 2.

The multiplying calculation of the fourth order in the extension Galois field will be next defined.

When roots of the irreducible polynomial $$X^4+X+1=0$$

of the fourth order on $GF(2)$ as a multiplying result are considered in the elements of the two kinds of 0 and 1 as a field of the Galois field $GF(2)$, no root exists even when any element of 0 and 1 is substituted. Therefore, one of such roots of the irreducible polynomial is defined as and the field is enlarged on trial.

As its result, since α satisfies $\alpha^4+\alpha+1=0$, the relation of $$\alpha^4=\alpha+1$$

is obtained, and all relation formulas of the fourth order or more represented by α can be replaced with relation formulas of the fourth order or less.

Therefore, when the sixteen kinds of data are considered by the n-th order of α, these data can be represented by the relation formulas as shown below, and do not appear except for the relation formulas of fifteen kinds.

| | |
|---|---|
| $\alpha$ | 1 |
| $\alpha^2$ | 2 |
| $\alpha^3$ | 3 |
| $\alpha^4=\alpha+1$ | 4 |
| $\alpha^5=\alpha^2+\alpha$ | 5 |
| $\alpha^6=\alpha^3+\alpha^2$ | 6 |
| $\alpha^7=\alpha^4+\alpha^3=\alpha^3\alpha+1$ | 7 |
| $\alpha^8=\alpha^4+\alpha^2+\alpha=\alpha^2+1$ | 8 |
| $\alpha^9=\alpha^3+\alpha$ | 9 |
| $\alpha^{10}=\alpha^4+\alpha^2=\alpha^2+\alpha+1$ | A |
| $\alpha^{11}=\alpha^3+\alpha^2+\alpha$ | B |
| $\alpha^{12}=\alpha^4+\alpha^3+\alpha^2=\alpha^3+\alpha^2+\alpha+1$ | C |
| $\alpha^{13}=\alpha^4+\alpha^3+\alpha^2+\alpha=\alpha^3+\alpha^2+1$ | D |
| $\alpha^{14}=\alpha^4+\alpha^3+\alpha=\alpha^3+1$ | E |
| $\alpha^{15}=\alpha^4+\alpha+1$ | F |

When data of the n-th orders of α are multiplied, the multiplied data are represented by any one of the relation formulas of the fifteen kinds from the above relation formulas. For example, $$\alpha^7+\alpha^{14}=\alpha^{21}=\alpha^6=\alpha^3+\alpha^2$$

is formed and is represented by the formula $\alpha^6$ within the fifteen kinds. Since one cycle is formed by the kinds 1 to F of data from these relation formulas, $\alpha^{16}=\alpha$ is formed and it is returned to 1.

Herein, with respect to the above-mentioned relation formulas of the fifteen kinds, the conversion table 3-6 for data can be made by making these formulas correspond to 1 to F. The conversion table 3-6 for data is numerically expressed by making the index number of α correspond to the digit of a binary number. The conversion table 3-6 for data includes zero in addition to 1 to F and shows multiplying results of 0 to F.

Accordingly, the conversion table 3-6 for data shows the multiplying results using the extension Galois field $GF(2^4)$ by using the irreducible polynomial $X^4+X+1$ of the fourth order on the Galois field GF(2). However, it is supposed that all congruence expressions described below are also calculated by the extension Galois field $GF(2^4)$ as long as it is emphatically said.

The Galois field multiplying table 1-11 has the conversion table 3-6 for data which is made by the Galois field multiplying calculation of the extension Galois field $GF(2^4)$ and is symmetrical longitudinally and transversally. The Galois field multiplying table 1-11 also has conversion tables 3-5 and 3-7 for parity. In the Galois field multiplying table 1-11, one column or one row shown by the multiplication coefficient 1-4 of the Galois field is indexed by selectors 3-8, 3-9, 3-10 and 3-11 as a longitudinal inverting table 3-12 for parity, a longitudinal converting table 3-13 for data, a transversal converting table 3-14 for data and a transversal inverting table 3-15 for parity.

The conversion table 3-6 for data is a table in which the index of the longitudinal direction and the index of the transversal direction are the same result from the characteristics of this conversion table 3-6 for data. The longitudinal index table making circuit 1-9 generates the longitudinal converting table 3-13 for data by the selector 3-9 from the conversion table 3-6 for data, and transfers this longitudinal converting table 3-13 for data to the upper order data converting circuit 1-5. Further, the transversal index table making circuit 1-10 generates the transversal converting table 3-14 for data by the selector 3-10 from the conversion table 3-6 for data, and transfers this transversal converting table 3-14 for data to the lower order data converting circuit 1-6.

The conversion tables 3-5 and 3-7 for parity have values mutually replaced with respect to the longitude and the transverse. The longitudinal index table making circuit 1-9 generates the longitudinal inverting table 3-12 for parity by the selector 3-8 from the conversion table 3-5 for parity, and transfers this longitudinal inverting table 3-12 for parity to the lower order parity inverting circuit 1-8. Further, the transversal index table making circuit 1-10 generates the transversal inverting table 3-15 for parity by the selector 3-11 from the conversion table 3-7 for parity, and transfers this transversal inverting table 3-15 for parity to the upper order parity inverting circuit 1-7.

Figure 5:
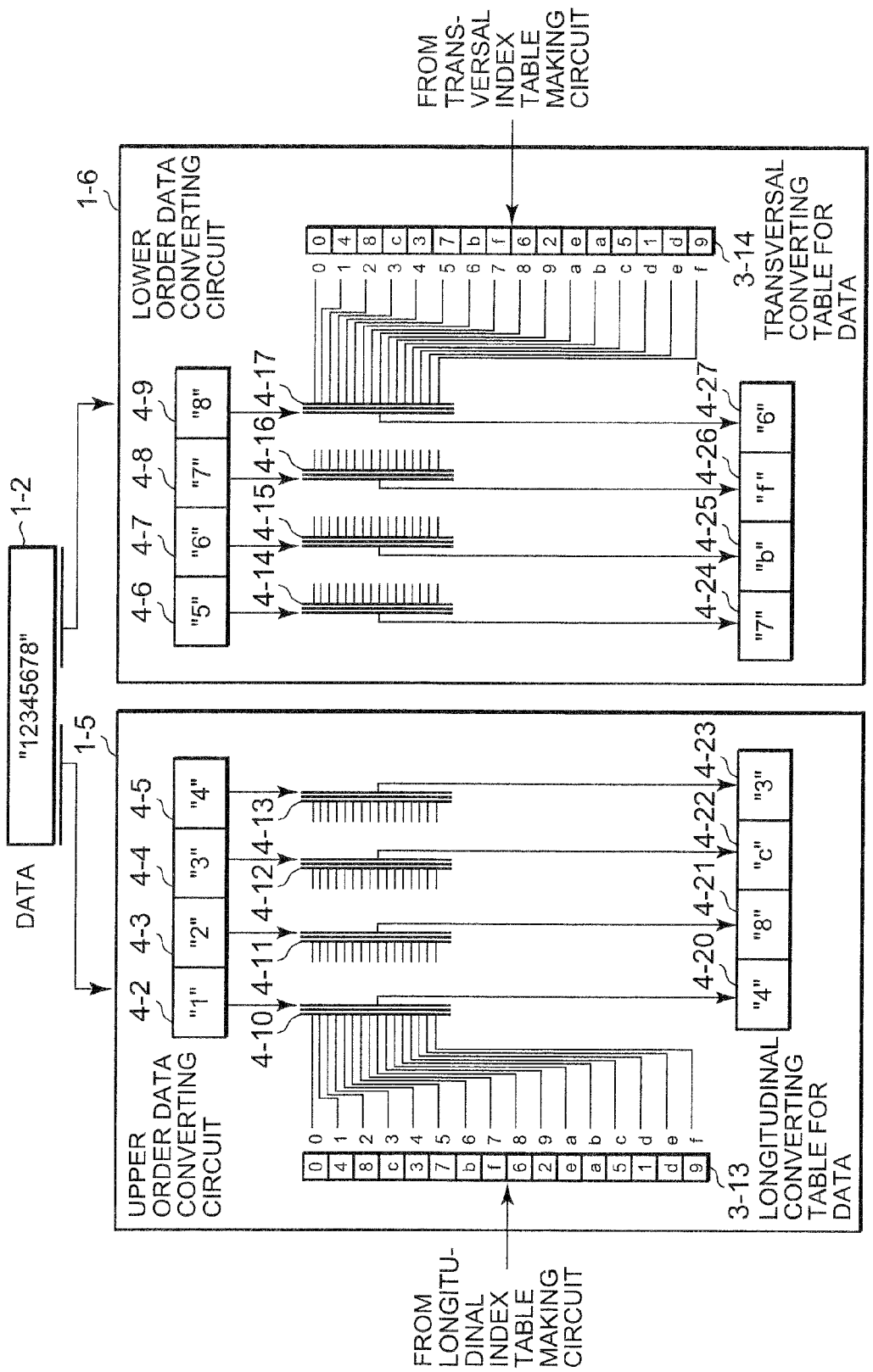
FIG. 5 is a view showing the details of an upper order data converting circuit and a lower order data converting circuit shown in FIG. 2.

Referring to FIG. 5, the upper order data converting circuit 1-5 performs the conversion of an upper order data portion with respect to the data 1-2. The upper order data portion of the data 1-2 is decomposed into respective decomposing data 4-2 to 4-5 of a four-bit unit, and becomes select signals of selectors 4-10 to 4-13. The upper order data converting circuit 1-5 is constructed so as to obtain an arithmetic result with respect to the multiplication coefficient 1-4 of the Galois field by selecting the longitudinal converting table 3-13 for data generated by the longitudinal index table making circuit 1-9.

The lower order data converting circuit 1-6 also has a circuit similar to the upper order data converting circuit 1-5. A lower order data portion of the data 1-2 is decomposed into respective decomposing data 4-6 to 4-9 of a four-bit unit, and becomes select signals of selectors 4-14 to 4-17. The lower order data converting circuit 1-6 is constructed so as to obtain an arithmetic result with respect to the multiplication coefficient 1-4 of the Galois field by selecting the transversal converting table 3-14 for data generated by the transversal index table making circuit 1-10.

Figure 6:
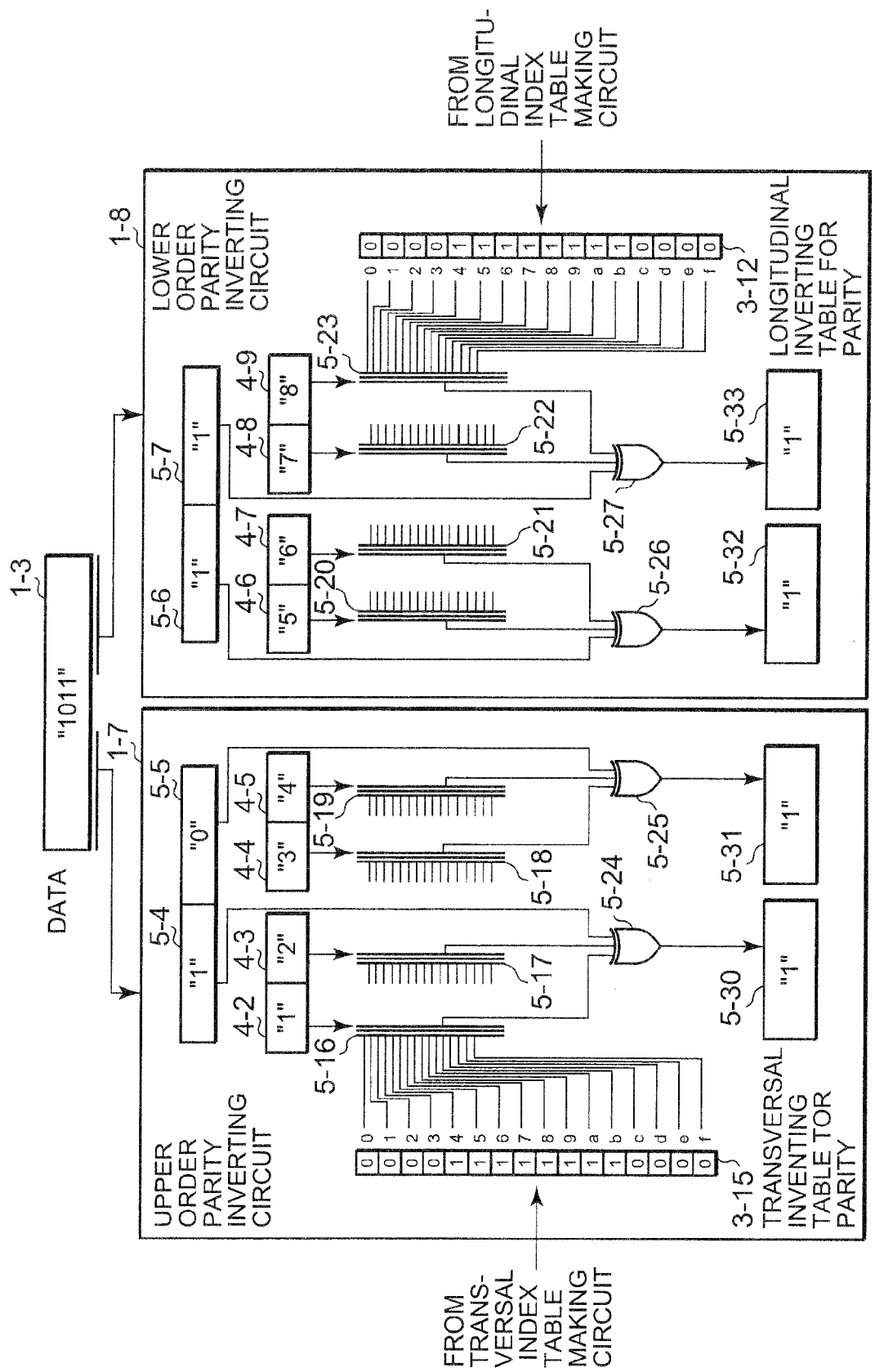
FIG. 6 is a view showing the details of an upper order parity inverting circuit and a lower order parity inverting circuit shown in FIG. 2.

Referring to FIG. 6, the upper order parity inverting circuit 1-7 performs the conversion of an upper order parity portion with respect to the parity 1-3. The upper order parity portion of the parity 1-3 is decomposed into parity bits 5-4 to 5-5 of a one-bit unit, and is given to XOR circuits 5-24 to 5-25. On the other hand, the upper order data portion of the data 1-2 is decomposed into respective decomposing data 4-2 to 4-5 of the four-bit unit, and becomes select signals of selectors 5-16 to 5-17. A result obtained by selecting the transversal inverting table 3-15 for parity generated by the transversal index table making circuit 1-10 is inputted to the XOR circuits 5-24 to 5-25. The outputs of the XOR circuits 5-24 to 5-25 become parity bits 5-30 to 5-31 of a one-bit unit in which the upper order parity portion is inverted.

The lower order parity inverting circuit 1-8 also has a circuit structure similar to the upper order parity inverting circuit 1-7, and performs the conversion of a lower order parity portion with respect to the parity 1-3. In the lower order parity portion of the parity 1-3, parity bits 5-6 to 5-7 of a one-bit unit are given to XOR circuits 5-26 to 5-27. On the other hand, the lower order data portion of the data 1-2 is decomposed into respective decomposing data 4-6 to 4-9 of the four-bit unit, and becomes select signals of selectors 5-20 to 5-23. A result obtained by selecting the longitudinal inverting table 3-12 for parity generated by the longitudinal index table making circuit 1-9 is inputted to XOR circuits 5-26 to 5-27. The outputs of the XOR circuits 5-24 to 5-25 become parity bits 5-32 to 5-33 of a one-bit unit in which the lower order parity portion of the parity 1-3 is inverted.

Thus, when each of the decomposing data 4-2 to 4-9 is incorrect, its parity bits 5-30 to 5-33 are also incorrect and an error is confirmed upon checking the parity.

Figure 7:
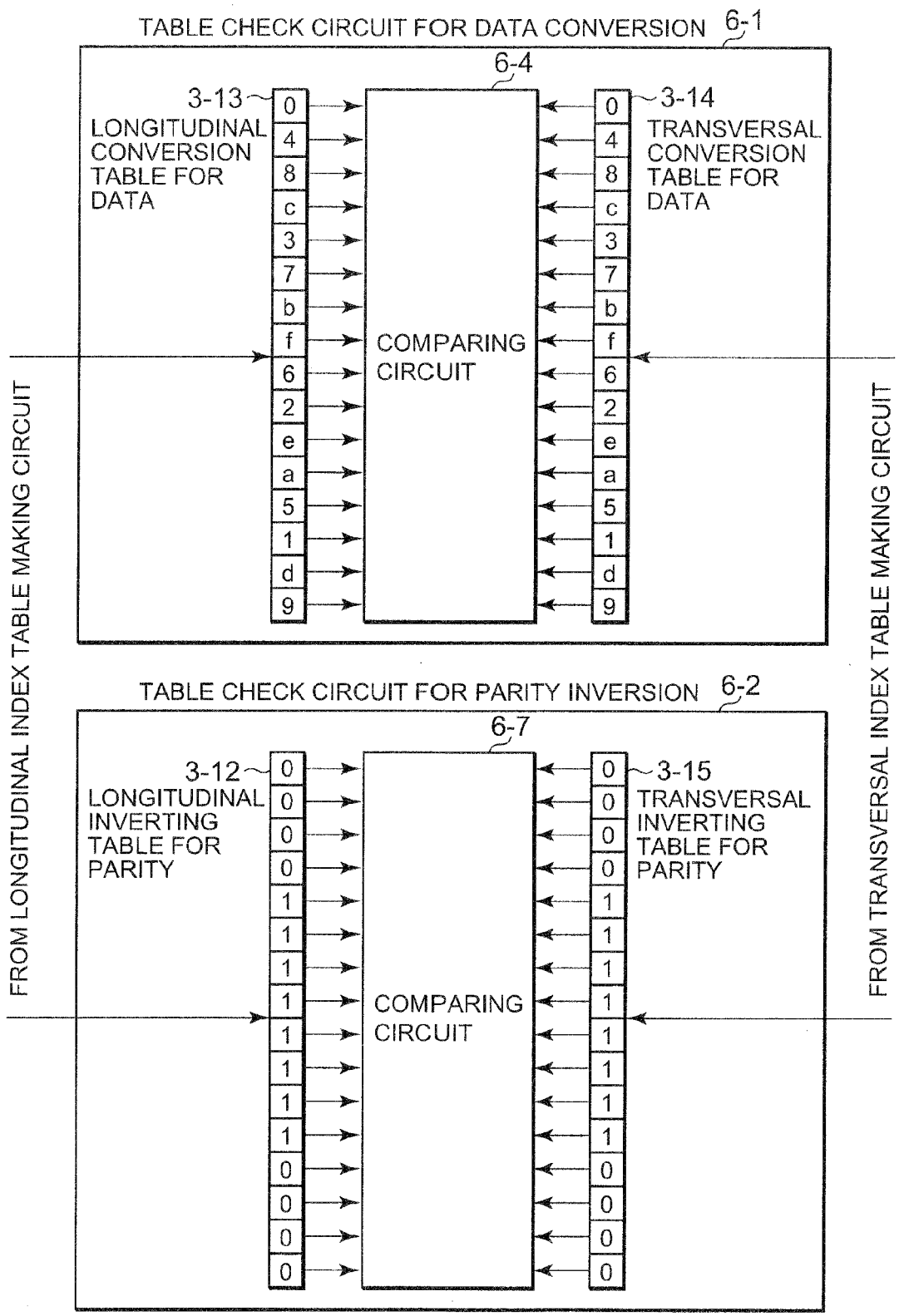
FIG. 7 is a view showing the details of a table check circuit for data conversion and a table check circuit for parity inversion in a table check circuit shown in FIG. 2.
Figure 8:
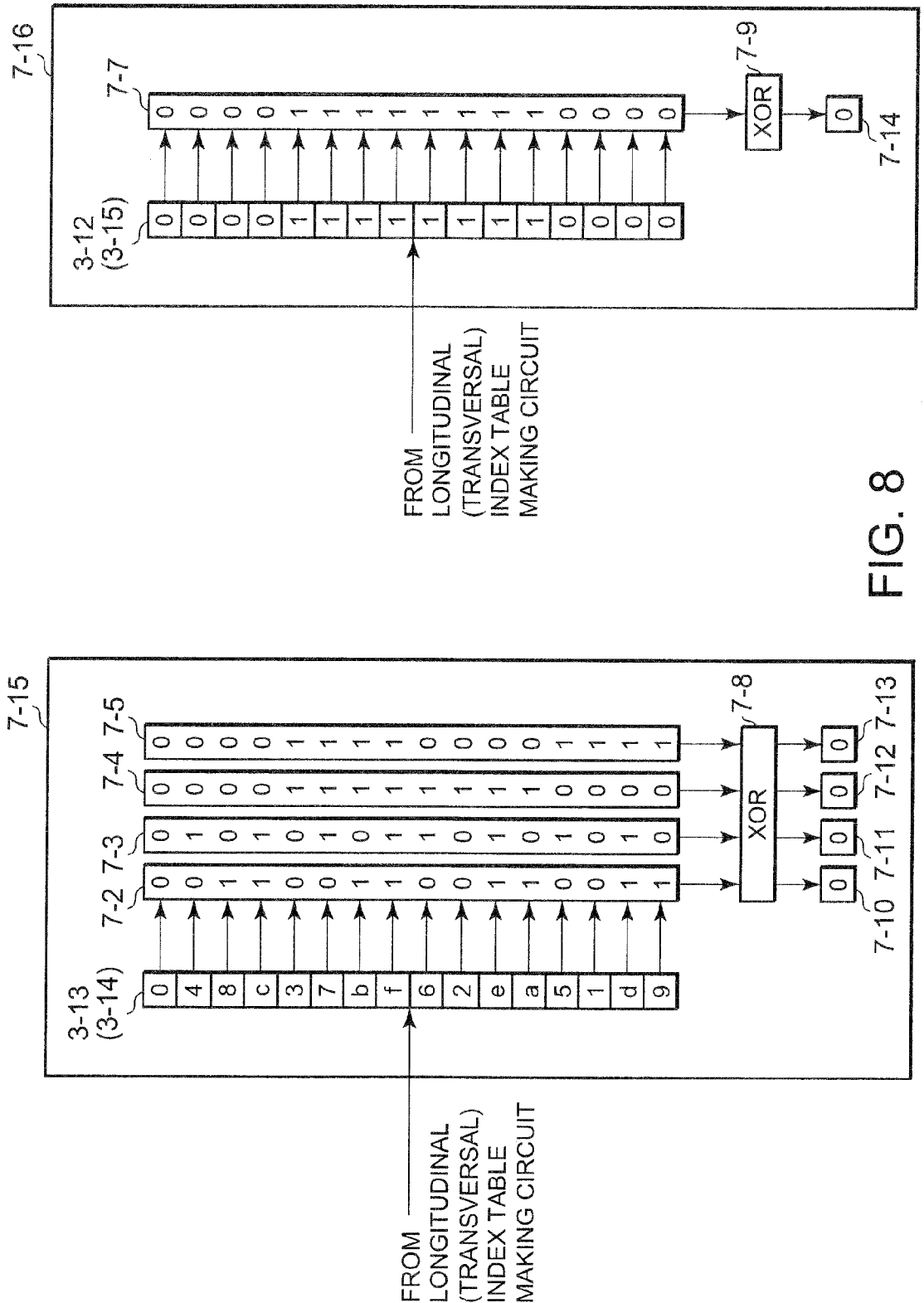
FIG. 8 is a view showing the details of a table zero check circuit in the table check circuit shown in FIG. 2.

FIGS. 7 and 8 show the detailed circuit construction of the table check circuit 1-14.

FIG. 7 shows a table check circuit 6-1 for data conversion for comparing and checking the longitudinal converting table 3-13 for data and the transversal converting table 3-14 for data. FIG. 7 also shows a table check circuit 6-2 for parity inversion for comparing and checking the longitudinal inverting table 3-12 for parity and the transversal inverting table 3-15 for parity.

The table check circuit 6-1 for data conversion serves to inspect conformity of the longitudinal converting table 3-13 for data generated by the longitudinal index table making circuit 1-9 and the transversal converting table 3-14 for data generated by the transversal index table making circuit 1-10 by a comparing circuit 6-4. The table check circuit 6-2 for parity inversion serves to inspect conformity of the longitudinal inverting table 3-12 for parity generated by the longitudinal index table making circuit 1-9 and the transversal inverting table 3-15 for parity generated by the transversal index table making circuit 1-10 by a comparing circuit 6-7. It is possible to inspect whether the longitudinal converting table 3-13 for data, the transversal converting table 3-14 for data, the longitudinal inverting table 3-12 for parity and the transversal inverting table 3-15 for parity themselves at the converting times of data and parity are correct by the above two kinds of the table check circuit 6-1 for data conversion and the table check circuit 6-2 for parity inversion.

FIG. 8 shows table zero check circuits 7-15 and 7-16. The table zero check circuit 7-15 inspects that an XOR logic of each bit unit becomes "0" by inputting the longitudinal converting table 3-13 for data or the transversal converting table 3-14 for data. The table zero check circuit 7-16 inspects that the XOR logic of the bit unit becomes "zero" by inputting the longitudinal inverting table 3-12 for parity or the transversal inverting table 3-15 for parity.

The table zero check circuit 7-15 respectively decomposes respective data of the longitudinal converting table 3-13 for data and the transversal converting table 3-14 for data generated by the longitudinal index table making circuit 1-9 and the transversal index table making circuit 1-10 into bits 7-2 to 7-5. The table zero check circuit 7-15 further performs all the XOR logic operations of the same bit series by an XOR circuit 7-8 and inspects that all their XOR logic results 7-10 to 7-13 become "0".

The table zero check circuit 7-16 decomposes the longitudinal inverting table 3-12 for parity or the transversal inverting table 3-15 for parity generated by the longitudinal index table making circuit 1-9 and the transversal index table making circuit 1-10 into a bit unit 7-7. The table zero check circuit 7-16 further performs all the XOR logic operations of a bit series by an XOR circuit 7-9, and inspects that its XOR logic result 7-14 becomes "0". Thus, the table zero check circuit 7-16 is constructed so as to inspect whether the Galois field multiplying table 1-11 itself has correct values.

Subsequently, explanation will be made of the operation of the parity data generating circuit 13 for RAID according to the embodiment 1 having the above-mentioned structure with reference to FIGS. 2 to 8.

In FIGS. 2 to 8, this operation will be explained in the case of 32 bits in data and four bits in parity. However, these bit numbers are one example, and the bit numbers are not restricted in the present invention.

When RAID5 and RAID6 are constructed, parity data for RAID are generated by the XOR logic for a data series constituting a group of the RAID from its characteristics.

In this event, when the parity data for RAID6 are generated, two kinds of parity data P and Q are required as already mentioned above. One case relates to generation of the parity data P equal to that of RAID5 conventionally used. Its generating method is sufficiently widened by a known technique. Therefore, this generating method is not described here, and the generation of the parity data Q specialized and required in RAID6 will be described.

The arithmetic calculation of the parity data Q specialized for RAID6 is shown by the above formula 2.

In FIG. 2, the multiplication coefficient 1-4 of the Galois field is transferred together with the data 1-2 and the parity 1-3. Herein, the data 1-2 have a value of 32 bits of "12345678" in the hexadecimal notation, and its parity 1-3 has a value of odd parity of four bits of "B". The multiplication coefficient 1-4 at this time will be explained as "4".

This explanation is made when the arithmetic calculation of a term "4D5" within the formula 2 is intended to be performed, and is an explanation of the multiplying calculation of the Galois field when "D5" becomes the value of "12345678".

Since the multiplication coefficient 1-4 is "4", the longitudinal index table making circuit 1-9 selects a column corresponding to "4" of the multiplication coefficient 1-4 from the conversion table 3-6 for data by the selector 3-9, and generates the longitudinal converting table 3-13 for data having a value of "048C37BF62EA51D9", and transfers this longitudinal converting table 3-13 for data to the upper order data converting circuit 1-5. Simultaneously, the longitudinal index table making circuit 1-9 selects a column corresponding to "4" of the multiplication coefficient 1-4 from the conversion table 3-5 for parity by the selector 3-8, and generates the longitudinal inverting table 3-12 for parity having a value of "0000111111110000" (binary notation), and transfers this longitudinal inverting table 3-12 for parity to the lower order parity inverting circuit 1-8.

Further, similar to the longitudinal index table making circuit 1-9, the transversal index table making circuit 1-10 selects a row corresponding to "4" of the multiplication coefficient 1-4 from the conversion table 3-6 for data by the selector 3-10, and generates the transversal converting table 3-14 for data having a value of "048C37BF62EA51D9" and transfers this transversal converting table 3-14 for data to the lower order data converting circuit 1-6. Simultaneously, the transversal index table making circuit 1-10 selects a row corresponding to "4" of the multiplication coefficient 1-4 from the conversion table 3-7 for parity by the selector 3-11, and generates the transversal inverting table 3-15 for parity having a value of "0000111111110000" (binary notation) and transfers this transversal inverting table 3-15 for parity to the upper order parity inverting circuit 1-7.

Thus, the longitudinal converting table 3-13 for data and the transversal converting table 3-14 for data, and the longitudinal inverting table 3-12 for parity and the transversal inverting table 3-15 for parity are generated. The right property of values is confirmed by the table check circuit 6-1 for data conversion and the table check circuit 6-2 for parity inversion in the table check circuit 1-14, and the table zero check circuits 7-15 and 7-16.

In the table check circuit 1-14, the table check circuit 6-1 for data conversion respectively compares the longitudinal converting table 3-13 for data and the longitudinal inverting table 3-12 for parity generated by the longitudinal index table making circuit 1-9, and the transversal converting table 3-14 for data and the transversal inverting table 3-15 for parity generated by the transversal index table making circuit 1-10. When these tables are not conformed to each other, this unconformity is detected as a failure of the disk array system.

Similarly, in the table check circuit 1-14, the table zero check circuit 7-15 inspects whether all XOR arithmetic results 7-10 to 7-13 of a bit unit of the longitudinal converting table 3-13 for data and the transversal converting table 3-14 for data are zero. When these results become values except for zero, this case is also detected as a failure of the disk array system. Further, the table zero check circuit 7-16 inspects whether the XOR arithmetic result 7-9 of the longitudinal inverting table 3-12 for parity and the transversal inverting table 3-15 for parity is zero. When this arithmetic result becomes a value except for zero, this case is also detected as a failure of the disk array system.

When no error is detected in the table check circuit 6-1 for data conversion and the table check circuit 6-2 for parity inversion and the table zero check circuits 7-15 and 7-16, the actual parity data Q for RAID are generated and the data 1-2 and the parity 1-3 are transferred to the upper order data converting circuit 1-5, the lower order data converting circuit 1-6, the upper order parity inverting circuit 1-7 and the lower order parity inverting circuit 1-8.

The upper order data converting circuit 1-5 receives a value of "1234" as upper order 16 bits of the data 1-2 of 32 bits, and decomposes this value into respective decomposing data 4-2 to 4-5 of a four-bit unit.

These respective decomposing data 4-2 to 4-5 of the four-bit unit become select signals of respective selectors 4-10 to 4-13. The selectors 4-10 to 4-13 select respective values of the longitudinal converting table 3-13 for data.

In the case of the decomposing data 4-2 having a value of "1", "4" located in the place of "1" in the longitudinal converting table 3-13 for data becomes a value after the conversion. Therefore, generated parity data 4-20 for RAID show "4". When a similar operation is performed with respect to all the respective decomposing data 4-2 to 4-5, parity data 4-20 to 4-23 for RAID are generated and the value becomes "48c3".

Moreover, a similar operation is performed with respect to "5678" as lower order 16 bits of the data 1-2. In this case, the conversion is performed by the transversal converting table 3-14 for data generated by the transversal index table making circuit 1-10 and selectors 4-14 to 4-17, and parity data 4-24 to 4-27 for RAID becoming "7BF6" are generated and the conversion of the data 1-2 into data 1-12 is completed.

On the other hand, the odd parity 1-3 with respect to the data 1-2 is decomposed into parity bits 5-4 to 5-5 and parity bits 5-6 to 5-7 every two bits, and these parity bits are respectively processed by the upper order parity inverting circuit 1-7 and the lower order parity inverting circuit 1-8.

The upper order parity inverting circuit 1-7 further decomposes upper order two bits of the parity 1-3 every one bit, and holds these upper order two bits as the parity bits 5-4 and 5-5. The upper order parity inverting circuit 1-7 then selects the transversal inverting table 3-15 for parity by the respective decomposing data 4-2 to 4-5 corresponding to these parity bits 5-4 and 5-5 by selectors 5-16 to 5-19. The upper order parity inverting circuit 1-7 further converts the parity by performing the XOR logic operation by this selected value and the XOR circuits 5-24 and 5-25. The parity bit 5-4 of a first bit is byte parity of the decomposing data 4-2 and the decomposing data 4-3 of the four-bit unit. Therefore, all the XOR logic operations of a selecting result "0" using the value of "1" of the decomposing data 4-2 and a selecting result "0" using the value of "2" of the decomposing data 4-3 are performed by the XOR circuit 5-24. Therefore, the arithmetic calculation of "1"XOR"0"XOR"0" is performed and its result becomes parity bit 5-30 having a value of "1".

This operation is similarly performed with respect to the parity bit 5-5 so that the parity bit 5-5 can be converted into a parity bit 5-31 for RAID.

In the lower order parity inverting circuit 1-8, parity bits 5-6 and 5-7 can be also converted into parity bits 5-32 and 5-33 for RAID by processing similar to that of the upper order parity inverting circuit 1-7.

The data 1-2 having the value of "12345678" and the parity 1-3 having the value of "F" are converted by the multiplication coefficient 1-4 having the value of "4" by these processings, and become data 1-12 of a value of "48C37BF6" and parity 1-13 of its value "F". Thus, data able to be judged as correct data by the parity check circuit 1-15 are generated.

Then, the data 1-12 and the parity 1-13 parity-checked by the parity check circuit 1-15 are stored to the buffer 1-17. At this time, previously stored data and parity are read from the buffer 1-17, and the XOR logic operation with respect to the read data and parity is performed by the XOR circuit 1-16, and a write-returning operation to the buffer 1-17 is carried out. Thus, a product sum of each term of the above formula 2 is generated and these operations are also applied to the new data 1-2 and the new multiplication coefficient 1-4 and are repeated. Thus, the generation of the parity data Q for RAID in the formula 2 can be realized.

Here, explanation will be made with respect to the following operations performed when there is a failure in hardware by wiring cutting, etc.

(1) In case where the Galois field multiplying table 1-11 itself and a relating circuit are broken and no correct conversion tables 3-5 to 3-7 can be indexed.

The case of (1) is cases in which a certain one portion of the Galois field multiplying table 1-11 is broken by an electric short circuit, etc., and no tables 3-12 to 3-15 can be correctly indexed, etc. In these cases, a countermeasure is taken by the table check circuit 6-1 for data conversion and the table check circuit 6-2 for parity inversion, and the table zero check circuits 7-15 and 7-16.

In this countermeasure, the Galois field multiplying table 1-11 is indexed in a case in which the multiplication coefficient 1-4 shows "4". As a result, if the longitudinal converting table 3-13 for data shows a correct value of "048C37BF62EA51D9" and the other transversal converting table 3-14 for data has an influence due to the failure and indexes a number of "048C37BF62EA51D0" changed from "9" into "0" in the final four bits, a comparing error is detected by the table check circuit 6-1 for data conversion.

Further, since the conversion table 3-6 for data is simultaneously indexed by the same multiplication coefficient 1-4 from the transversal direction and the longitudinal direction, there are characteristics in which the same term (diagonal component) is always referred with respect to one value. Therefore, when the longitudinal converting table 3-13 for data shows a value "048C07BF62EA51D9" and the transversal converting table 3-14 for data also shows the same value "048C07BF62EA51D9" and the failure is caused such that the term to be indexed as the same "3" is changed into "0", this failure cannot be detected by the table check circuit 6-1 for data conversion, but can be checked by the table zero check circuit 7-15.

This is a result in which the arithmetic calculation is performed by the bit unit. Its result shows "0011" (binary notation), and this failure can be found since "0000" is not shown.

(2) in case where no parity check circuit 1-15 functions by a failure.

The case of (2) is a case in which an error detecting circuit such as the parity check circuit 1-15 or the like is broken and no error can be found. In this case, no error can be found by the parity data generating circuit 13 for RAID itself according to this embodiment 1.

With respect to this, the upper order data portion of the data 1-2 and the lower order parity portion of the parity 1-3 are converted by a result of the longitudinal index table making circuit 1-6 in the upper order data converting circuit 1-5 and the lower order data converting circuit 1-6, and the upper order parity inverting circuit 1-7 and the lower order parity inverting circuit 1-8. A circuit construction for converting the lower order data portion of the data 1-2 and the upper order parity portion of the parity 1-3 by a result of the transversal index table making circuit 1-10 is used. Even when the parity check circuit 1-15 located after these converting circuits is broken, a parity error is always caused in the parity data Q for RAID themselves and a circuit unable to judge data as correct data by incorrect data and incorrect parity can be realized. Therefore, it is possible to judge the error by a device at a transfer destination treating the parity data Q for RAID so that the disk array device 5 having high reliability can be provided.

Thus, according to this embodiment 1, there is an effect in which a hardware failure of the Galois field multiplying circuit 1-21 itself can be found. This is because the Galois field multiplying table 1-11 is indexed in the longitudinal direction by the longitudinal index table 1-9 and is indexed in the transversal direction by the transversal index table 1-10, and the indexing results are checked by the table check circuit 1-14.

Further, in the conversion of data and its parity, there is an effect which the hardware failure can be reliably found by the parity error. This is because the Galois field multiplying table 1-11 is indexed in the longitudinal direction by the longitudinal index table 1-9 and is indexed in the transversal direction by the transversal index table 1-10, and the upper order data conversion and the lower order parity conversion are performed by using the index result of the longitudinal direction, and the lower order data conversion and the upper order parity conversion are performed by using the index result of the transversal direction, and the parity error is checked by the parity check circuit 1-15.

In addition, there is an effect in which a circuit for judging no data as correct data in error by a circuit failure is obtained, and the parity data generating circuit 13 for RAID of higher reliability can be provided. This is because the parity before the conversion is propagated in shape and all failure factors are reflected in the generated parity even when the parity check circuit 1-15 for checking the result of the multiplying calculation of the Galois field are broken and the failure of the Galois field multiplying circuit 1-21 itself at this breaking time is generated.

Embodiment 2

Figure 9:
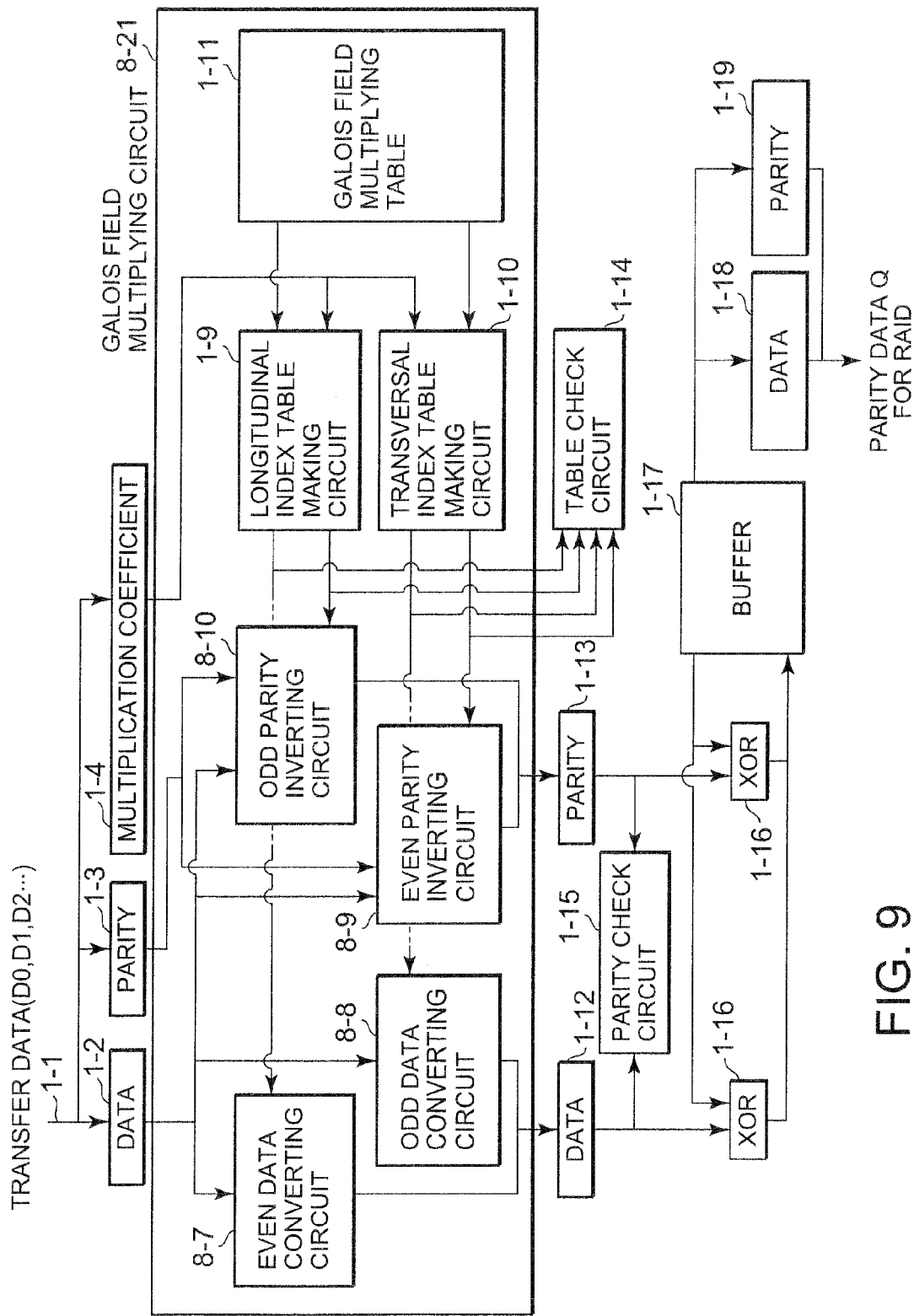
FIG. 9 is a circuit block diagram showing the construction of a parity data generating circuit for RAID in accordance with an embodiment 2 of the present invention.

FIG. 9 is a block diagram showing the construction of a parity data generating circuit 13 for RAID in accordance with an embodiment 2 of the present invention. The basic construction of the parity data generating circuit 13 for RAID in accordance with the embodiment 2 is similar to that of the parity data generating circuit 13 for RAID in accordance with the embodiment 1 shown in FIG. 2. However, a Galois field multiplying circuit 8-21 in FIG. 9 shows a structure in which a data converting circuit portion and a parity inverting circuit portion are not divided into an upper order data portion/a lower order data portion of the data 1-2, but are divided into an odd data position/an even data position.

More specifically, the Galois field multiplying circuit 8-21 comprises a Galois field multiplying table 1-11, a longitudinal index table making circuit 1-9, a transversal index table making circuit 1-10, an even data converting circuit 8-7, an odd data converting circuit 8-8, an even parity inverting circuit 8-9 and an odd parity inverting circuit 8-10. The longitudinal index table making circuit 1-9 generates index table information of the longitudinal direction by indexing the Galois field multiplying table 1-11 from the longitudinal direction by using the multiplication coefficient 1-4. Similarly, the transversal index table making circuit 1-10 generates index table information of the transversal direction by indexing the Galois field multiplying table 1-11 from the transversal direction by using the multiplication coefficient 1-4. The even data converting circuit 8-7 and the odd data converting circuit 8-8 convert the data 1-2 into data 1-12 for RAID from the generated index table information. Similarly, the even parity inverting circuit 8-9 and the odd parity inverting circuit 8-10 convert parity 1-3 with respect to the data 1-2 into parity 1-13 with respect to the data 1-12 for RAID.

Figure 10:
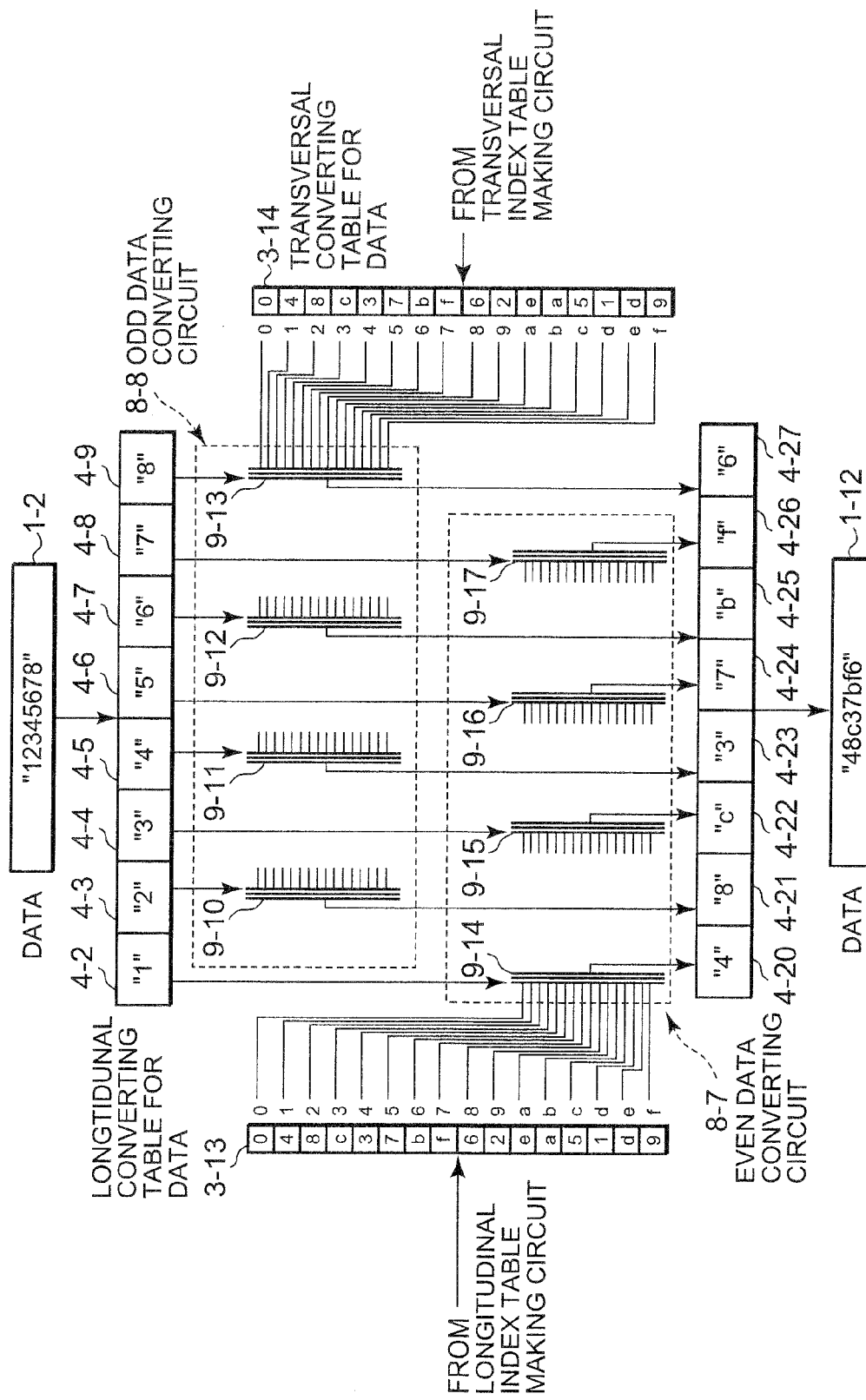
FIG. 10 is a view showing the details of an even data converting circuit and an odd data converting circuit shown in FIG. 9.

FIG. 10 shows the even data converting circuit 8-7 and the odd data converting circuit 8-8. The even data converting circuit 8-7 and the odd data converting circuit 8-8 have circuit constructions similar to those of the upper order data converting circuit 1-5 and the lower order data converting circuit 1-6 of FIG. 5, but differ from the upper order data converting circuit 1-5 and the lower order data converting circuit 1-6 of FIG. 5 only in the positions of data converted by the same longitudinal converting table 3-13 for data and transversal converting table 3-14 for data.

The even data converting circuit 8-7 receives each value of "1", "3", "5", "7" set to even data positions from respective decomposing data 4-2 to 4-9 of a four-bit unit of the data 1-2 of 32 bits, and sets each value to a select signal of each of selectors 9-14 to 9-17. The selectors 9-14 to 9-17 select each value of the longitudinal converting table 3-13 for data. Thus, the values respectively become "4", "C", "7", "F" as parity data 4-20, 4-22, 4-24, 4-26 for RAID.

Moreover, the odd data converting circuit 8-8 receives each value of "2", "4", "6", "8" set to odd data positions from the respective decomposing data 4-2 to 4-9 of the four-bit unit of the data 1-2 of 32 bits, and sets each value to a select signal of each of selectors 9-10 to 9-13. The selectors 9-10 to 9-13 select each value of the transversal converting table 3-14 for data. Thus, the values respectively become "8", "3", "B", "6" as parity data 4-21, 4-23, 4-25, 4-27 for RAID.

Figure 11:
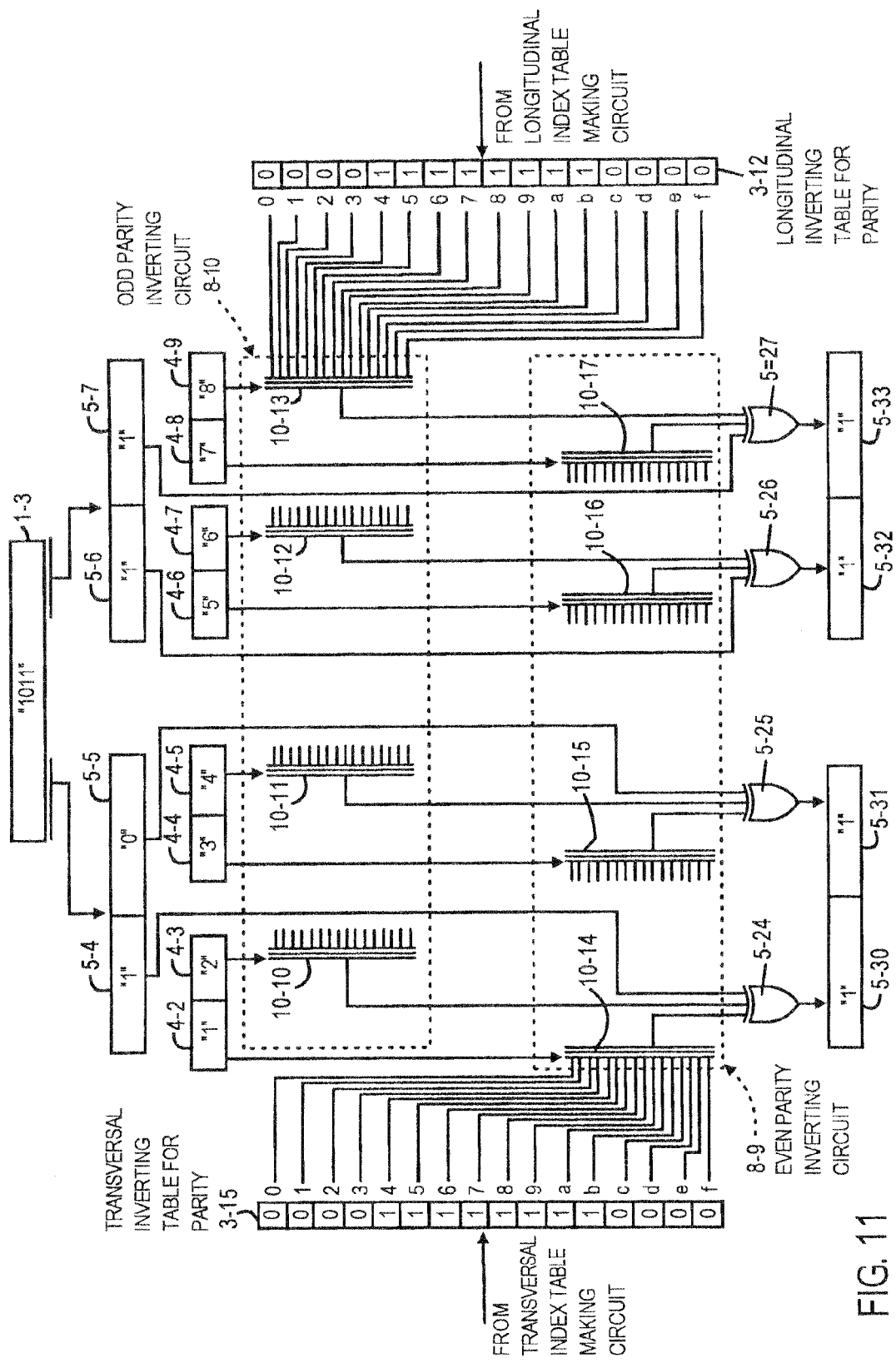
FIG. 11 is a view showing the details of an even parity inverting circuit and an odd parity inverting circuit shown in FIG. 9.

FIG. 11 shows the even parity inverting circuit 8-9 and the odd parity inverting circuit 8-10. The even parity inverting circuit 8-9 and the odd parity inverting circuit 8-10 also have circuit constructions similar to those of the upper order parity inverting circuit 1-7 and the lower order parity inverting circuit 1-8 of FIG. 6, but differ from the upper order parity inverting circuit 1-7 and the lower order parity inverting circuit 1-8 of FIG. 6 only in the positions of data converted by the same longitudinal converting table 3-12 and transversal converting table 3-15.

The even parity inverting circuit 8-9 further decomposes upper order two bits of the parity 1-3 every one bit and holds the upper order two bits as parity bits 5-4 and 5-5. The even parity inverting circuit 8-9 also selects the transversal inverting table 3-15 for parity and the longitudinal inverting table 3-12 for parity by the respective decomposing data 4-2 to 4-5 corresponding to their parity bits 5-4 and 5-5 by means of selectors 10-14 to 10-15 and 10-16 to 10-17. The even parity inverting circuit 8-9 further converts the parity by performing the XOR logic operation by these selected values and XOR circuits 5-24 and 5-25. The parity bit 5-4 of a first bit is byte parity of the decomposing data 4-2 and the decomposing data 4-3 of the four-bit unit. Therefore, all the XOR logic operations of a selecting result "0" using a value of "1" of the decomposing data 4-2 and a selecting result "0" using a value of "2" of the decomposing data 4-3 are performed by the XOR circuit 5-24. Therefore, the arithmetic calculation of "1"XOR"0"XOR"0" is made and its result becomes a parity bit 5-30 having the value of "1". Similarly, the parity bit 5-5 of a second bit becomes a parity bit 5-31 having the value of "0".

Further, the odd parity inverting circuit 8-10 further decomposes lower order two bits of the parity 1-3 every one bit, and holds the lower order two bits as parity bits 5-6 and 5-7. The odd parity inverting circuit 8-10 selects the transversal inverting table 3-15 for parity and the longitudinal inverting table 3-12 for parity by the respective decomposing data 4-6 to 4-9 corresponding to these parity bits 5-6 and 5-7 by means of selectors 10-10 to 10-11 and 10-14 to 10-15. The odd parity inverting circuit 8-10 also converts the parity by performing the XOR logic operation by these selected values and XOR circuits 5-26 and 5-27. The parity bit 5-6 of a third bit is byte parity of the decomposing data 4-6 and the decomposing data 4-7 of the four-bit unit. Therefore, all the XOR logic operations of a selecting result "0" using a value of "5" of the decomposing data 4-6 and a selecting result "0" using a value of "6" of the decomposing data 4-7 are performed by the XOR circuit 5-26. Therefore, the arithmetic calculation of "1"XOR"0"XOR"0" is made and its result becomes a parity bit 5-32 having the value of "1". Similarly, the parity bit 5-7 of a fourth bit becomes a parity bit 5-33 having the value of "1".

In the parity data generating circuit 13 for RAID having the above-mentioned structure according to the embodiment 2, an operation and an effect similar to those of the parity data generating circuit 13 for RAID in accordance with the embodiment 1 are also naturally obtained, and therefore, an explanation of its detailed operation is omitted here.

In particular, according to this embodiment 2, there is an effect in which a hardware failure can be reliably found by a parity error even in the conversion of data and its parity different from those of the embodiment 1. This is because the Galois field multiplying table 1-11 is indexed in the longitudinal direction by the longitudinal index table 1-9 and is indexed in the transversal direction by the transversal index table 1-10, and the even data conversion and the odd parity conversion are performed by using the index result of the longitudinal direction, and the odd data conversion and the even parity conversion are performed by using the index result of the transversal direction, and the parity error is checked by the parity check circuit 1-15.

Embodiment 3

Figure 12:
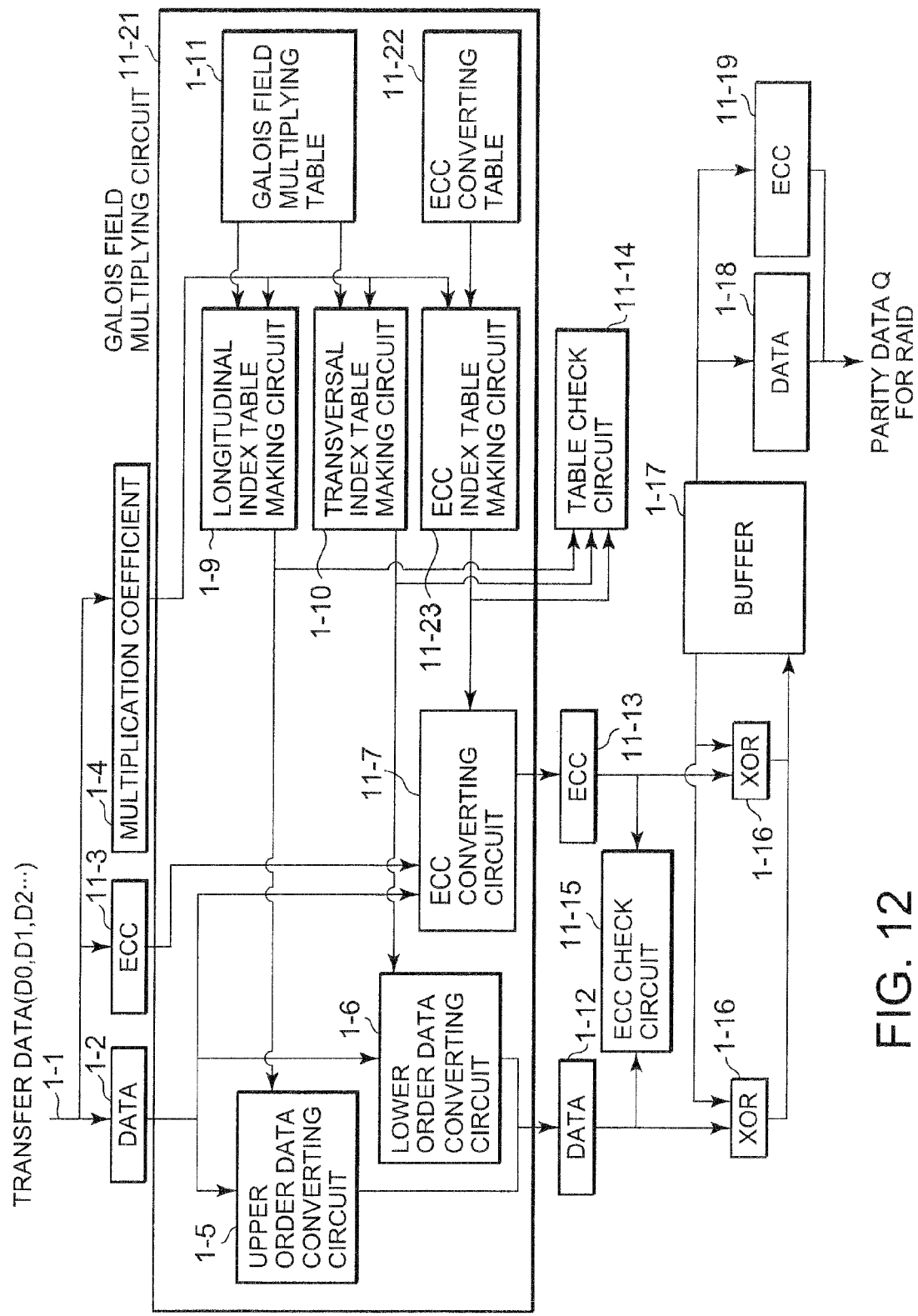
FIG. 12 is a circuit block diagram showing the construction of the parity data generating circuit for RAID when check coding in accordance with an embodiment 3 of the present invention is performed by ECC.

FIG. 12 is a block diagram showing the construction of a parity data generating circuit 13 for RAID in accordance with an embodiment 3 of the present invention. The basic construction of the parity data generating circuit 13 for RAID in accordance with the embodiment 3 is similar to that of the parity data generating circuit 13 for RAID in accordance with the embodiment 1 shown in FIG. 2. However, the parity data generating circuit 13 for RAID in FIG. 12 is constructed when a check code is set to ECC 11-3 instead of parity. More particularly, the parity data generating circuit 13 for RAID comprises a Galois field multiplying circuit 11-21, a table check circuit 11-14, an ECC check circuit 11-15, two XOR circuits 1-16 and a buffer 1-17. The Galois field multiplying circuit 11-21 makes a Galois field multiplying calculation by inputting the data 1-2, the ECC 11-3 and the multiplication coefficient 1-4. The table check circuit 11-14 checks whether index table information generated by the Galois field multiplying circuit 11-21 is correct. The ECC check circuit 11-15 checks the ECC by using the data 1-12 and the ECC 11-13 generated by the Galois field multiplying circuit 11-21. The XOR circuit 1-16 performs an XOR logic arithmetic operation with respect to the data 1-12 and the ECC 11-13 generated by the Galois field multiplying circuit 11-21. The buffer 1-17 accumulates the arithmetic result in the XOR circuit 1-16 as parity data Q for RAID.

The Galois field multiplying circuit 11-21 includes a Galois field multiplying table 1-11, a longitudinal index table making circuit 1-9, a transversal index table making circuit 1-10, an upper order data converting circuit 1-5, a lower order data converting circuit 1-6, an ECC converting circuit 11-7, an ECC converting table 11-22 and an ECC index table making circuit 11-23. The longitudinal index table making circuit 1-9 generates index table information of the longitudinal direction by indexing the Galois field multiplying table 1-11 from the longitudinal direction by using the multiplication coefficient 1-4. Similarly, the transversal index table making circuit 1-10 generates index table information of the transversal direction by indexing the Galois field multiplying table 1-11 from the transversal direction by using the multiplication coefficient 1-4. The upper order data converting circuit 1-5 and the lower order data converting circuit 1-6 convert the data 1-2 into data 1-12 for RAID from the generated index table information. Similarly, the ECC converting circuit 11-7 converts the ECC 11-3 with respect to the data 1-2 into ECC 11-13 with respect to the data 1-12 for RAID. The ECC index table making circuit 11-23 generates a conversion table for ECC by indexing the ECC converting table 11-22 by using the multiplication coefficient 1-4.

Figure 13A:
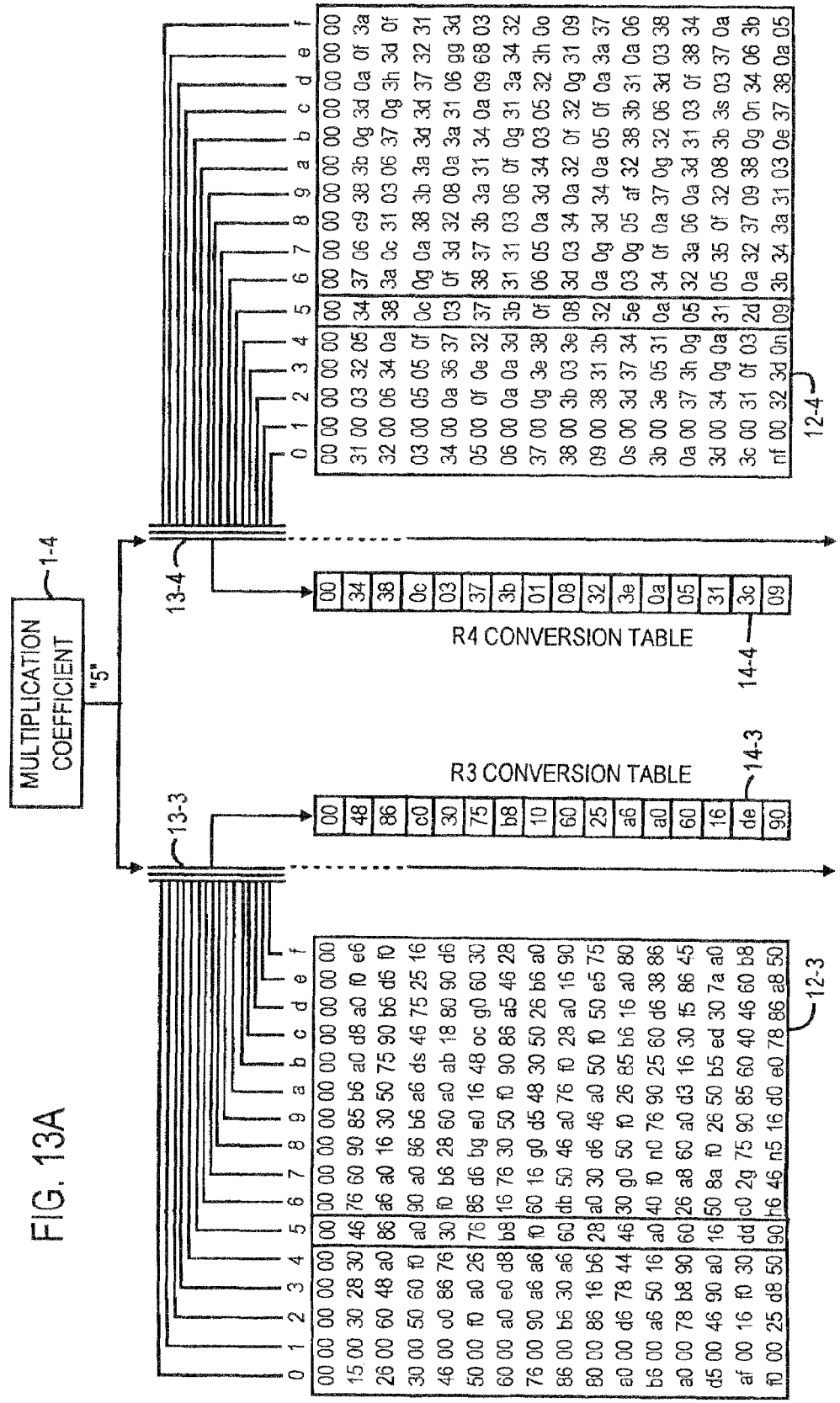
FIG. 13 is a view showing the details of an index table making circuit shown in FIG. 12.
Figure 13C:
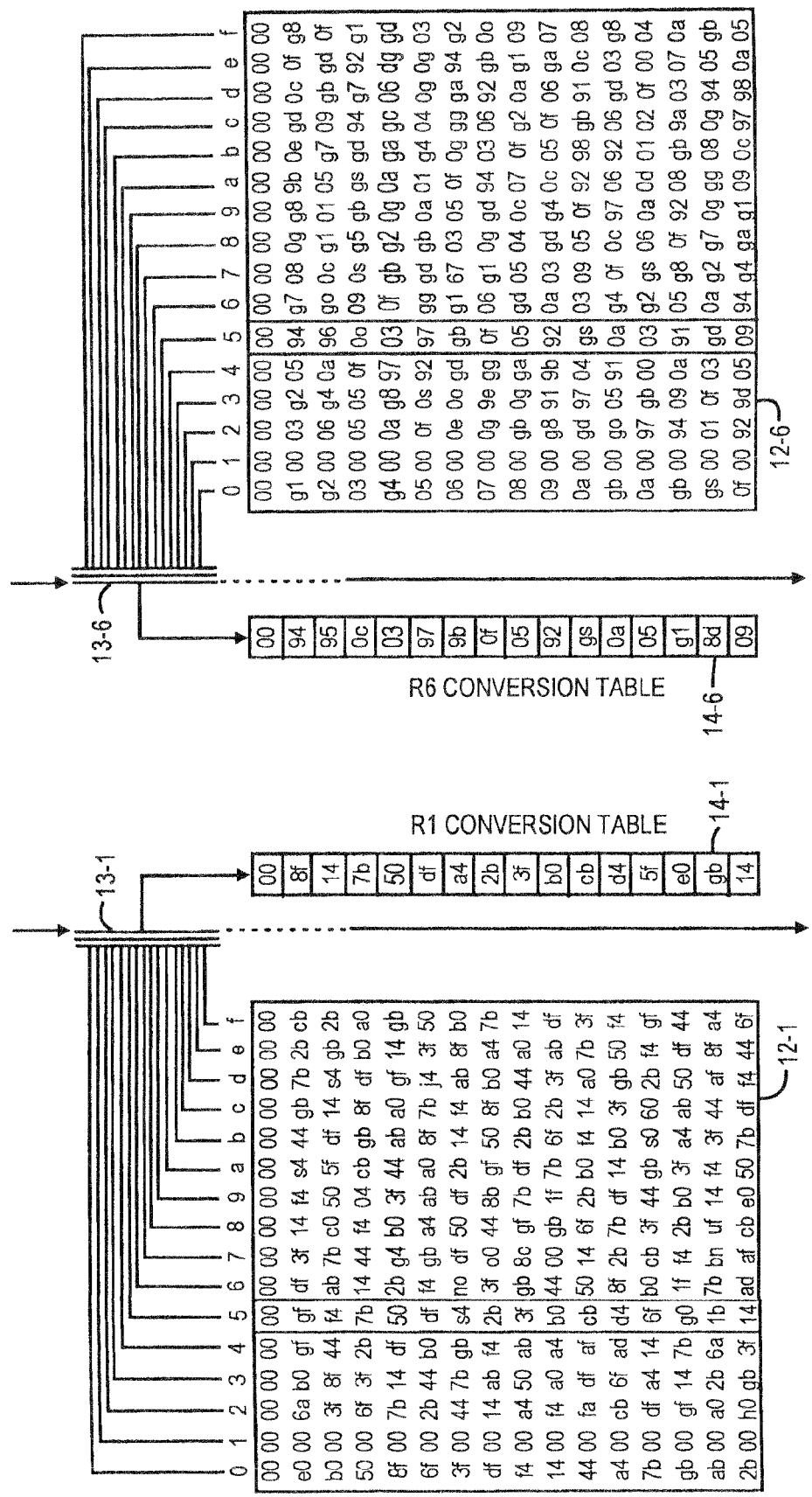
Figure 13D:
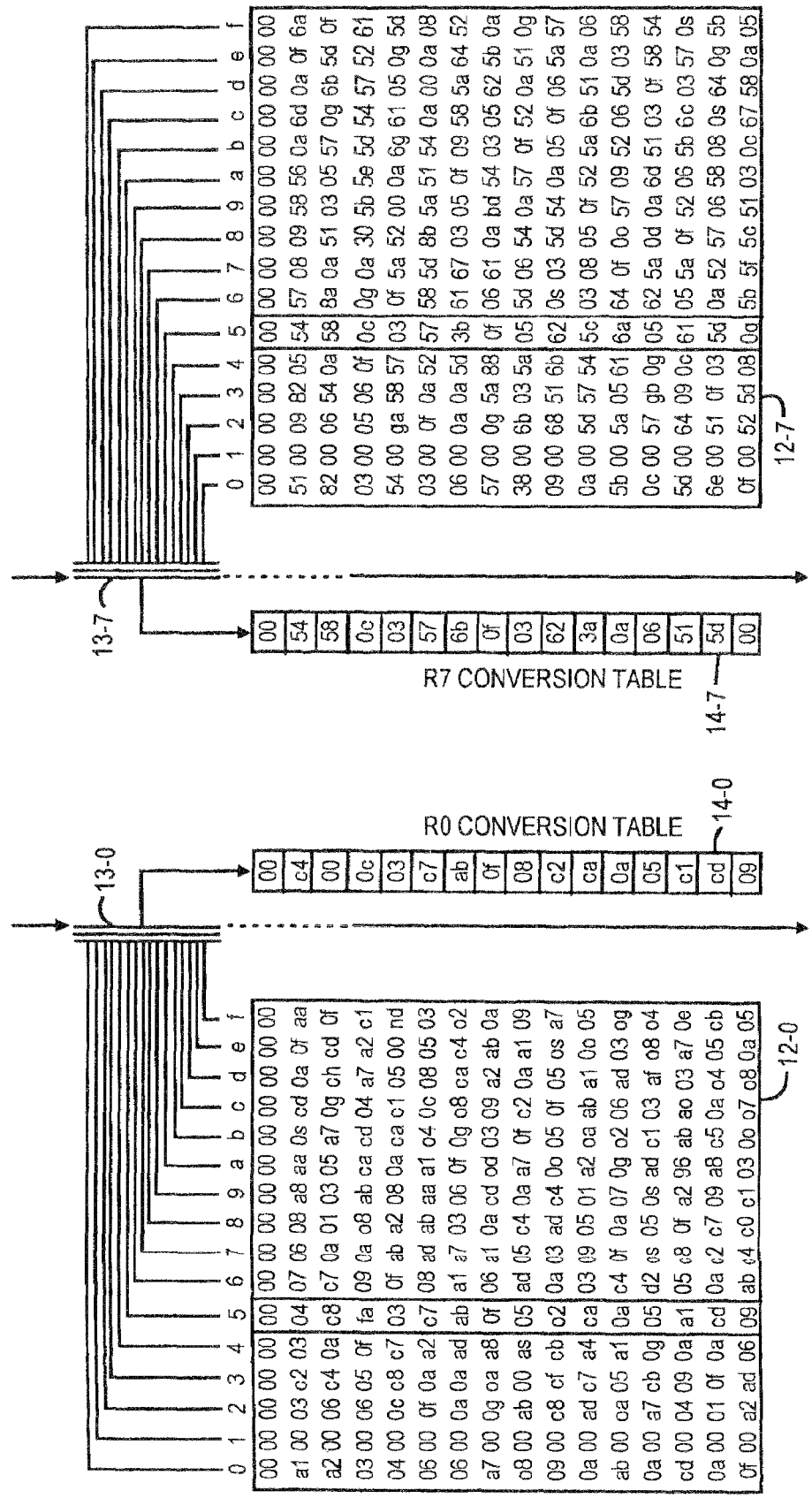
Figure 14A:
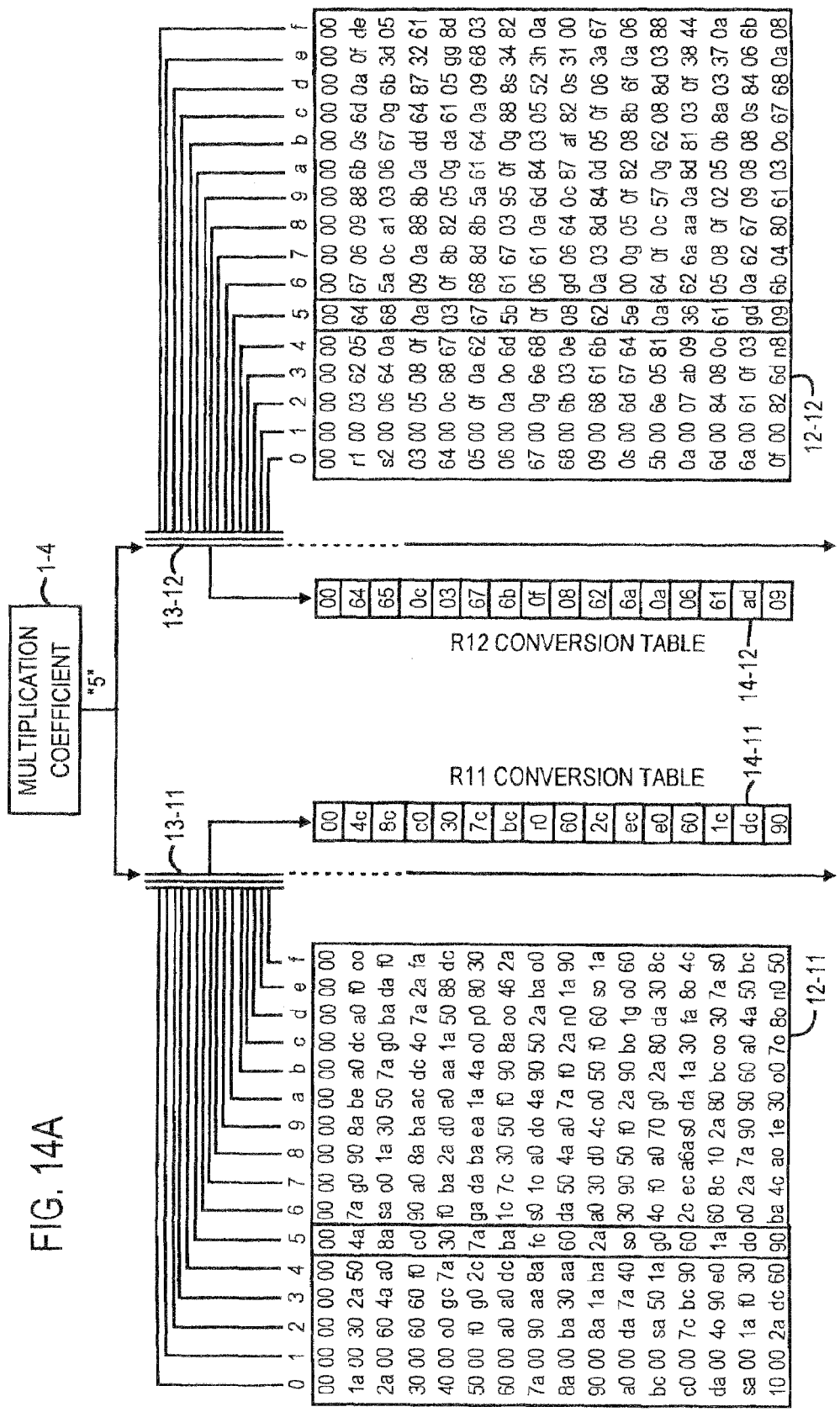
FIG. 14 is a view showing the details of the index table making circuit shown in FIG. 12.
Figure 14B:
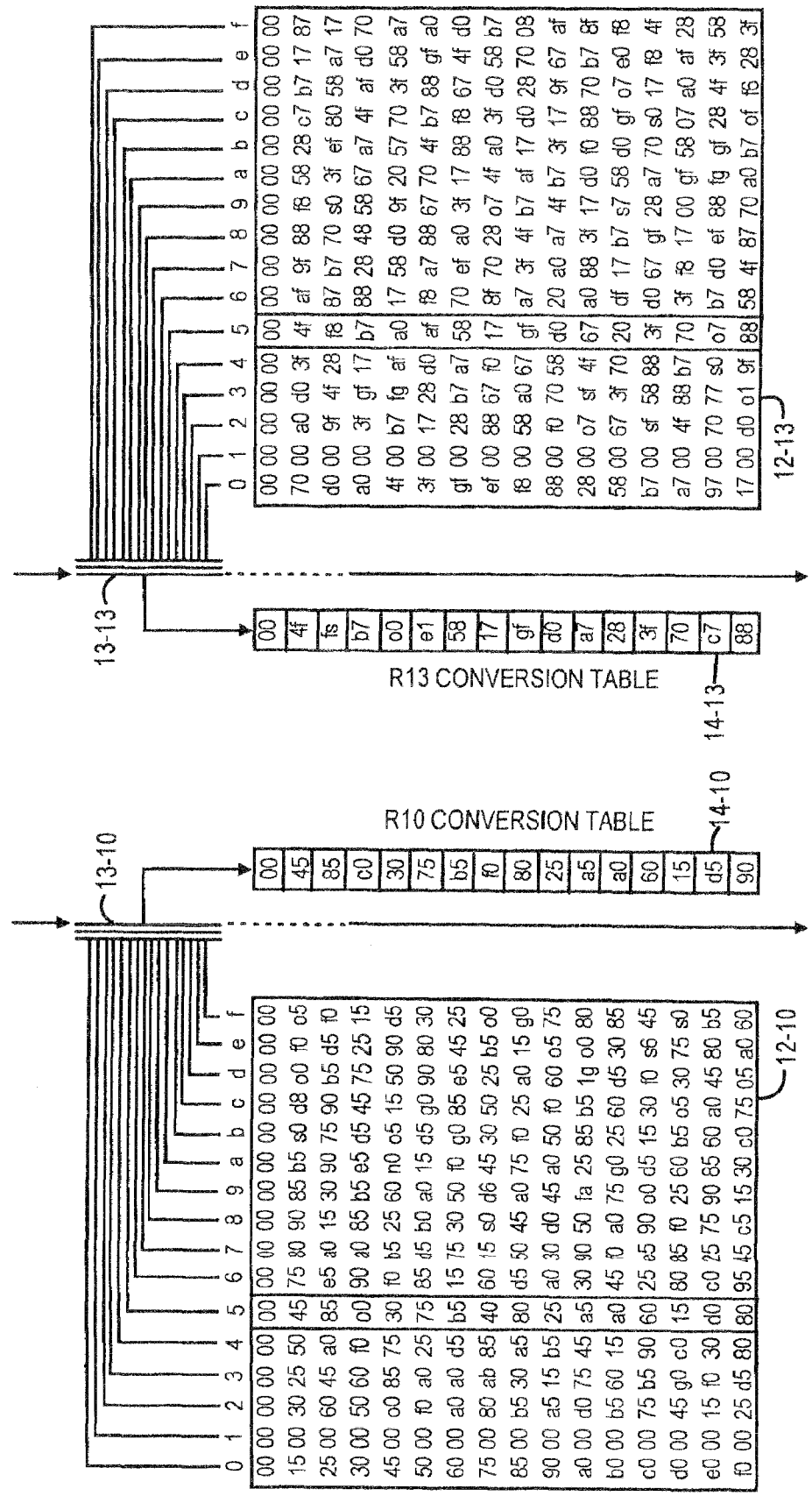
Figure 14D:
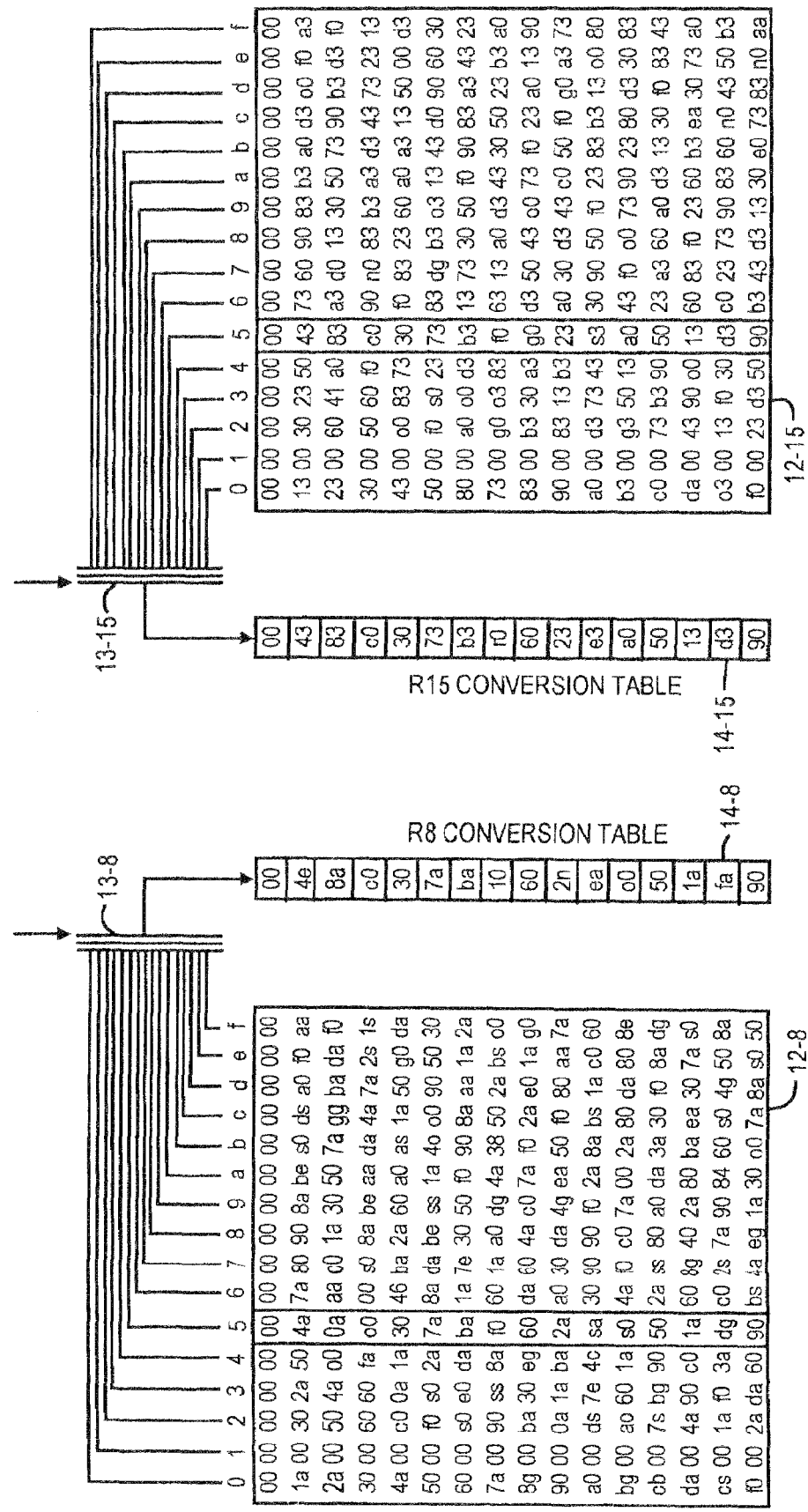

FIGS. 13 and 14 are views illustrating all conversion tables 12-0 to 12-15 within the ECC converting table 11-22, and conversion tables 14-0 to 14-15 of all R0 to R15 indexed from these conversion tables 12-0 to 12-15. The respective conversion tables 14-0 to 14-15 are indexed from the respective conversion tables 12-0 to 12-15 by selectors 13-0 to 13-15 with the multiplication coefficient 1-4 of a value "5" as a select signal. The R0 to R15 will be described later in FIG. 15.

Figure 15A:
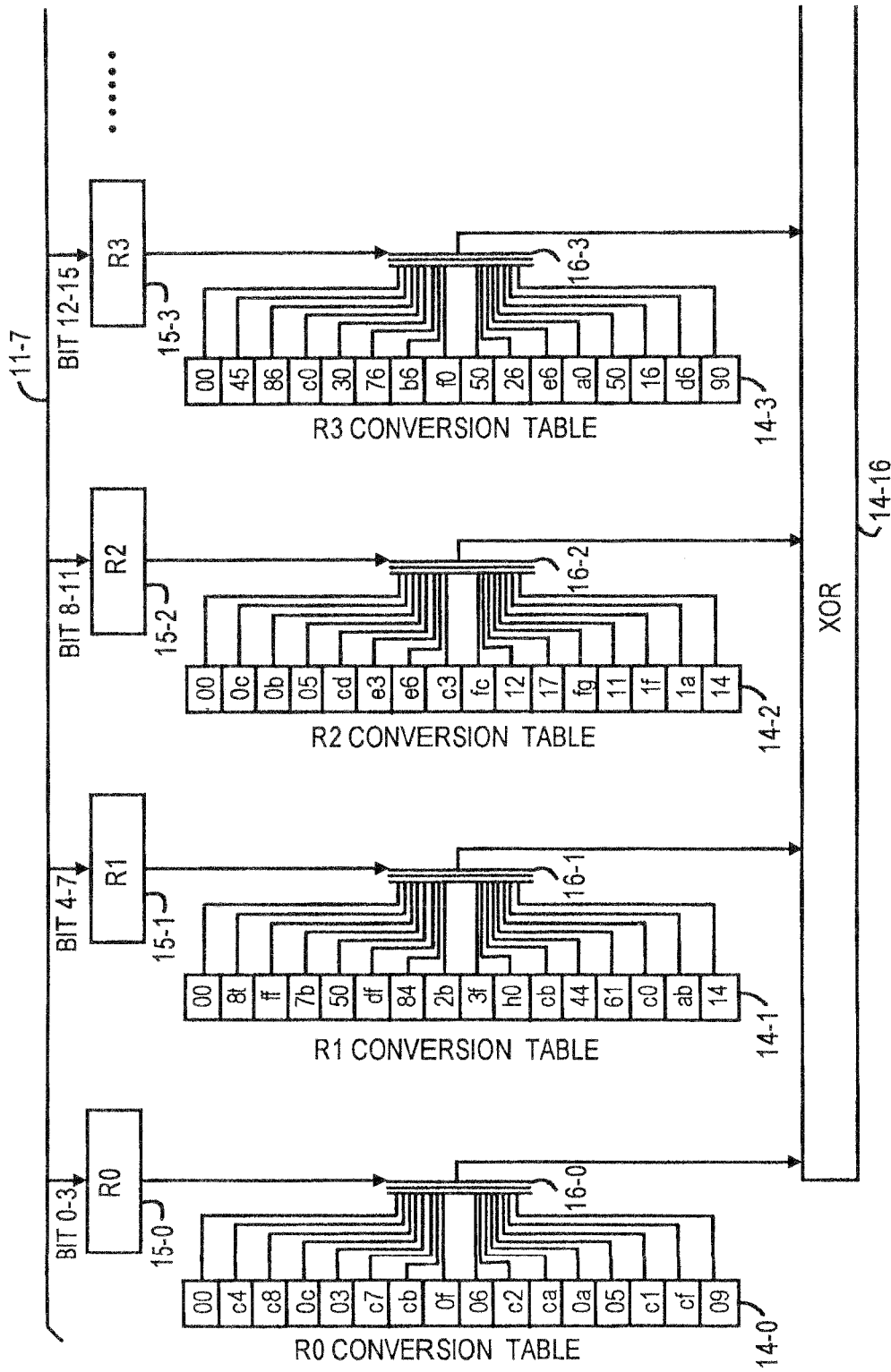
FIG. 15 is a view showing the details of an ECC converting circuit shown in FIG. 12.
Figure 15B:
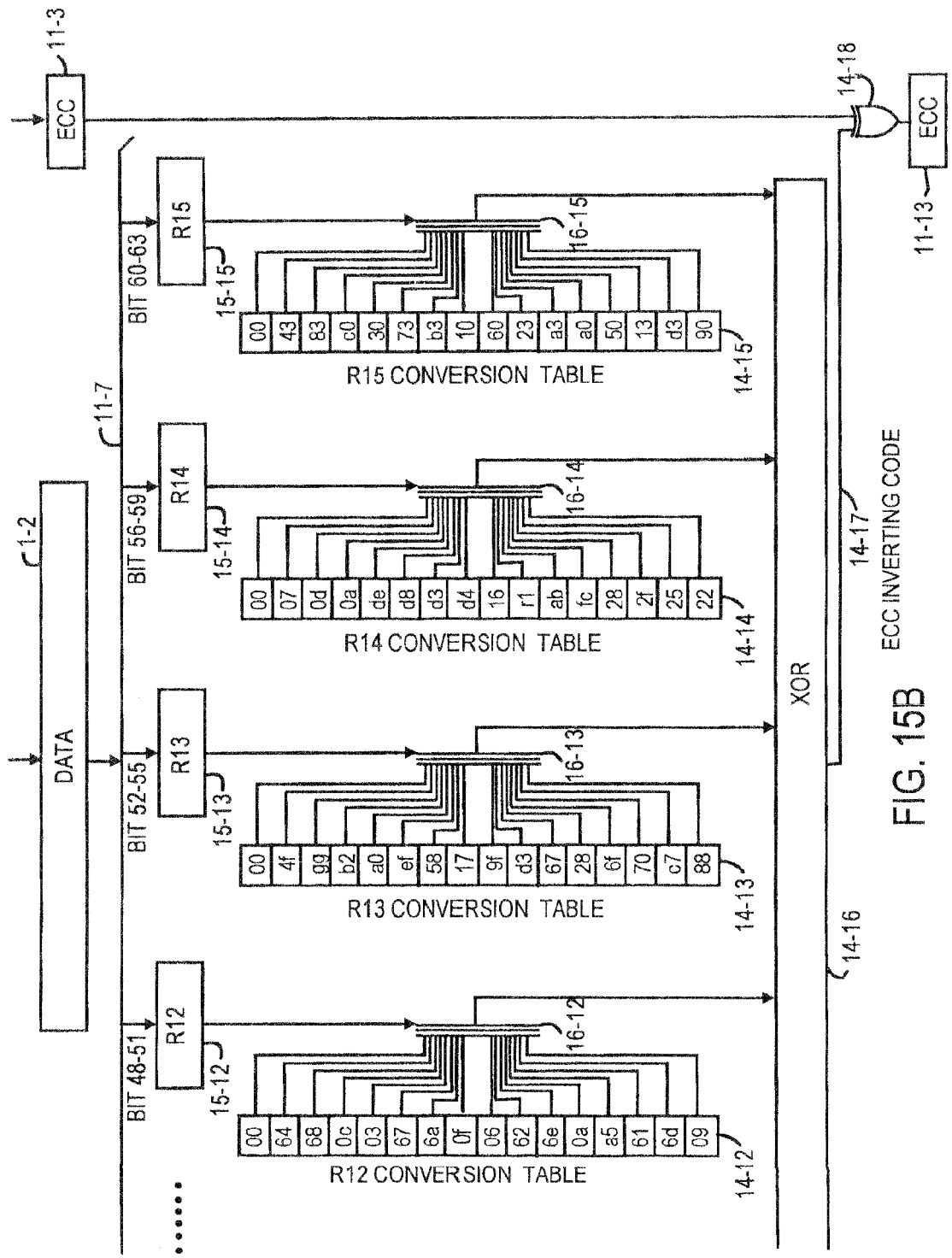
Figure 16A:
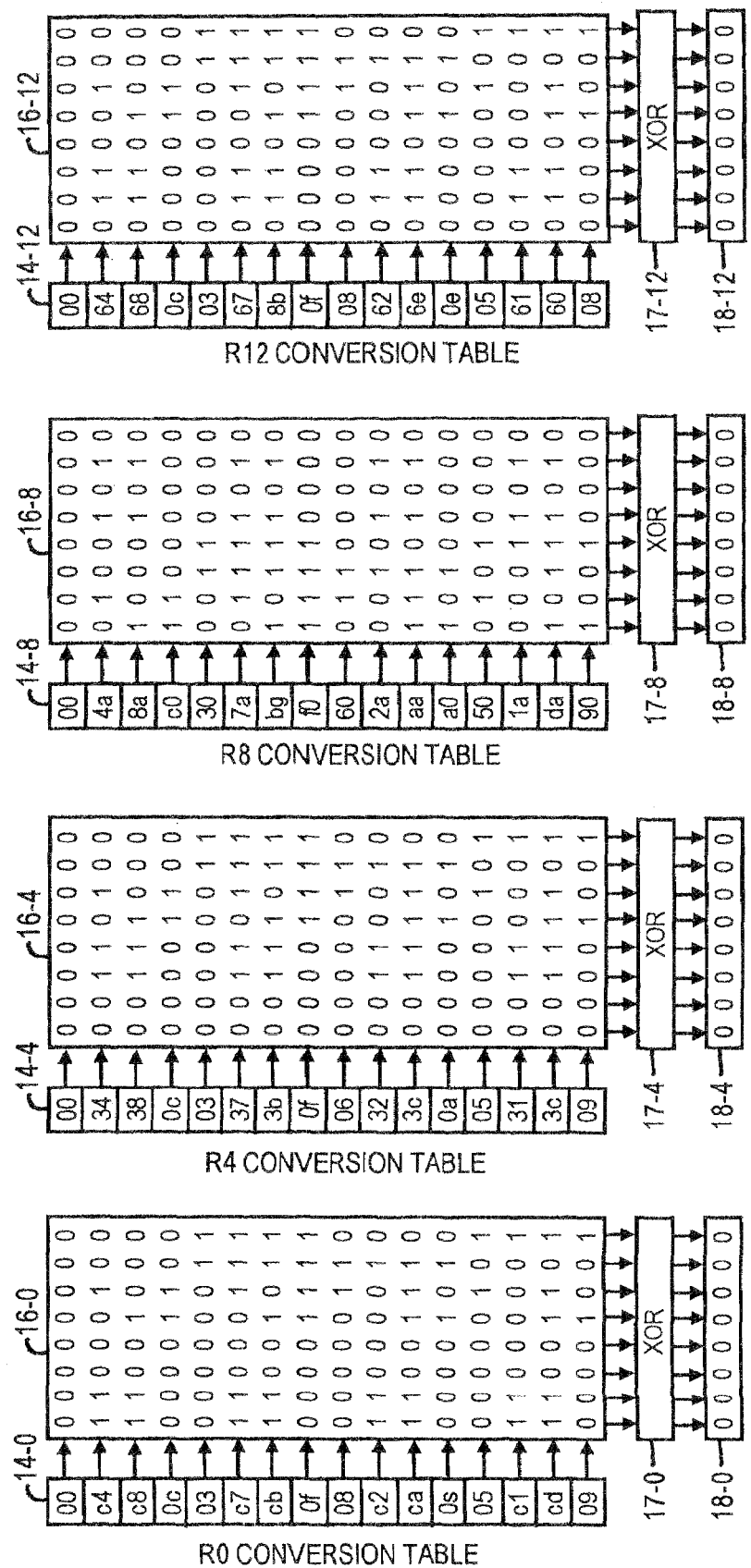
FIG. 16 is a view showing the details of a table check circuit shown in FIG. 12.
Figure 16B:
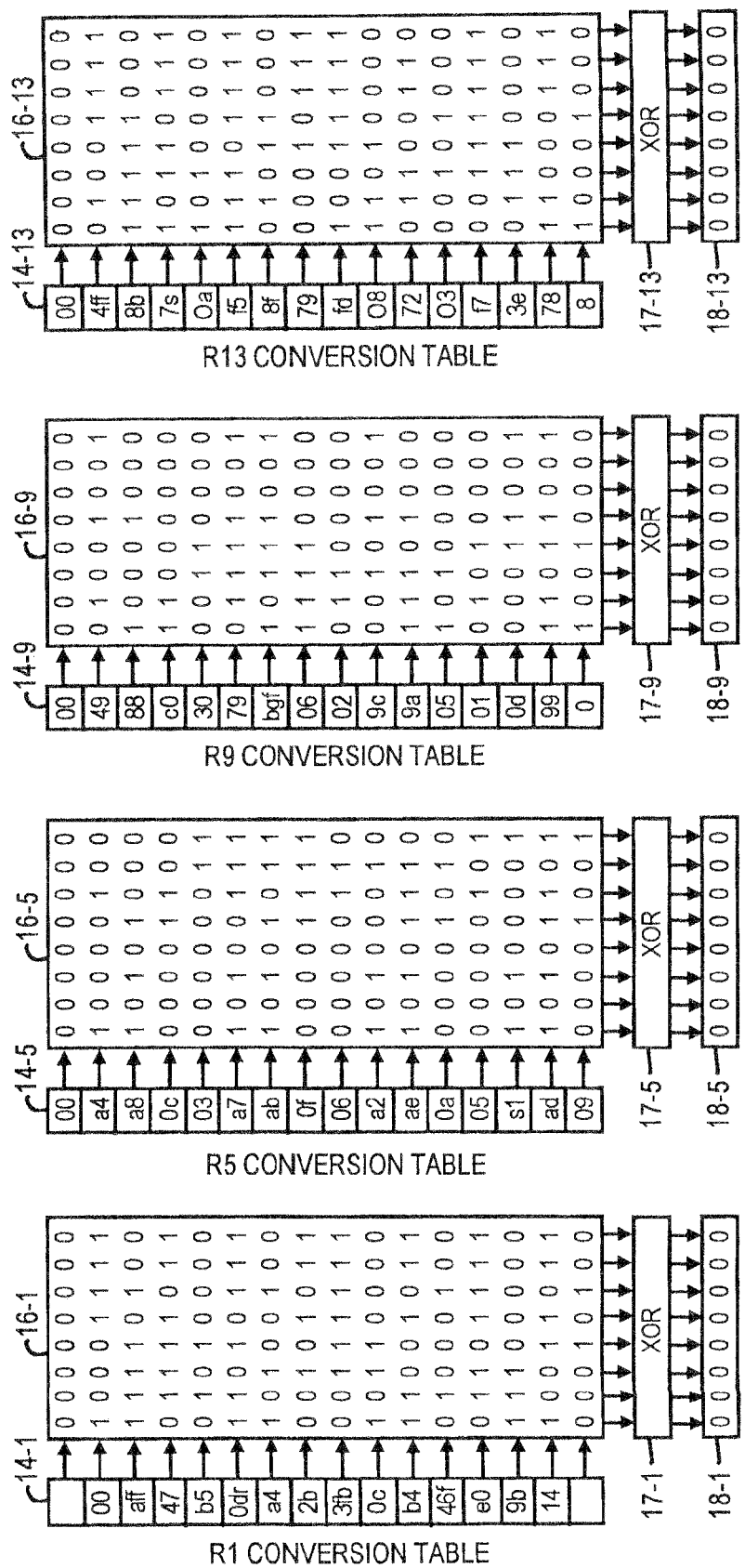
Figure 16C:
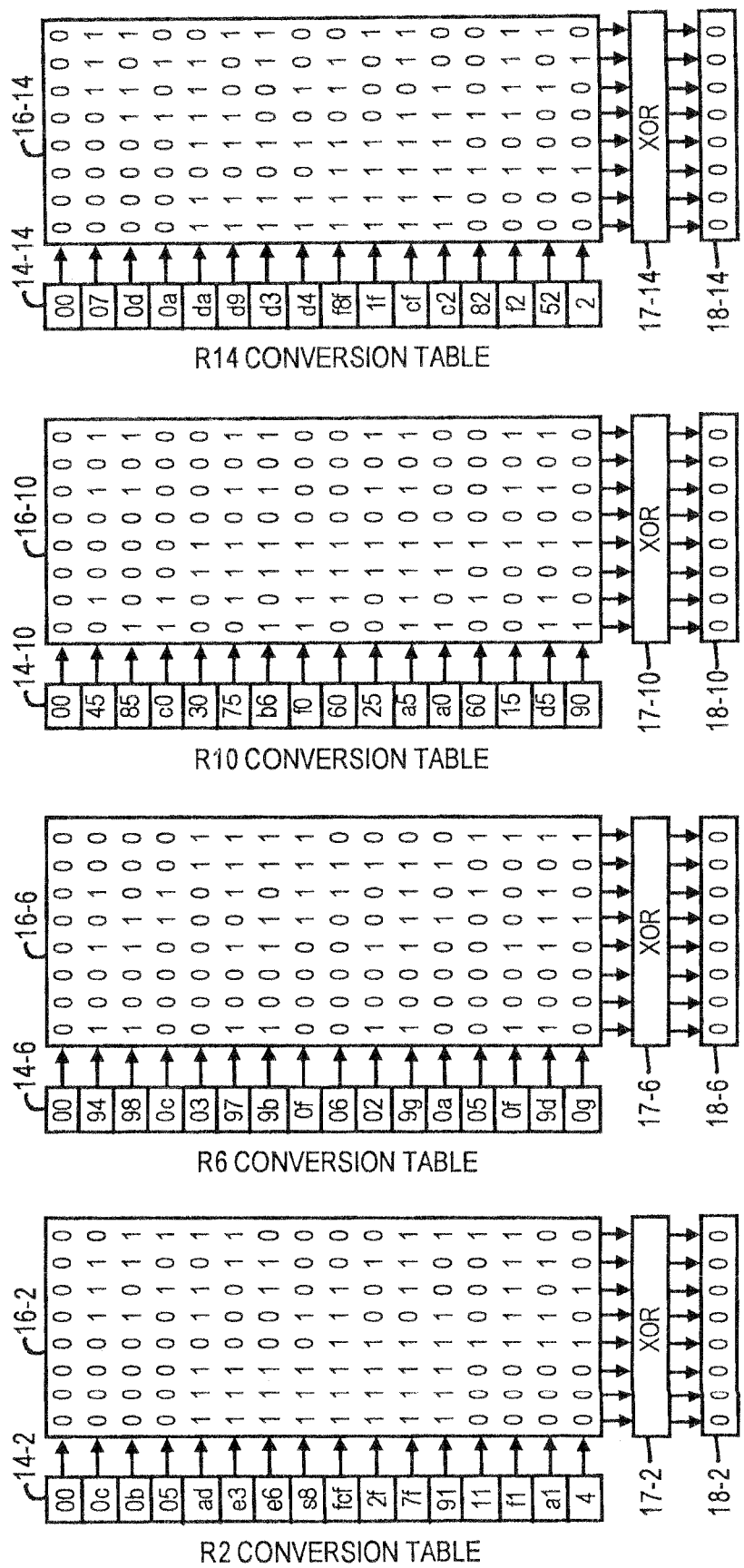
Figure 16D:
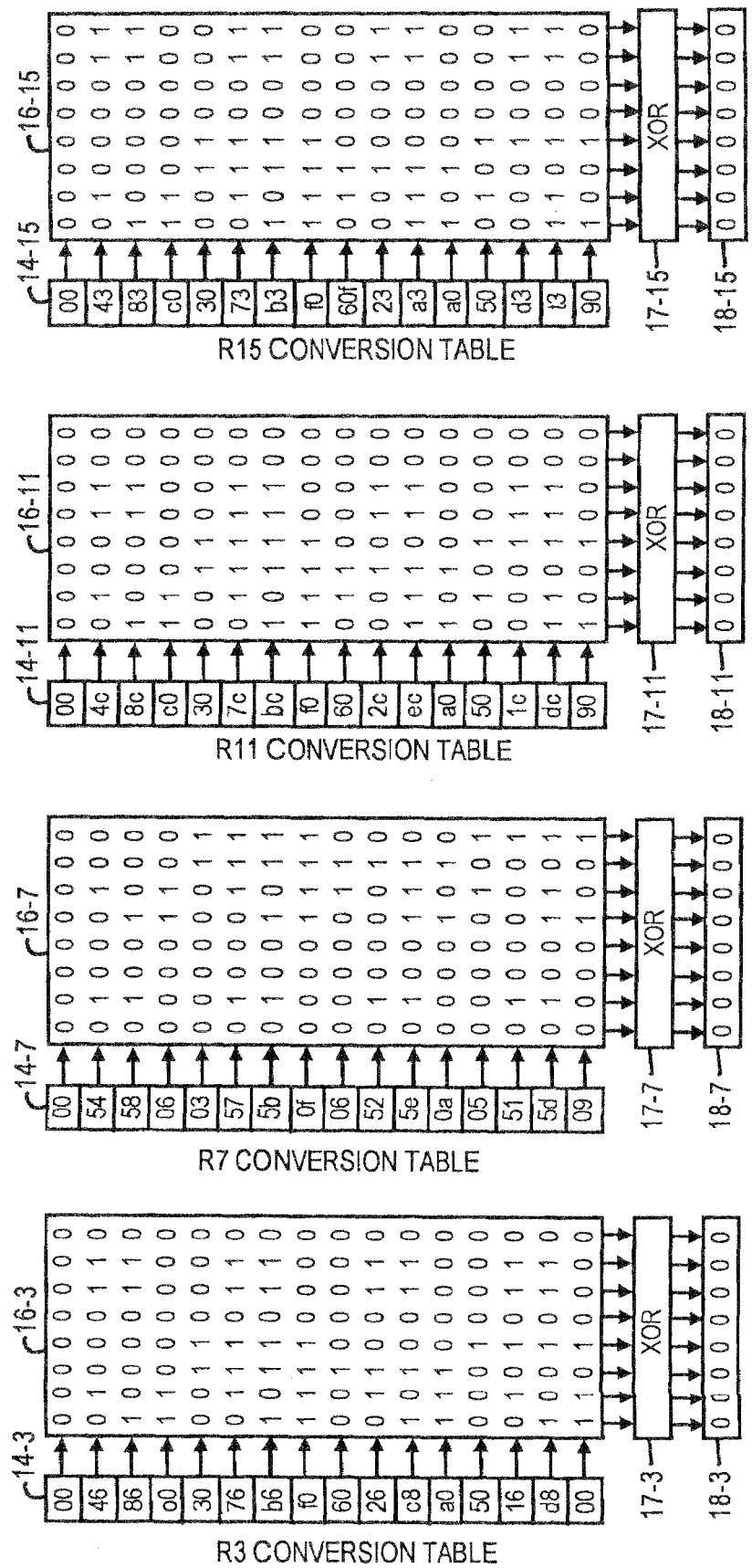

FIG. 15 shows the construction of the ECC converting circuit 11-7. The ECC converting circuit 11-7 comprises selectors 16-0 to 16-15, an XOR circuit 14-16 and an XOR circuit 14-18. In the selectors 16-0 to 16-15, decomposing data 15-0 to 15-15 of R0 to R15 obtained by decomposing the data 1-2 of 64 bits in the four-bit unit are set to select signals, and the selectors 16-0 to 16-15 select the conversion tables 14-0 to 14-15 of R0 to R15. The XOR circuit 14-16 performs the XOR logic operation with respect to the selecting results of the selectors 16-0 to 16-15. The XOR circuit 14-18 performs the XOR logic operation with respect to an ECC inverting code 14-17 and the ECC 11-3 as an output of the XOR circuit 14-16, and outputs the ECC 11-13 with respect to the data 1-12 for RAID.

The construction of the ECC converting circuit 11-7 is similar to that of the upper order parity inverting circuit 1-7 and the lower order parity inverting circuit 1-8 of FIG. 6. However, the construction of the ECC converting circuit 11-7 differs from that of the upper order parity inverting circuit 1-7 and the lower order parity inverting circuit 1-8 of FIG. 6 in that one-to-one correspondence conversion tables 14-0 to 14-15 are required with respect to data 15-0 to 15-15 of R0 to R15 decomposed every bit by the characteristics of ECC.

The ECC converting circuit 11-7 is a circuit for generating the ECC inverting code 14-17 after the conversion by the ECC 11-13 in the conversion of the ECC 11-13 annexed to the data 1-2. In this ECC converting circuit 11-7, the data 1-2 are decomposed into the data 15-0 to 15-15 of R0 to R15 of the four-bit unit, and the conversion tables 14-0 to 14-15 corresponding to the respective data positions are used.

Then, the respective conversion tables 14-0 to 14-15 are converted by the selectors 16-0 to 16-15 with the data 15-0 to 15-15 as select signals. The XOR logic operation is performed with respect to the output results of all the selectors 16-0 to 16-15 by the XOR circuit 14-16 so that the ECC inverting code 14-17 is obtained.

The converted ECC 11-13 is generated by performing the XOR logic operation with respect to the ECC 11-3 to which the ECC inverting code 14-17 is transferred.

As long as the check code introduced by a constant arithmetic calculation using the XOR logic from the data 1-2 is used, the circuit construction can be realized by any check code except for the parity and the ECC by preparing the Galois field multiplying table 1-11 corresponding to the logic of this used check code.

FIG. 16 shows the table check circuit 11-14 about the conversion tables 14-0 to 14-15. The table check circuit 11-14 respectively decomposes the respective data of the conversion tables 14-0 to 14-15 of R0 to R15 generated by the ECC index table making circuit 11-23 into bits 16-0 to 16-15. The table check circuit 11-14 then performs all the XOR logic operations of the same bit series by XOR circuits 17-0 to 17-15, and inspects that all their XOR logic results 18-0 to 18-15 become "0".

With respect to the upper order data converting circuit 1-5 and the lower order data converting circuit 1-6, and the longitudinal index table making circuit 1-9 and the transversal index table making circuit 1-10, their explanations are omitted here since these circuits are equal to the parity data generating circuit 13 for RAID in accordance with the embodiment 1 shown in FIG. 2.

Subsequently, explanation will be made of the operation of the parity data generating circuit 13 for RAID having the above-mentioned structure according to the embodiment 3.

An ECC converting table 11-22 and an ECC index table making circuit 11-23 are newly required to convert the ECC 11-3 existing as the check code with respect to the data 1-2. An ECC converting circuit 11-7 for generating the new ECC 11-13 from index table information generated by this ECC index table making circuit 11-23 is required.

The ECC converting table 11-22 is required by a decomposing number of the data 1-2 decomposed in the four-bit unit. When it is supposed that the data 1-2 are 64 bits, sixteen conversion tables 12-0 to 12-15 are prepared with respect to the ECC converting table 11-22 as described in FIGS. 13 and 14.

All these conversion tables 12-0 to 12-15 are selected by selectors 13-0 to 13-15 with the multiplication coefficient 1-4 of the Galois field in FIG. 12 as a select signal, and the conversion tables 14-0 to 14-15 from R0 to R15 are produced.

These conversion tables 14-0 to 14-15 produced by the ECC index table making circuit 11-23 are transferred to the ECC converting circuit 11-7, and the ECC 11-3 is converted into the ECC 11-13 in this ECC converting circuit 11-7.

As a converting procedure, the data 1-2 are decomposed in the four-bit unit and are respectively defined as data 15-0 to 15-15 from R0 to R15.

The respective data 15-0 to 15-15 of R0 to R15 are given to the selectors 16-0 to 16-15 for selecting the corresponding conversion tables 14-0 to 14-15, and the corresponding ECC conversion codes are extracted from the conversion tables 14-0 to 14-15. The XOR logic operation with respect to all these ECC conversion codes is performed by the XOR circuit 14-6, and its result is generated as an ECC inversion code 14-17.

Next, the XOR logic operation of the bit unit for the ECC 11-3 before the conversion is performed with respect to the ECC inverting code 14-17 by the XOR circuit 14-18 so that the ECC 11-13 for the data 1-12 made with respect to the multiplying calculation of the Galois field is generated.

The above contents will be explained by using the actual values.

When the data 1-2 in FIG. 12 are set to data of 64 bits and are set to "0000111122223333" in the hexadecimal notation, each bit of D(19), D(23), D(27), D(31), D(34), D(38), D(42), D(46), D(50), D(51), D(54), D(55), D(58), D(59), D(62), D(63) becomes "1" by the following formula 1-1 so that its ECC 1-3 becomes "17".

$$E(0)=D(0)+D(1)+D(2)+D(3)+D(4)+D(5)+D(6)+D(7)+\\D(10)+D(12)+D(20)+D(21)+D(22)+D(23)+D(24)+D(25)+D(26)+D(27)+D(32)+D(36)+D(40)+\\D(44)+D(52)+D(54)+D(58)+D(60)$$

$$E(1)=D(0)+D(1)+D(2)+D(3)+D(4)+D(7)+D(10)+D(13)+D(28)+D(29)+D(30)+D(31)+D(33)+D(37)+\\D(41)+D(45)+D(48)+D(49)+D(50)+D(51)+D(52)+D(53)+D(54)+D(55)+D(58)+D(61)$$

$$E(2)=D(4)+D(6)+D(7)+D(10)+D(14)+D(16)+D(17)+\\D(18)+D(19)+D(20)+D(21)+D(22)+D(23)+D(34)+D(38)+D(42)+D(46)+D(48)+D(49)+D(50)+\\D(51)+D(52)+D(55)+D(58)+D(59)+D(62)$$

$$E(3)=D(4)+D(6)+D(10)+D(11)+D(15)+D(16)+D(17)+D(18)+D(19)+D(24)+D(25)+D(26)+D(27)+\\D(28)+D(29)+D(30)+D(31)+D(35)+D(39)+D(43)+D(47)+D(52)+D(54)+D(55)+D(58)+D(63)$$

$$E(4)=D(0)+D(5)+D(8)+D(9)+D(11)+D(16)+D(20)+D(24)+D(28)+D(32)+D(33)+D(34)+D(35)+D(36)+\\D(37)+D(38)+D(39)+D(44)+D(45)+D(46)+D(47)+D(48)+D(52)+D(53)+D(56)+D(59)$$

$$E(5)=D(1)+D(4)+D(5)+D(9)+D(11)+D(12)+D(13)+D(14)+D(15)+D(17)+D(21)+D(25)+D(29)+D(40)+\\D(41)+D(42)+D(43)+D(44)+D(45)+D(46)+D(47)+D(49)+D(53)+D(56)+D(57)+D(59)$$

$E(6)=D(2)+D(5)+D(8)+D(9)+D(10)+D(11)+D(12)+D$
$(13)+D(14)+D(15)+D(18)+D(22)+D(26)+D(30)+$
$D(32)+D(33)+D(34)+D(35)+D(50)+D(53)+D$
$(57)+D(59)+D(60)+D(61)+D(62)+D(63)$ $E(7)=D(3)+D(5)+D(8)+D(11)+D(19)+D(23)+D(27)+$
$D(31)+D(36)+D(37)+D(38)+D(39)+D(40)+D$
$(41)+D(42)+D(43)+D(51)+D(53)+D(56)+D(57)+$
$D(58)+D(59)+D(60)+D(61)+D(62)+D(63)$ [Formula 1-1]

At this time, when the multiplication coefficient 1-4 is set to "5", the ECC index table making circuit 11-23 extracts a pertinent table from all the conversion tables 12-0 to 12-15 of FIGS. 13 and 14, and transfers this pertinent table to the ECC converting circuit 11-7 as conversion tables 14-0 to 14-15.

Here, the data 1-2 are "0000111122223333", and the ECC 11-3 is "17".

Thus, "0" is inputted to R0 to R3 and "1" is inputted to R4 to R7 and "2" is inputted to R8 to R11 and "3" is inputted to R12 to R15 by the decomposition into each four-bit unit. Accordingly, the following conversion codes are obtained by the selections of the selectors 13-0 to 13-15 for selecting the respective conversion tables 14-0 to 14-15.

Conversion code of R0="00"

Conversion code of R1="00"

Conversion code of R2="00"

Conversion code of R3="00"

Conversion code of R4="34"

Conversion code of R5="a4"

Conversion code of R6="94"

Conversion code of R7="54"

Conversion code of R8="8a"

Conversion code of R9="89"

Conversion code of R10="85"

Conversion code of R11="8c"

Conversion code of R12="0c"

Conversion code of R13="b7"

Conversion code of R14="0a"

Conversion code of R15="c0"

When the XOR logic operation is executed by the XOR circuit 14-16 with respect to all these conversion codes, the ECC inverting code 14-17 is generated and the code of "2B" is outputted.

With respect to the ECC inverting code 14-17, the XOR logic operation is executed by the XOR circuit 14-8 for the ECC 11-3 before the multiplying calculation of the Galois field. The final ECC 11-13 becomes a code of "3C" by the XOR logic operation of "17" and "2B".

This is conformed to ECC with respect to "00005555aaaaff" as a multiplying result of the Galois field of a multiplication coefficient "5" with respect to "0000111122223333" of the data 1-2, and shows that the ECC is a correct ECC.

Further, when the same data 1-2 are used and a multiplication coefficient "0" of the Galois field providing zero in all the arithmetic results at any value is set on trial, the following conversion codes are obtained.

Conversion code of R0="00"

Conversion code of R1="00"

Conversion code of R2="00"

Conversion code of R3="00"

Conversion code of R4="31"

Conversion code of R5="a1"

Conversion code of R6="91"

Conversion code of R7="51"

Conversion code of R8="2a"

Conversion code of R9="29"

Conversion code of R10="25"

Conversion code of R11="2c"

Conversion code of R12="03"

Conversion code of R13="a0"

Conversion code of R14="de"

Conversion code of R15="30"

Accordingly, the conversion code of "17" is obtained.

This shows that, since this conversion code becomes the same value as the ECC 11-3, the ECC 11-13 outputted by performing its XOR logic operation also becomes zero and it shows that a correct ECC is given.

Moreover, an operation equal to that of the table check circuit 11-14 shown in FIG. 12 can be performed with respect to the table check circuit 11-14 about the conversion tables 14-0 to 14-15 of FIGS. 13 and 14 used in these conversion codes. Its outputs 18-0 to 18-15 become zero by performing the XOR logic operation of all the bit units. Thus, the table check circuit 11-14 becomes a circuit for checking that a correct table index is performed.

Here, the used ECC will be explained.

First, there are various ECCs themselves in accordance with objects, and the following explanation will be made this time as logic for generating the ECC of 8 bits with respect to data of 64 bits. However, it is possible to cope with situations in any code if the ECC is a code calculated by the XOR logic from a bit of data.

$E(0)=D(0)+D(1)+D(2)+D(3)+D(4)+D(5)+D(6)+D(7)+$
$D(10)+D(12)+D(20)+D(21)+D(22)+D(23)+D$
$(24)+D(25)+D(26)+D(27)+D(32)+D(36)+D(40)+$
$D(44)+D(52)+D(54)+D(58)+D(60)$ $E(1)=D(0)+D(1)+D(2)+D(3)+D(4)+D(7)+D(10)+D$
$(13)+D(28)+D(29)+D(30)+D(31)+D(33)+D(37)+$
$D(41)+D(45)+D(48)+D(49)+D(50)+D(51)+D$
$(52)+D(53)+D(54)+D(55)+D(58)+D(61)$ $E(2)=D(4)+D(6)+D(7)+D(10)+D(14)+D(16)+D(17)+$
$D(18)+D(19)+D(20)+D(21)+D(22)+D(23)+D$
$(34)+D(38)+D(42)+D(46)+D(48)+D(49)+D(50)+$
$D(51)+D(52)+D(55)+D(58)+D(59)+D(62)$ $E(3)=D(4)+D(6)+D(10)+D(11)+D(15)+D(16)+D$
$(17)+D(18)+D(19)+D(24)+D(25)+D(26)+D(27)+$
$D(28)+D(29)+D(30)+D(31)+D(35)+D(39)+D$
$(43)+D(47)+D(52)+D(54)+D(55)+D(58)+D(63)$ $E(4)=D(0)+D(5)+D(8)+D(9)+D(11)+D(16)+D(20)+D$
$(24)+D(28)+D(32)+D(33)+D(34)+D(35)+D(36)+$
$D(37)+D(38)+D(39)+D(44)+D(45)+D(46)+D$
$(47)+D(48)+D(52)+D(53)+D(56)+D(59)$ $E(5)=D(1)+D(4)+D(5)+D(9)+D(11)+D(12)+D(13)+D$
$(14)+D(15)+D(17)+D(21)+D(25)+D(29)+D(40)+$
$D(41)+D(42)+D(43)+D(44)+D(45)+D(46)+D$
$(47)+D(49)+D(53)+D(56)+D(57)+D(59)$ $E(6)=D(2)+D(5)+D(8)+D(9)+D(10)+D(11)+D(12)+D(13)+D(14)+D(15)+D(18)+D(22)+D(26)+D(30)+D(32)+D(33)+D(34)+D(35)+D(50)+D(53)+D(57)+D(59)+D(60)+D(61)+D(62)+D(63)$ $E(7)=D(3)+D(5)+D(8)+D(11)+D(19)+D(23)+D(27)+D(31)+D(36)+D(37)+D(38)+D(39)+D(40)+D(41)+D(42)+D(43)+D(51)+D(53)+D(56)+D(57)+D(58)+D(59)+D(60)+D(61)+D(62)+D(63)$  [Formula 2-1]

In this case, E(0-7) is a generated ECC and D(0-63) is data of 64 bits.

The formula 2-1 can be modified into the following formula 2-2 since all the arithmetic calculations are the XOR logic.

$E(i)=R0(i)+R1(i)+R2(i)+R3(i)+R4(i)+R5(i)+R6(i)+R7(i)+R8(i)+R9(i)+R10(i)+R11(i)+R12(i)+R13(i)+R14(i)+R15(i)$  [Formula 2-2]

In this case, i shows the bit width of the ECC and also shows 8 bits from 0 to 7. Further, in the formula 2-1, R0 shows a portion generated by data of D(0) to D(3), R1 a portion generated by data of D(4) to D(7), R2 a portion generated by data of D(8) to D(11), - - -, R14 a portion generated by data of D(56) to D(59), and R15 shows a portion generated by data of D(60) to D(63).

Thus, R0(*i*) to R15(*i*) are provided by the following formulas.

$R0(0)=D(0)+D(1)+D(2)+D(3)$ $R0(1)=D(0)+D(1)+D(2)+D(3)$ $R0(2)=0$ $R0(3)=0$ $R0(4)=D(0)$ $R0(5)=D(1)$ $R0(6)=D(2)$ $R0(7)=D(3)$  [Formula 3-1]

$R1(0)=D(4)+D(5)+D(6)+D(7)$ $R1(1)=D(4)+D(7)$ $R1(2)=D(4)+D(6)+D(7)$ $R1(3)=D(4)+D(6)$ $R1(4)=D(5)$ $R1(5)=D(4)+D(5)$ $R1(6)=D(5)$ $R1(7)=D(5)$  [Formula 3-2]

$R2(0)=D(10)$ $R2(1)=D(10)$ $R2(2)=D(10)$ $R2(3)=D(10)+D(11)$ $R2(4)=D(8)+D(9)+D(11)$ $R2(5)=D(9)+D(11)$ $R2(6)=D(8)+D(9)+D(10)+D(11)$ $R2(7)=D(8)+D(11)$  [Formula 3-3]

$R3(0)=D(12)$ $R3(1)=D(13)$ $R3(2)=D(14)$ $R3(3)=D(15)$ $R3(4)=0$ $R3(5)=D(12)+D(13)+D(14)+D(15)$ $R3(6)=D(12)+D(13)+D(14)+D(15)$ $R3(7)=0$  [Formula 3-4]

$R4(0)=0$ $R4(1)=0$ $R4(2)=D(16)+D(17)+D(18)+D(19)$ $R4(3)=D(16)+D(17)+D(18)+D(19)$ $R4(4)=D(16)$ $R4(5)=D(17)$ $R4(6)=D(18)$ $R4(7)=D(19)$  [Formula 3-5]

$R5(0)=D(20)+D(21)+D(22)+D(23)$ $R5(1)=0$ $R5(2)=D(20)+D(21)+D(22)+D(23)$ $R5(3)=0$ $R5(4)=D(20)$ $R5(5)=D(21)$ $R5(6)=D(22)$ $R5(7)=D(23)$  [Formula 3-6]

$R6(0)=D(24)+D(25)+D(26)+D(27)$ $R6(1)=0$ $R6(2)=0$ $R6(3)=D(24)+D(25)+D(26)+D(27)$ $R6(4)=D(24)$ $R6(5)=D(25)$ $R6(6)=D(26)$ $R6(7)=D(27)$  [Formula 3-7]

$R7(0)=0$ $R7(1)=D(28)+D(29)+D(30)+D(31)$ $R7(2)=0$ $R7(3)=D(28)+D(29)+D(30)+D(31)$ $R7(4)=D(28)$ $R7(5)=D(29)$ $R7(6)=D(30)$ $R7(7)=D(31)$ [Formula 3-8]

$R8(0)=D(32)$ $R8(1)=D(33)$ $R8(2)=D(34)$ $R8(3)=D(35)$ $R8(4)=D(32)+D(33)+D(34)+D(35)$ $R8(5)=0$ $R8(6)=D(32)+D(33)+D(34)+D(35)$ $R8(7)=0$ [Formula 3-9]

$R9(0)=D(36)$ $R9(1)=D(37)$ $R9(2)=D(38)$ $R9(3)=D(39)$ $R9(4)=D(36)+D(37)+D(38)+D(39)$ $R9(5)=0$ $R9(6)=0$ $R9(7)=D(36)+D(37)+D(38)+D(39)$ [Formula 3-10]

$R10(0)=D(40)$ $R10(1)=D(41)$ $R10(2)=D(42)$ $R10(3)=D(43)$ $R10(4)=0$ $R10(5)=D(40)+D(41)+D(42)+D(43)$ $R10(6)=0$ $R10(7)=D(40)+D(41)+D(42)+D(43)$ [Formula 3-11]

$R11(0)=D(44)$ $R11(1)=D(45)$ $R11(2)=D(46)$ $R11(3)=D(47)$ $R11(4)=D(44)+D(45)+D(46)+D(47)$ $R11(5)=D(44)+D(45)+D(46)+D(47)$ $R11(6)=0$ $R11(7)=0$ [Formula 3-12]

$R12(0)=0$ $R12(1)=D(48)+D(49)+D(50)+D(51)$ $R12(2)=D(48)+D(49)+D(50)+D(51)$ $R12(3)=0$ $R12(4)=D(48)$ $R12(5)=D(49)$ $R12(6)=D(50)$ $R12(7)=D(51)$ [Formula 3-13]

$R13(0)=D(54)$ $R13(1)=D(52)+D(53)+D(54)+D(55)$ $R13(2)=D(52)+D(55)$ $R13(3)=D(52)+D(54)+D(55)$ $R13(4)=D(52)+D(53)$ $R13(5)=D(53)$ $R13(6)=D(53)$ $R13(7)=D(53)$ [Formula 3-14]

$R14(0)=D(58)$ $R14(1)=D(58)$ $R14(2)=D(58)+D(59)$ $R14(3)=D(58)$ $R14(4)=D(59)$ $R14(5)=D(56)+D(57)+D(59)$ $R14(6)=D(57)+D(59)$ $R14(7)=D(56)+D(57)+D(58)+D(59)$ [Formula 3-15]

$R15(0)=D(60)$ $R15(1)=D(61)$ $R15(2)=D(62)$ $R15(3)=D(63)$ $R15(4)=0$ $R15(5)=0$ $R15(6)=D(60)+D(61)+D(62)+D(63)$ $R15(7)=D(60)+D(61)+D(62)+D(63)$ [Formula 3-16]

Here, R0($i$) to R15($i$) shown in the formulas 3-1 to 3-16 are summarized in a unit influenced when the values are changed by the Galois field multiplying circuit 11-21. Therefore, it is sufficient to perform the ECC conversion at the multiplying time of the Galois field in the unit of these R0($i$) to R15($i$).

A conversion table making method relating to R0($i$) will be shown below.

In the formula 3-1, D(0) to D(3) show values of "0" to "F" in the hexadecimal notation. Therefore, the relation of the values of D(0) to D(3) and R(0) to R(7) is provided by the following table.

TABLE 1

R0 code generating table

D (0-3)

| | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| R0 (0-7) | 00 | c1 | c2 | 03 | c4 | 05 | 06 | c7 | c8 | 09 | 0a | cb | 0c | cd | ce | 0f |

Here, since the table 1 is a "code table" of the ECC with respect to data, this table 1 is changed to a "code converting table".

When the original data are set to D(0-3), the results of the formula 3-1 are set to R0(0-7). The results of the formula 3-1 with respect to new data D'(0-3) are set to R0'(0-7). In this case, the following formula is set to be formed.

$$R0'(0\text{-}7)=R(0\text{-}7)+S(0\text{-}7) \quad \text{[Formula 4]}$$

Here, S(0-7) is set to be called a code converting value. When a value is added to the original ECCR0(0-7) by the XOR logic, a code for being able to generate new ECCR0'(0-7) is formed. When S(0-7) in the formula 4 is calculated, the following formula is obtained.

$$S(0\text{-}7)=R(0\text{-}7)+R0'(0\text{-}7) \quad \text{[Formula 5]}$$

Accordingly, the conversion code can be calculated by performing the XOR logic operation with respect to the original ECCR0(0-7) and the new ECCR0'(0-7). When its table is made, the following table is obtained.

TABLE 2

Code converting table of R0

Value after Conversion

| | | D' (0-3) | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|---|---|
| | D (0-3) | R0 (0-7) | 00 | c1 | c2 | 03 | c4 | 05 | 06 | c7 | c8 | 09 | 0a | cb | 0c | cd | ce | 0f |
| Original | 0 | 00 | 00 | c1 | c2 | 03 | c4 | 05 | 06 | c7 | c8 | 09 | 0a | cb | 0c | cd | ce | cd |
| Data | 1 | c1 | c1 | 00 | 03 | c2 | 05 | c4 | c7 | 06 | 09 | c8 | cb | 0a | cd | 0c | 0f | ce |
| | 2 | c2 | c2 | 03 | 00 | c1 | 06 | c7 | c4 | 05 | 0a | cb | c8 | 09 | ce | 0f | 0c | cd |
| | 3 | 03 | 03 | c2 | c1 | 00 | c7 | 06 | 05 | c4 | cb | 0a | 09 | c8 | 0f | ce | cd | 0c |
| | 4 | c4 | c4 | 05 | 06 | c7 | 00 | c1 | c2 | 03 | 0c | cd | ce | 0f | c8 | 09 | 0a | cb |
| | 5 | 05 | 05 | c4 | c7 | 06 | c1 | 00 | 03 | c2 | cd | 0c | 0f | ce | 09 | c8 | cb | 0a |
| | 6 | 06 | 06 | c7 | c4 | 05 | c2 | 03 | 00 | c1 | ce | 0f | 0c | cd | 0a | cb | c8 | 09 |
| | 7 | c7 | c7 | 06 | 05 | c4 | 03 | c2 | c1 | 00 | 0f | ce | cd | 0c | cb | 0a | 09 | c8 |
| | 8 | c8 | c8 | 09 | 0a | cb | 0c | cd | ce | 0f | 00 | c1 | c2 | 03 | c4 | 05 | 06 | c7 |
| | 9 | 09 | 09 | c8 | cb | 0a | cd | 0c | 0f | ce | c1 | 00 | 03 | c2 | 05 | c4 | c7 | 06 |
| | a | 0a | 0a | cb | c8 | 09 | ce | 0f | 0c | cd | c2 | 03 | 00 | c1 | 06 | c7 | c4 | 05 |
| | b | cb | cb | 0a | 09 | c8 | 0f | ce | cd | 0c | 03 | c2 | c1 | 00 | c7 | 06 | 05 | c4 |
| | c | 0c | 0c | cd | ce | 0f | c8 | 09 | 0a | cb | c4 | 05 | 06 | c7 | 00 | c1 | c2 | 03 |
| | d | cd | cd | 0c | 0f | ce | 09 | c8 | cb | 0a | 05 | c4 | c7 | 06 | c1 | 00 | 03 | c2 |
| | e | ce | ce | 0f | 0c | cd | 0a | cb | c8 | 09 | 06 | c7 | c4 | 05 | c2 | 03 | 00 | c1 |
| | f | 0f | 0f | ce | cd | 0c | cb | 0a | 09 | c8 | c7 | 06 | 05 | c4 | 03 | c2 | c1 | 00 |

At this time, the data are clearly converted as follows by the Galois field multiplying circuit 11-21.

TABLE 3

Multiplying table of Galois field of data portion

Multiplication coefficient of Galois field

| | | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| Input Data | 0 | 0 | 0 | 0 | 0 | 0 | 0 | 0 | 0 | 0 | 0 | 0 | 0 | 0 | 0 | 0 | 0 |
| | 1 | 0 | 1 | 2 | 3 | 4 | 5 | 6 | 7 | 8 | 9 | a | b | c | d | e | f |
| | 2 | 0 | 2 | 4 | 6 | 8 | a | c | e | 3 | 1 | 7 | 5 | b | 9 | f | d |
| | 3 | 0 | 3 | 6 | 5 | c | f | a | 9 | b | 8 | d | e | 7 | 4 | 1 | 2 |
| | 4 | 0 | 4 | 8 | c | 3 | 7 | b | f | 6 | 2 | e | a | 5 | 1 | d | 9 |
| | 5 | 0 | 5 | a | f | 7 | 2 | d | 8 | e | b | 4 | 1 | 9 | c | 3 | 6 |
| | 6 | 0 | 6 | c | a | 0 | d | 7 | 1 | 5 | 3 | 9 | f | e | 8 | 2 | 4 |
| | 7 | 0 | 7 | e | 9 | f | 8 | 1 | 6 | d | a | 3 | 4 | 2 | 5 | c | b |
| | 8 | 0 | 8 | 3 | b | 6 | e | 5 | d | c | 4 | f | 7 | a | 2 | 9 | 1 |
| | 9 | 0 | 9 | 1 | 8 | 2 | b | 3 | a | 4 | d | 5 | c | 6 | f | 7 | e |
| | a | 0 | a | 7 | d | e | 4 | 9 | 3 | f | 5 | 8 | 2 | 1 | b | 6 | c |
| | b | 0 | b | 5 | e | a | 1 | f | 4 | 7 | c | 2 | 9 | d | 6 | 8 | 3 |
| | c | 0 | c | b | 7 | 5 | 9 | e | 2 | a | 6 | 1 | d | f | 3 | 4 | 8 |

TABLE 3-continued

Multiplying table of Galois field of data portion

Multiplication coefficient of Galois field

| | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| d | 0 | d | 9 | 4 | 1 | c | 8 | 5 | 2 | f | b | 6 | 3 | e | a | 7 |
| e | 0 | e | f | 1 | d | 3 | 2 | c | 9 | 7 | 6 | 8 | 4 | a | b | 5 |
| f | 0 | f | d | 2 | 9 | 6 | 4 | b | 1 | e | c | 3 | 8 | 7 | 5 | a |

Here, the ECC converting table at the multiplying time of the Galois field can be made by simultaneously using the relation of tables 2 and 3.

When an example is used, the following contents are formed.

When input data are "2" and the multiplication coefficient is "1", the multiplying result becomes "2" by the table 3. At this time, it is necessary to convert the ECC from "c2" into "c2". Therefore, the conversion code becomes "00" by the table 2.

When the input data are "2" and the multiplication coefficient is "2", the arithmetic result becomes "4" by the table 3. At this time, it is necessary to convert the ECC from "c2" into "c4". Therefore, the conversion code becomes "06" by the table 2.

When the input data are "2" and the multiplication coefficient is "3", the arithmetic result becomes "6" by the table 3. At this time, it is necessary to convert the ECC from "c2" into "06". Therefore, the conversion code becomes "c4" by the table 2.

These relations are shown by the following table when the conversion code of R0 is made with respect to all the input data from "0" to "f" and all the multiplication coefficients 1-4 of the Galois field of "0" to "f". This conversion code becomes an ECC converting code at the multiplying time of the Galois field.

TABLE 4-1

ECC converting code table of R0

| | | MULTIPLICATION COEFFICIENT OF GALOIS FIELD | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | a | b | c | d | e | f |
| INPUT DATA | 0 | 00 | 00 | 00 | 00 | 00 | 00 | 00 | 00 | 00 | 00 | 00 | 00 | 00 | 00 | 00 | 00 |
| | 1 | c1 | 00 | 03 | c2 | 05 | c4 | c7 | 06 | 090 | c8 | cb | 0a | cd | 0c | 0f | ce |
| | 2 | c2 | 00 | 06 | c4 | 0a | c8 | ce | 0c | c1 | 03 | 05 | c7 | 09 | cb | cd | 0f |
| | 3 | 03 | 00 | 05 | 06 | 0f | 0c | 09 | 0a | c8 | cb | ce | cd | c4 | c7 | c2 | c1 |
| | 4 | c4 | 00 | 0c | c8 | c7 | 03 | f | cb | c2 | 06 | 0a | ce | c1 | 05 | 09 | cd |
| | 5 | 05 | 00 | 0f | 0a | c2 | c7 | c8 | cd | cb | ce | c1 | c4 | 0c | 09 | 06 | 03 |
| | 6 | 06 | 00 | 0a | 0c | cd | cb | c1 | c7 | 03 | 05 | 0f | 09 | c8 | ce | c4 | c2 |
| | 7 | c7 | 00 | 09 | ce | c8 | 0f | 06 | c1 | 0a | cd | c4 | 03 | 05 | c2 | cb | 0c |
| | 8 | c8 | 00 | cb | 03 | ce | 06 | cd | 05 | c4 | 0c | c7 | 0f | c2 | 0a | c1 | 09 |
| | 9 | 09 | 00 | c8 | c1 | cb | c2 | 0a | 03 | cd | c4 | 0c | 05 | 0f | 06 | ce | c7 |
| | a | 0a | 00 | cd | c7 | c4 | ce | 03 | 09 | 05 | 0f | c2 | c8 | cb | c1 | 0c | 06 |
| | b | cb | 00 | ce | 05 | c1 | 0a | c4 | 0f | 0c | c7 | 09 | c2 | 06 | cd | 03 | c8 |
| | c | 0c | 00 | c7 | cb | 09 | 05 | c2 | ce | 06 | 0a | cd | c1 | 03 | 0f | c8 | c4 |
| | d | cd | 00 | c4 | 09 | 0c | c1 | 05 | c8 | 0f | c2 | 06 | cb | ce | 03 | c7 | 0a |
| | e | ce | 00 | c1 | 0f | 03 | cd | 0c | c2 | c7 | 09 | c8 | 06 | 0a | c4 | 05 | cb |
| | f | 0f | 00 | c2 | cd | 06 | 09 | cb | c4 | ce | c1 | 03 | 0c | c7 | c8 | 0a | 05 |

The table 4-1 is an ECC converting table generated with R0(0-7) of the formula 3-1 as an origin. However, ECC converting tables of R1 to R15 from the formula 3-2 to the formula 3-16 can be also similarly calculated. Arithmetic results with respect to these ECC converting tables are provided as follows.

TABLE 4-2

ECC converting code table of R1

| | | MULTIPLICATION COEFFICIENT OF GALOIS FIELD | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | a | b | c | d | e | f |
| INPUT DATA | 0 | 00 | 00 | 00 | 00 | 00 | 00 | 00 | 00 | 00 | 00 | 00 | 00 | 00 | 00 | 00 | 00 |
| | 1 | e0 | 00 | 50 | b0 | 6f | 8f | df | 3f | 14 | f4 | a4 | 44 | 9b | 7b | 2b | cb |
| | 2 | b0 | 00 | 3f | 8f | 44 | f4 | cb | 7b | e0 | 50 | 6f | df | 14 | a4 | 9b | 2b |
| | 3 | 50 | 50 | 6f | 3f | 2b | 7b | 14 | 44 | f4 | a4 | cb | 9b | 8f | df | b0 | e0 |

TABLE 4-2-continued

ECC converting code table of R1

MULTIPLICATION COEFFICIENT OF GALOIS FIELD

|   | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 4 | 8f | 00 | 7b | f4 | df | 50 | 2b | a4 | b0 | 3f | 44 | cb | e0 | 6f | 14 | 9b |
| 5 | 6f | 00 | 2b | 44 | b0 | df | f4 | 9b | a4 | cb | e0 | 8f | 7b | 14 | 3f | 50 |
| 6 | 3f | 00 | 44 | 7b | 9b | a4 | e0 | df | 50 | 6f | 2b | 14 | f4 | cb | 8f | b0 |
| 7 | df | 00 | 14 | cb | f4 | 2b | 3f | e0 | 44 | 9b | 8f | 50 | 6f | b0 | a4 | 7b |
| 8 | f4 | 00 | a4 | 50 | cb | 3f | 9b | 6f | 8f | 7b | df | 2b | b0 | 44 | e0 | 14 |
| 9 | 14 | 00 | f4 | e0 | a4 | b0 | 44 | 50 | 9b | 8f | 7b | 6f | 2b | 3f | cb | df |
| a | 44 | 00 | 9b | df | 8f | cb | 50 | 11 | 6f | 2b | b0 | f4 | a4 | e0 | 7b | 3f |
| b | a4 | 00 | cb | 6f | e0 | 44 | 8f | 2b | 7b | df | 14 | b0 | 3f | 9b | 50 | f4 |
| c | 7b | 00 | df | a4 | 14 | 6f | b0 | cb | 3f | 44 | 9b | e0 | 50 | 2b | f4 | 8f |
| d | 9b | 00 | 8f | 14 | 7b | e0 | 6f | f4 | 2b | b0 | 3f | a4 | cb | 50 | df | 44 |
| e | cb | 00 | e0 | 2b | 50 | 9b | 7b | b0 | df | 14 | f4 | 3f | 44 | 8f | 6f | a4 |
| f | 2b | 00 | b0 | 9b | 3f | 14 | a4 | 8f | cb | e0 | 50 | 7b | df | f4 | 44 | 6f |

TABLE 4-3

ECC converting code table of R2

MULTIPLICATION COEFFICIENT OF GALOIS FIELD

|   |   | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| INPUT DATA | 0 | 00 | 00 | 00 | 00 | 00 | 00 | 00 | 00 | 00 | 00 | 00 | 00 | 00 | 00 | 00 | 00 |
|  | 1 | 1f | 00 | ed | f2 | 11 | 0e | e3 | fc | 14 | 0b | e6 | f9 | 1a | 05 | e8 | f7 |
|  | 2 | f2 | 00 | fc | 0e | f9 | 0b | f7 | 05 | 1f | ed | 11 | e3 | 14 | e6 | 1a | e8 |
|  | 3 | ed | 00 | 11 | fc | e8 | 05 | 14 | f9 | 0b | e6 | f7 | 1a | 0e | e3 | f2 | 1f |
|  | 4 | 0e | 00 | 05 | 0b | e3 | ed | e8 | e6 | f2 | fc | f9 | f7 | 1f | 11 | 14 | 1a |
|  | 5 | 11 | 00 | e8 | f9 | f2 | e3 | 0b | 1a | e6 | f7 | 1f | 0e | 05 | 14 | fc | ed |
|  | 6 | fc | 00 | f9 | 05 | 1a | e6 | 1f | e3 | ed | 11 | e8 | 14 | 0b | f7 | 0e | f2 |
|  | 7 | e3 | 00 | 14 | f7 | 0b | e8 | fc | 1f | f9 | 1a | 0e | ed | 11 | f2 | e6 | 05 |
|  | 8 | 0b | 00 | e6 | ed | f7 | fc | 1a | 11 | 0e | 05 | e3 | e8 | f2 | f9 | 1f | 14 |
|  | 9 | 14 | 00 | 0b | 1f | e6 | f2 | f9 | ed | 1a | 0e | 05 | 11 | e8 | fc | f7 | e3 |
|  | a | f9 | 00 | 1a | e3 | 0e | f7 | ed | 14 | 11 | e8 | f2 | 0b | e6 | 1f | 05 | fc |
|  | b | e6 | 00 | f7 | 11 | 1f | f9 | 0e | e8 | 05 | e3 | 14 | f2 | fc | 1a | ed | 0b |
|  | c | 05 | 00 | e3 | e6 | 14 | 11 | f2 | f7 | fc | f9 | 1a | 1f | ed | e8 | 0b | 0e |
|  | d | 1a | 00 | 0e | 14 | 05 | 1f | 11 | 0b | e8 | f2 | fc | e6 | f7 | ed | e3 | f9 |
|  | e | f7 | 00 | 1f | e8 | ed | 1a | 05 | f2 | e3 | 14 | 0b | fc | f9 | 0e | 11 | e6 |
|  | f | e8 | 00 | f2 | 1a | fc | 14 | e6 | 0e | f7 | 1f | ed | 05 | e3 | 0b | f9 | 11 |

TABLE 4-4

ECC converting code table of R3

MULTIPLICATION COEFFICIENT OF GALOIS FIELD

|   |   | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| INPUT DATA | 0 | 00 | 00 | 00 | 00 | 00 | 00 | 00 | 00 | 00 | 00 | 00 | 00 | 00 | 00 | 00 | 00 |
|  | 1 | 16 | 00 | 30 | 26 | 50 | 46 | 76 | 60 | 0 | 86 | b6 | a0 | d6 | c0 | f0 | e6 |
|  | 2 | 26 | 00 | 60 | 46 | a0 | 86 | e6 | c0 | 16 | 30 | 50 | 76 | 90 | b6 | d6 | f0 |
|  | 3 | 30 | 00 | 50 | 60 | f0 | c0 | 90 | a0 | 6 | b6 | e6 | d6 | 46 | 76 | 26 | 16 |
|  | 4 | 46 | 00 | c0 | 86 | 76 | 30 | f0 | b6 | 26 | 60 | a0 | e6 | 16 | 50 | 90 | d6 |
|  | 5 | 50 | 00 | f0 | a0 | 26 | 76 | 86 | d6 | b6 | e6 | 16 | 46 | c0 | 90 | 60 | 30 |
|  | 6 | 60 | 00 | a0 | c0 | d6 | b6 | 16 | 76 | 30 | 50 | f0 | 90 | 86 | e6 | 46 | 26 |
|  | 7 | 76 | 00 | 90 | e6 | 86 | f0 | 60 | 16 | a0 | d6 | 46 | 30 | 50 | 26 | b6 | c0 |
|  | 8 | 86 | 00 | b6 | 30 | e6 | 60 | d6 | 50 | 46 | c0 | 76 | f0 | 26 | a0 | 16 | 90 |
|  | 9 | 90 | 00 | 86 | 16 | b6 | 26 | a0 | 30 | d6 | 46 | c0 | 50 | f0 | 60 | e6 | 76 |
|  | a | a0 | 00 | d6 | 76 | 46 | e6 | 30 | 0 | 50 | f0 | 26 | 86 | b6 | 16 | c0 | 60 |
|  | b | b6 | 00 | e6 | 50 | 16 | a0 | 46 | f0 | c0 | 76 | 90 | 26 | 60 | d6 | 30 | 86 |
|  | c | c0 | 00 | 76 | b6 | 90 | 50 | 26 | e6 | 60 | a0 | d6 | 16 | 30 | f0 | 86 | 46 |
|  | d | d6 | 00 | 46 | 90 | c0 | 16 | 50 | 86 | f0 | 26 | 60 | b6 | e6 | 30 | 76 | a0 |
|  | e | e6 | 00 | 16 | f0 | 30 | d6 | c0 | 26 | 76 | 90 | 86 | 60 | a0 | 46 | 50 | b6 |
|  | f | f0 | 00 | 26 | d6 | 60 | 90 | b6 | 46 | e6 | 16 | 30 | c0 | 76 | 86 | a0 | 50 |

TABLE 4-5

ECC converting code table of R4

MULTIPLICATION COEFFICIENT OF GALOIS FIELD

|  |  | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| INPUT DATA | 0 | 00 | 00 | 00 | 00 | 00 | 00 | 00 | 00 | 00 | 00 | 00 | 00 | 00 | 00 | 00 | 00 |
|  | 1 | 31 | 00 | 03 | 32 | 05 | 34 | 37 | 06 | 09 | 38 | 3b | 0a | 3d | 0c | 0f | 3e |
|  | 2 | 32 | 00 | 06 | 34 | 0a | 38 | 3f | 0c | 31 | 03 | 05 | 37 | 09 | 3b | 3d | 0f |
|  | 3 | 03 | 00 | 05 | 06 | 0f | 0c | 09 | 0a | 38 | 3b | 3e | 3d | 34 | 37 | 32 | 31 |
|  | 4 | 34 | 00 | 0c | 38 | 37 | 03 | 0f | 3b | 32 | 06 | 0a | 3e | 31 | 05 | 09 | 3d |
|  | 5 | 05 | 00 | 0f | 0a | 32 | 37 | 38 | 3d | 3b | 3e | 31 | 34 | 0c | 09 | 06 | 03 |
|  | 6 | 06 | 00 | 0a | 0c | 3d | 3b | 31 | 37 | 03 | 05 | 0f | 09 | 38 | 3e | 34 | 32 |
|  | 7 | 37 | 00 | 09 | 3e | 38 | 0f | 06 | 31 | 0a | 3d | 34 | 03 | 05 | 32 | 3b | 0c |
|  | 8 | 38 | 00 | 3b | 03 | 3e | 06 | 3d | 05 | 34 | 0c | 37 | 0f | 32 | 0a | 31 | 09 |
|  | 9 | 09 | 00 | 38 | 31 | 3b | 32 | 0a | 03 | 3d | 34 | 0c | 05 | 0f | 06 | 3e | 37 |
|  | a | 0a | 00 | 3d | 37 | 34 | 3e | 03 | 09 | 05 | 0f | 32 | 38 | 3b | 31 | 0c | 06 |
|  | b | 3b | 00 | 3e | 05 | 31 | 0a | 34 | 0f | 0c | 37 | 09 | 32 | 06 | 3d | 03 | 38 |
|  | c | 0c | 00 | 37 | 3b | 09 | 05 | 32 | 3e | 06 | 0a | 3d | 31 | 03 | 0f | 38 | 34 |
|  | d | 3d | 00 | 34 | 09 | 0c | 31 | 05 | 38 | 0f | 32 | 06 | 3b | 3e | 03 | 37 | 0a |
|  | e | 3e | 00 | 31 | 0f | 03 | 3d | 0c | 32 | 37 | 09 | 38 | 06 | 0a | 34 | 05 | 3b |
|  | f | 0f | 00 | 32 | 3d | 06 | 09 | 3b | 34 | 3e | 31 | 03 | 0c | 37 | 38 | 0a | 05 |

TABLE 4-6

ECC converting code table of R5

MULTIPLICATION COEFFICIENT OF GALOIS FIELD

|  |  | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| INPUT DATA | 0 | 00 | 00 | 00 | 00 | 00 | 00 | 00 | 00 | 00 | 00 | 00 | 00 | 00 | 00 | 00 | 00 |
|  | 1 | a1 | 00 | 03 | a2 | 05 | a4 | a7 | 06 | 09 | a8 | ab | 0a | ad | 0c | 0f | ae |
|  | 2 | a2 | 00 | 06 | a4 | 0a | a8 | ae | 0c | a1 | 03 | 05 | a7 | 09 | ab | ad | 0f |
|  | 3 | 03 | 00 | 05 | 06 | 0f | 0c | 09 | 0a | a8 | ab | a | ad | a4 | a7 | a2 | a1 |
|  | 4 | a4 | 00 | 0c | a8 | a7 | 03 | 0f | ab | a2 | 06 | 0a | ae | a1 | 05 | 09 | ad |
|  | 5 | 05 | 00 | 0f | 0a | a2 | a7 | a8 | ad | ab | ae | a1 | a4 | 0c | 09 | 06 | 03 |
|  | 6 | 06 | 00 | 0a | 0c | ad | ab | a1 | a7 | 03 | 05 | 0f | 09 | a8 | ae | a4 | a2 |
|  | 7 | a7 | 00 | 09 | ae | a8 | 0f | 06 | a1 | 0a | ad | a4 | 03 | 05 | a2 | ab | 0c |
|  | 8 | a8 | 00 | ab | 03 | ae | 06 | ad | 05 | a4 | 0c | a7 | 0f | a2 | 0a | a1 | 09 |
|  | 9 | 09 | 00 | a8 | a1 | ab | a2 | 0a | 03 | ad | a4 | 0c | 05 | 0f | 06 | ae | a7 |
|  | a | 0a | 00 | ad | a7 | a4 | ae | 03 | 09 | 05 | 0f | a2 | a8 | ab | a1 | 0c | 06 |
|  | b | ab | 00 | ae | 05 | a1 | 0a | a4 | 0f | 0c | a7 | 09 | a2 | 06 | ad | 03 | a8 |
|  | c | 0c | 00 | a7 | ab | 09 | 05 | a2 | ae | 06 | 0a | ad | a1 | 03 | 0f | a8 | a4 |
|  | d | ad | 00 | a4 | 09 | 0c | a1 | 05 | a8 | 0f | a2 | 06 | ab | ae | 03 | a7 | 0a |
|  | e | ae | 00 | a1 | 0f | 03 | ad | 0c | a2 | a7 | 09 | a8 | 06 | 0a | a4 | 05 | ab |
|  | f | 0f | 00 | a2 | ad | 06 | 09 | ab | a4 | ae | a1 | 03 | 0c | a7 | a8 | 0a | 05 |

TABLE 4-7

ECC converting code table of R6

MULTIPLICATION COEFFICIENT OF GALOIS FIELD

|  |  | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| INPUT DATA | 0 | 00 | 00 | 00 | 00 | 00 | 00 | 00 | 00 | 00 | 00 | 00 | 00 | 00 | 00 | 00 | 00 |
|  | 1 | 91 | 00 | 03 | 92 | 05 | 94 | 97 | 06 | 09 | 98 | 9b | 0a | 9d | 0c | 0f | 9e |
|  | 2 | 92 | 00 | 06 | 94 | 0a | 98 | 9e | 0c | 91 | 03 | 05 | 97 | 09 | 9b | 9d | 0f |
|  | 3 | 03 | 00 | 05 | 06 | 0f | 0c | 09 | 0a | 98 | 9b | 9e | 9d | 94 | 97 | 92 | 91 |
|  | 4 | 94 | 00 | 0c | 98 | 97 | 03 | 0f | 9b | 92 | 06 | 0a | 9e | 91 | 05 | 09 | 9d |
|  | 5 | 05 | 00 | 0f | 0a | 92 | 97 | 98 | 9d | 9b | 9e | 91 | 94 | 0c | 09 | 06 | 03 |
|  | 6 | 06 | 00 | 0a | 0c | 9d | 9b | 91 | 97 | 03 | 05 | 0f | 09 | 98 | 9e | 94 | 92 |
|  | 7 | 97 | 00 | 09 | 9e | 98 | 0f | 06 | 91 | 0a | 9d | 94 | 03 | 05 | 92 | 9b | 0e |
|  | 8 | 98 | 00 | 9b | 03 | 9e | 06 | 9d | 05 | 94 | 0c | 97 | 0f | 92 | 0a | 91 | 09 |
|  | 9 | 09 | 00 | 98 | 91 | 9b | 92 | 0a | 03 | 9d | 94 | 0c | 05 | 0f | 06 | 9e | 97 |
|  | a | 0a | 00 | 9d | 97 | 94 | 9e | 03 | 09 | 05 | 0f | 92 | 98 | 9b | 91 | 0c | 06 |
|  | b | 9b | 00 | 9e | 05 | 91 | 0a | 94 | 0f | 0c | 97 | 09 | 92 | 06 | 9d | 03 | 98 |
|  | c | 0c | 00 | 97 | 9b | 09 | 05 | 92 | 9e | 06 | 0a | 9d | 91 | 03 | 0f | 98 | 94 |
|  | d | 9d | 00 | 94 | 09 | 0c | 91 | 05 | 98 | 0f | 92 | 06 | 9b | 9e | 03 | 97 | 0a |
|  | e | 9e | 00 | 91 | 0f | 03 | 9d | 0c | 92 | 97 | 09 | 98 | 06 | 0a | 94 | 05 | 9b |
|  | f | 0f | 00 | 92 | 9d | 06 | 09 | 9b | 94 | 9e | 91 | 03 | 0c | 97 | 98 | 0a | 05 |

TABLE 4-8

ECC converting code table of R7

MULTIPLICATION COEFFICIENT OF GALOIS FIELD

|  |  | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| INPUT DATA | 0 | 00 | 00 | 00 | 00 | 00 | 00 | 00 | 00 | 00 | 00 | 00 | 00 | 00 | 00 | 00 | 00 |
|  | 1 | 51 | 00 | 03 | 2 | 05 | 54 | 57 | 06 | 09 | 58 | 5b | 0a | 5d | 0c | 0f | 5e |
|  | 2 | 52 | 00 | 06 | 54 | 0a | 58 | 5e | 0c | 51 | 03 | 05 | 57 | 09 | 5b | 5d | 0f |
|  | 3 | 03 | 00 | 05 | 06 | 0f | 0c | 09 | 0a | 58 | 5b | 5e | 5d | 54 | 57 | 52 | 51 |
|  | 4 | 54 | 00 | 0c | 58 | 57 | 03 | 0f | 5b | 52 | 06 | 0a | 5e | 51 | 05 | 09 | 5d |
|  | 5 | 05 | 00 | 0f | 0a | 52 | 57 | 58 | 5d | 5b | 5e | 51 | 54 | 0c | 09 | 06 | 03 |
|  | 6 | 06 | 00 | 0a | 0c | 5d | 5b | 51 | 57 | 03 | 05 | 0f | 09 | 58 | 5e | 54 | 52 |
|  | 7 | 57 | 00 | 09 | 5e | 58 | 0f | 06 | 51 | 0a | 5d | 54 | 03 | 05 | 52 | 5b | 0c |
|  | 8 | 58 | 00 | 5b | 03 | 5e | 06 | 5d | 05 | 54 | 0c | 57 | 0f | 52 | 0a | 51 | 09 |
|  | 9 | 09 | 00 | 58 | 51 | 5b | 52 | 0a | 03 | 5d | 54 | 0c | 05 | 0f | 06 | 5e | 57 |
|  | a | 0a | 00 | 5d | 57 | 54 | 5e | 03 | 09 | 05 | 0f | 52 | 58 | 5b | 51 | 0c | 06 |
|  | b | 5b | 00 | 5e | 05 | 51 | 0a | 54 | 0f | 0c | 57 | 09 | 52 | 06 | 5d | 03 | 58 |
|  | c | 0c | 00 | 57 | 5b | 09 | 05 | 52 | 5e | 06 | 0a | 5d | 51 | 03 | 0f | 58 | 54 |
|  | d | 5d | 00 | 54 | 09 | 0c | 21 | 05 | 58 | 0f | 52 | 06 | 5b | 5e | 03 | 57 | 0a |
|  | e | 5e | 00 | 51 | 0f | 03 | 5d | 0c | 52 | 57 | 09 | 58 | 06 | 0a | 54 | 05 | 5b |
|  | f | 0f | 00 | 52 | 5d | 06 | 09 | 5b | 54 | 5e | 51 | 03 | 0c | 57 | 58 | 0a | 05 |

TABLE 4-9

ECC converting code table of R8

MULTIPLICATION COEFFICIENT OF GALOIS FIELD

|  |  | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| INPUT DATA | 0 | 00 | 00 | 00 | 00 | 00 | 00 | 00 | 00 | 00 | 00 | 00 | 00 | 00 | 00 | 00 | 00 |
|  | 1 | 1a | 00 | 30 | 2a | 50 | 4a | 7a | 60 | 90 | 8a | ba | a0 | da | c0 | f0 | ea |
|  | 2 | 2a | 00 | 30 | 4a | a0 | 8a | ea | c0 | 1a | 30 | 50 | 7a | 90 | ba | da | f0 |
|  | 3 | 30 | 00 | 50 | 60 | f0 | c0 | 90 | a0 | 8a | ba | ea | da | 4a | 7a | 2a | 1a |
|  | 4 | 4a | 00 | c0 | 8a | 7a | 30 | f0 | ba | 2a | 60 | a0 | ea | 1a | 50 | 90 | da |
|  | 5 | 50 | 00 | f0 | a0 | 2a | 7a | 8a | da | ba | ea | 1a | 4a | c0 | 90 | 60 | 30 |
|  | 6 | 60 | 00 | a0 | c0 | da | ba | 1a | 7a | 30 | 50 | f0 | 90 | 8a | ea | 4a | 2a |
|  | 7 | 7a | 00 | 90 | ea | 8a | f0 | 60 | 1a | a0 | da | 4a | 30 | 50 | 2a | ba | c0 |
|  | 8 | 8a | 00 | ba | 30 | ea | 60 | da | 50 | 4a | c0 | 7a | f0 | 2a | a0 | 1a | 90 |
|  | 9 | 90 | 00 | 8a | 1a | ba | 2a | a0 | 30 | da | 4a | c0 | 50 | f0 | 60 | ea | 7a |
|  | a | a0 | 00 | da | 7a | 4a | ea | 30 | 90 | 50 | f0 | 2a | 8a | ba | 1a | c0 | 60 |
|  | b | ba | 00 | ea | 50 | 1a | a0 | 4a | f0 | c0 | 7a | 90 | 2a | 60 | da | 30 | 8a |
|  | c | c0 | 00 | 7a | ba | 90 | 50 | 2a | ea | 60 | a0 | da | 1a | 30 | f0 | 8a | 4a |
|  | d | da | 00 | 4a | 90 | c0 | 1a | 50 | 8a | f0 | 2a | 60 | ba | ea | 30 | 7a | a0 |
|  | e | ea | 00 | 1a | f0 | 30 | da | c0 | 2a | 7a | 90 | 8a | 60 | a0 | 4a | 50 | ba |
|  | f | f0 | 00 | 2a | da | 60 | 90 | ba | 4a | ea | 1a | 30 | c0 | 7a | 8a | a0 | 50 |

TABLE 4-10

ECC converting code table of R9

MULTIPLICATION COEFFICIENT OF GALOIS FIELD

|  |  | 0 | 1 | 2 | 3 | 4 | 5 | 6 | 7 | 8 | 9 | a | b | c | d | e | f |
|---|---|---|---|---|---|---|---|---|---|---|---|---|---|---|---|---|---|
| INPUT DATA | 0 | 00 | 00 | 00 | 00 | 00 | 00 | 00 | 00 | 00 | 00 | 00 | 00 | 00 | 00 | 00 | 00 |
|  | 1 | 19 | 00 | 30 | 29 | 50 | 49 | 79 | 60 | 90 | 89 | b9 | a0 | d9 | c0 | f0 | e9 |
|  | 2 | 29 | 00 | 60 | 49 | a0 | 89 | e9 | c0 | 19 | 30 | 50 | 79 | 90 | b9 | d9 | f0 |
|  | 3 | 30 | 00 | 50 | 60 | f0 | c0 | 90 | a0 | 89 | b9 | e9 | d9 | 49 | 79 | 29 | 19 |
|  | 4 | 49 | 00 | c0 | 89 | 79 | 30 | f0 | b9 | 29 | 60 | a0 | e9 | 19 | 50 | 90 | d9 |
|  | 5 | 50 | 00 | f0 | a0 | 29 | 79 | 89 | d9 | b9 | e9 | 19 | 49 | c0 | 90 | 60 | 30 |
|  | 6 | 60 | 00 | a0 | c0 | d9 | b9 | 19 | 79 | 30 | 50 | f0 | 90 | 89 | e9 | 49 | 29 |
|  | 7 | 79 | 00 | 90 | e9 | 89 | f0 | 60 | 19 | a0 | d9 | 49 | 30 | 50 | 29 | b9 | c0 |
|  | 8 | 89 | 00 | b9 | 30 | e9 | 60 | d9 | 50 | 49 | c0 | 79 | f0 | 29 | a0 | 19 | 90 |
|  | 9 | 90 | 00 | 89 | 19 | b9 | 29 | a0 | 30 | d9 | 49 | c0 | 50 | f0 | 60 | e9 | 79 |
|  | a | a0 | 00 | d9 | 79 | 49 | e9 | 30 | 90 | 50 | f0 | 29 | 89 | b9 | 19 | c0 | 60 |
|  | b | b9 | 00 | e9 | 50 | 19 | a0 | 49 | f0 | c0 | 79 | 90 | 29 | 60 | d9 | 30 | 89 |
|  | c | c0 | 00 | 79 | b9 | 90 | 50 | 29 | e9 | 60 | a0 | d9 | 19 | 30 | f0 | 89 | 49 |
|  | d | d9 | 00 | 49 | 90 | c0 | 19 | 50 | 89 | f0 | 29 | 60 | b9 | e9 | 30 | 79 | a0 |
|  | e | e9 | 00 | 19 | f0 | 30 | d9 | c0 | 29 | 79 | 90 | 89 | 60 | a0 | 49 | 50 | b9 |
|  | f | f0 | 00 | 29 | d9 | 60 | 90 | b9 | 49 | e9 | 19 | 30 | c0 | 79 | 89 | a0 | 50 |

TABLE 4-11

ECC converting code table of R10

|  |  | MULTIPLICATION COEFFICIENT OF GALOIS FIELD | | | | | | | | | | | | | | | |
|---|---|---|---|---|---|---|---|---|---|---|---|---|---|---|---|---|
|  |  | 0 | 1 | 2 | 3 | 4 | 5 | 6 | 7 | 8 | 9 | a | b | c | d | e | f |
| INPUT DATA | 0 | 00 | 00 | 00 | 00 | 00 | 00 | 00 | 00 | 00 | 00 | 00 | 00 | 00 | 00 | 00 | 00 |
|  | 1 | 15 | 00 | 30 | 25 | 50 | 45 | 75 | 60 | 90 | 85 | b5 | a0 | d5 | c0 | f0 | e5 |
|  | 2 | 25 | 00 | 60 | 45 | a0 | 85 | e5 | c0 | 15 | 30 | 50 | 75 | 90 | b5 | d5 | f0 |
|  | 3 | 30 | 00 | 50 | 60 | f0 | c0 | 90 | a0 | 85 | b5 | e5 | d5 | 45 | 75 | 25 | 15 |
|  | 4 | 45 | 00 | c0 | 85 | 75 | 30 | f0 | b5 | 25 | 60 | a0 | e5 | 15 | 50 | 90 | d5 |
|  | 5 | 50 | 00 | f0 | a0 | 25 | 75 | 85 | d5 | b5 | e5 | 15 | 45 | c0 | 90 | 60 | 30 |
|  | 6 | 60 | 00 | a0 | c0 | d5 | b5 | 15 | 75 | 30 | 50 | f0 | 90 | 85 | e5 | 45 | 25 |
|  | 7 | 75 | 00 | 90 | e5 | 85 | f0 | 60 | 15 | a0 | d5 | 45 | 30 | 50 | 25 | b5 | c0 |
|  | 8 | 85 | 00 | b5 | 30 | e5 | 60 | d5 | 50 | 45 | c0 | 75 | f0 | 25 | a0 | 15 | 90 |
|  | 9 | 90 | 00 | 85 | 15 | b5 | 25 | a0 | 30 | d5 | 45 | c0 | 50 | f0 | 60 | e5 | 75 |
|  | a | a0 | 00 | d5 | 75 | 45 | e5 | 30 | 90 | 50 | f0 | 25 | 85 | b5 | 15 | c0 | 60 |
|  | b | b5 | 00 | e5 | 50 | 15 | a0 | 45 | f0 | c0 | 75 | 90 | 25 | 60 | d5 | 30 | 85 |
|  | c | c0 | 00 | 75 | b5 | 90 | 50 | 25 | e5 | 60 | a0 | d5 | 15 | 30 | f0 | 85 | 45 |
|  | d | d5 | 00 | 45 | 90 | c0 | 15 | 50 | 85 | f0 | 25 | 60 | b5 | e5 | 30 | 75 | a0 |
|  | e | e5 | 00 | 15 | f0 | 30 | d5 | c0 | 25 | 75 | 90 | 85 | 60 | a0 | 45 | 50 | b5 |
|  | f | f0 | 00 | 25 | d5 | 60 | 90 | b5 | 45 | e5 | 15 | 30 | c0 | 75 | 85 | a0 | 50 |

TABLE 4-12

ECC converting code table of R11

|  |  | MULTIPLICATION COEFFICIENT OF GALOIS FIELD | | | | | | | | | | | | | | | |
|---|---|---|---|---|---|---|---|---|---|---|---|---|---|---|---|---|
|  |  | 0 | 1 | 2 | 3 | 4 | 5 | 6 | 7 | 8 | 9 | a | b | c | d | e | f |
| INPUT DATA | 0 | 00 | 00 | 00 | 00 | 00 | 00 | 00 | 00 | 00 | 00 | 00 | 00 | 00 | 00 | 00 | 00 |
|  | 1 | 1c | 00 | 30 | 2c | 50 | 4c | 7c | 60 | 90 | 8c | bc | a0 | dc | c0 | f0 | ec |
|  | 2 | 2c | 00 | 60 | 4c | a0 | 8c | ec | c0 | 1c | 30 | 50 | 7c | 90 | bc | dc | f0 |
|  | 3 | 30 | 00 | 50 | 60 | f0 | c0 | 90 | a0 | 8c | bc | ec | dc | 4c | 7c | 2c | 1c |
|  | 4 | 4c | 00 | c0 | 8c | 7c | 30 | f0 | bc | 2c | 60 | a0 | ec | 1c | 50 | 90 | dc |
|  | 5 | 50 | 00 | f0 | a0 | 2c | 7c | 8c | dc | bc | ec | 1c | 4c | c0 | 90 | 60 | 30 |
|  | 6 | 60 | 00 | a0 | c0 | dc | bc | 1c | 7c | 30 | 50 | f0 | 90 | 8c | ec | 4c | 2c |
|  | 7 | 7c | 00 | 90 | ec | 8c | f0 | 60 | 1c | a0 | dc | 4c | 30 | 50 | 2c | bc | c0 |
|  | 8 | 8c | 00 | bc | 30 | ec | 60 | dc | 50 | 4c | c0 | 7c | f0 | 2c | a0 | 1c | 90 |
|  | 9 | 90 | 00 | 8c | 1c | bc | 2c | a0 | 30 | dc | 4c | c0 | 50 | f0 | 60 | ec | 7c |
|  | a | a0 | 00 | dc | 7c | 4c | ec | 30 | 90 | 50 | f0 | 2c | 8c | bc | 1c | c0 | 60 |
|  | b | bc | 00 | ec | 50 | 1c | a0 | 4c | f0 | c0 | 7c | 90 | 2c | 60 | dc | 30 | 8c |
|  | c | c0 | 00 | 7c | bc | 90 | 50 | 2c | ec | 60 | a0 | dc | 1c | 30 | f0 | 8c | 4c |
|  | d | dc | 00 | 4c | 90 | c0 | 1c | 50 | 8c | f0 | 2c | 60 | bc | ec | 30 | 7c | a0 |
|  | e | ec | 00 | 1c | f0 | 30 | dc | c0 | 2c | 7c | 90 | 8c | 60 | a0 | 4c | 50 | bc |
|  | f | f0 | 00 | 2c | dc | 60 | 90 | bc | 4c | ec | 1c | 30 | c0 | 7c | 8c | a0 | 50 |

TABLE 4-13

ECC converting code table of R12

|  |  | MULTIPLICATION COEFFICIENT OF GALOIS FIELD | | | | | | | | | | | | | | | |
|---|---|---|---|---|---|---|---|---|---|---|---|---|---|---|---|---|
|  |  | 0 | 1 | 2 | 3 | 4 | 5 | 6 | 7 | 8 | 9 | a | b | c | d | e | f |
| INPUT DATA | 0 | 00 | 00 | 00 | 00 | 00 | 00 | 00 | 00 | 00 | 00 | 00 | 00 | 00 | 00 | 00 | 00 |
|  | 1 | 61 | 00 | 03 | 62 | 05 | 64 | 67 | 06 | 09 | 68 | 6b | 0a | 6d | 0c | 0f | 6e |
|  | 2 | 62 | 00 | 06 | 64 | 0a | 68 | 6e | 0c | 61 | 03 | 05 | 67 | 09 | 6b | 6d | 0f |
|  | 3 | 03 | 00 | 05 | 06 | 0f | 0c | 09 | 0a | 68 | 6b | 6e | 6d | 64 | 67 | 62 | 61 |
|  | 4 | 64 | 00 | 0c | 68 | 67 | 03 | 0f | 6b | 62 | 06 | 0a | 6e | 61 | 05 | 09 | 6d |
|  | 5 | 05 | 00 | 0f | 0a | 62 | 67 | 68 | 6d | 6b | 6e | 61 | 64 | 0c | 09 | 06 | 03 |
|  | 6 | 06 | 00 | 0a | 0c | 6d | 6b | 61 | 67 | 03 | 05 | 0f | 09 | 68 | 6e | 64 | 62 |
|  | 7 | 67 | 00 | 09 | 6e | 68 | 0f | 06 | 61 | 0a | 6d | 64 | 03 | 05 | 62 | 6b | 0c |
|  | 8 | 68 | 00 | 6b | 03 | 6e | 06 | 6d | 05 | 64 | 0c | 67 | 0f | 62 | 0a | 61 | 09 |
|  | 9 | 09 | 00 | 68 | 61 | 6b | 62 | 0a | 03 | 6d | 64 | 0c | 05 | 0f | 06 | 6e | 67 |
|  | a | 0a | 00 | 6d | 67 | 64 | 6e | 03 | 09 | 05 | 0f | 62 | 68 | 6b | 61 | 0c | 06 |
|  | b | 6b | 00 | 6e | 05 | 61 | 0a | 64 | 0f | 0c | 67 | 09 | 62 | 06 | 6d | 03 | 68 |
|  | c | 0c | 00 | 67 | 6b | 09 | 05 | 62 | 6e | 06 | 0a | 6d | 61 | 03 | 0f | 68 | 64 |
|  | d | 6d | 00 | 64 | 09 | 0c | 61 | 05 | 68 | 0f | 62 | 06 | 6b | 6e | 03 | 67 | 0a |
|  | e | 6e | 00 | 61 | 0f | 03 | 6d | 0c | 62 | 67 | 09 | 68 | 06 | 0a | 64 | 05 | 6b |
|  | f | 0f | 00 | 62 | 6d | 06 | 09 | 6b | 64 | 6e | 61 | 03 | 0c | 67 | 68 | 0a | 05 |

TABLE 4-14

ECC converting code table of R13

|  |  | MULTIPLICATION COEFFICIENT OF GALOIS FIELD | | | | | | | | | | | | | | |
|---|---|---|---|---|---|---|---|---|---|---|---|---|---|---|---|---|
|  |  | 0 | 1 | 2 | 3 | 4 | 5 | 6 | 7 | 8 | 9 | a | b | c | d | e | f |
| INPUT DATA | 0 | 00 | 00 | 00 | 00 | 00 | 00 | 00 | 00 | 00 | 00 | 00 | 00 | 00 | 00 | 00 | 00 |
|  | 1 | 70 | 00 | a0 | d0 | 3f | 4f | ef | 9f | 88 | f8 | 58 | 28 | c7 | b7 | 17 | 67 |
|  | 2 | d0 | 00 | 9f | 4f | 28 | f8 | 67 | b7 | 70 | a0 | 3f | ef | 88 | 58 | c7 | 17 |
|  | 3 | a0 | 00 | 3f | 9f | 17 | b7 | 88 | 28 | f8 | 58 | 67 | c7 | 4f | ef | d0 | 70 |
|  | 4 | 4f | 00 | b7 | f8 | ef | a0 | 17 | 58 | d0 | 9f | 28 | 67 | 70 | 3f | 88 | c7 |
|  | 5 | 3f | 00 | 17 | 28 | d0 | ef | f8 | c7 | 58 | 67 | 70 | 4f | b7 | 88 | 9f | a0 |
|  | 6 | 9f | 00 | 28 | b7 | c7 | 58 | 70 | ef | a0 | 3f | 17 | 88 | f8 | 67 | 4f | d0 |
|  | 7 | Ef | 00 | 88 | 67 | f8 | 17 | 9f | 70 | 28 | c7 | 4f | a0 | 3f | d0 | 58 | b7 |
|  | 8 | f8 | 00 | 58 | a0 | 67 | 9f | c7 | 3f | 4f | b7 | ef | 17 | d0 | 28 | 70 | 88 |
|  | 9 | 88 | 0 | f8 | 70 | 58 | d0 | 28 | a0 | c7 | 4f | b7 | 3f | 17 | 9f | 67 | ef |
|  | a | 28 | 00 | c7 | ef | 4f | 67 | a0 | 88 | 3f | 17 | d0 | f8 | 58 | 70 | b7 | 9f |
|  | b | 58 | 00 | 67 | 3f | 70 | 28 | 4f | 17 | b7 | ef | 88 | d0 | 9f | c7 | a0 | f8 |
|  | c | b7 | 00 | ef | 58 | 88 | 3f | d0 | 67 | 9f | 28 | c7 | 70 | a0 | 17 | f8 | 4f |
|  | d | c7 | 00 | 4f | 88 | b7 | 70 | 3f | f8 | 17 | d0 | 9f | 58 | 67 | a0 | ef | 28 |
|  | e | 67 | 00 | 70 | 17 | a0 | c7 | b7 | d0 | ef | 88 | f8 | 9f | 28 | 4f | 3f | 58 |
|  | f | 17 | 00 | d0 | c7 | 9f | 88 | 58 | 4f | 67 | 70 | a0 | b7 | ef | f8 | 28 | 3f |

TABLE 4-15

ECC converting code table of R14

|  |  | MULTIPLICATION COEFFICIENT OF GALOIS FIELD | | | | | | | | | | | | | | |
|---|---|---|---|---|---|---|---|---|---|---|---|---|---|---|---|---|
|  |  | 0 | 1 | 2 | 3 | 4 | 5 | 6 | 7 | 8 | 9 | a | b | c | d | e | f |
| INPUT DATA | 0 | 00 | 00 | 00 | 00 | 00 | 00 | 00 | 00 | 00 | 00 | 00 | 00 | 00 | 00 | 00 | 00 |
|  | 1 | 2f | 00 | de | f1 | 28 | 07 | d9 | f6 | 22 | 0d | d3 | fc | 25 | 0a | d4 | fb |
|  | 2 | f1 | 00 | f6 | 07 | fc | 0d | fb | 0a | 2f | de | 28 | d9 | 22 | d3 | 25 | d4 |
|  | 3 | de | 00 | 28 | f6 | d4 | 0a | 22 | fc | 0d | d3 | fb | 25 | 07 | d9 | f1 | 2f |
|  | 4 | 07 | 00 | 0a | 0d | d9 | de | d4 | f3 | f1 | f6 | fc | fb | 2f | 28 | 22 | 25 |
|  | 5 | 28 | 00 | d4 | fc | f1 | d9 | 0d | 25 | d3 | fb | 2f | 07 | 0a | 22 | f6 | de |
|  | 6 | f6 | 00 | fc | 0a | 25 | d3 | 2f | d9 | de | 28 | d4 | 22 | 0d | fb | 07 | f1 |
|  | 7 | d9 | 00 | 22 | fb | 0d | d4 | f6 | 2f | fc | 25 | 07 | de | 28 | f1 | d3 | 0a |
|  | 8 | 0d | 00 | d3 | de | fb | f6 | 25 | 28 | 07 | 0a | d9 | d4 | f1 | fc | 2f | 22 |
|  | 9 | 22 | 00 | 0d | 2f | d3 | f1 | fc | de | 25 | 07 | 0a | 28 | d4 | f6 | fb | d9 |
|  | a | fc | 00 | 25 | d9 | 07 | fb | de | 22 | 28 | d4 | f1 | 0d | d3 | 2f | 0a | f6 |
|  | b | d3 | 00 | fb | 28 | 2f | fc | 07 | d4 | 0a | d9 | 22 | f1 | f6 | 25 | df | 0d |
|  | c | 0a | 00 | d9 | d3 | 22 | 28 | f1 | fb | f6 | fc | 25 | 2f | de | d4 | 0d | 07 |
|  | d | 25 | 00 | 07 | 22 | 0a | 2f | 28 | 0d | d4 | f1 | f6 | d3 | fb | de | d9 | fc |
|  | e | fb | 00 | 2f | d4 | de | 25 | 0a | f1 | d9 | 22 | 0d | f6 | fc | 07 | 28 | d3 |
|  | f | d4 | 00 | f1 | 25 | f6 | 22 | d3 | 07 | fb | 2f | de | 0a | d9 | 0d | fc | 28 |

TABLE 4-16

ECC converting code table of R15

|  |  | MULTIPLICATION COEFFICIENT OF GALOIS FIELD | | | | | | | | | | | | | | |
|---|---|---|---|---|---|---|---|---|---|---|---|---|---|---|---|---|
|  |  | 0 | 1 | 2 | 3 | 4 | 5 | 6 | 7 | 8 | 9 | a | b | c | d | e | f |
| INPUT DATA | 0 | 00 | 00 | 00 | 00 | 00 | 00 | 00 | 00 | 00 | 00 | 00 | 00 | 00 | 00 | 00 | 00 |
|  | 1 | 13 | 00 | 30 | 23 | 50 | 43 | 73 | 60 | 90 | 83 | b3 | a0 | d3 | c0 | f0 | e3 |
|  | 2 | 23 | 00 | 60 | 43 | a0 | 83 | e3 | c0 | 13 | 30 | 50 | 73 | 90 | b3 | d3 | f0 |
|  | 3 | 30 | 00 | 50 | 60 | f0 | c0 | 90 | a0 | 83 | b3 | e3 | d3 | 43 | 73 | 23 | 13 |
|  | 4 | 43 | 00 | c0 | 83 | 73 | 30 | f0 | b3 | 23 | 60 | a0 | e3 | 13 | 50 | 90 | d3 |
|  | 5 | 50 | 00 | f0 | a0 | 23 | 73 | 83 | d3 | b3 | e3 | 13 | 43 | c0 | 90 | 60 | 30 |
|  | 6 | 60 | 00 | a0 | c0 | d3 | b3 | 13 | 73 | 30 | 50 | f0 | 90 | 83 | e3 | 43 | 23 |
|  | 7 | 73 | 00 | 90 | e3 | 83 | f0 | 60 | 13 | a0 | d3 | 43 | 30 | 50 | 23 | b3 | c0 |
|  | 8 | 83 | 00 | b3 | 30 | e3 | 60 | d3 | 50 | 43 | e0 | 73 | f0 | 23 | ad | 13 | 90 |
|  | 9 | 90 | 00 | 83 | 13 | b3 | 23 | a0 | 30 | d3 | 43 | c0 | 50 | f0 | 60 | e3 | 73 |
|  | a | a0 | 00 | d3 | 73 | 43 | e3 | 30 | 90 | 50 | f0 | 23 | 83 | b3 | 13 | c0 | 60 |
|  | b | b3 | 00 | e3 | 50 | 13 | a0 | 43 | f0 | c0 | 73 | 90 | 23 | 60 | d3 | 30 | 83 |
|  | c | c0 | 00 | 73 | b3 | 90 | 50 | 23 | e3 | 60 | a0 | d3 | 13 | 30 | f0 | 83 | 43 |
|  | d | d3 | 00 | 43 | 90 | c0 | 13 | 50 | 83 | f0 | 23 | 60 | b3 | e3 | 30 | 73 | a0 |
|  | e | e3 | 00 | 13 | f0 | 30 | d3 | c0 | 23 | 73 | 90 | 83 | 60 | a0 | 43 | 50 | b3 |
|  | f | f0 | 00 | 23 | d3 | 60 | 90 | b3 | 43 | e3 | 13 | 30 | c0 | 73 | 83 | a0 | 50 |

According to this embodiment 3, there is an effect in which a hardware failure can be reliably found by a parity error in the conversion of data and its ECC different from those of the embodiments 1 and 2. The reasons for this are as follows. Namely, the Galois field multiplying table 1-11 is indexed in the longitudinal direction by the longitudinal index table making circuit 1-9 and is indexed in the transversal direction by the transversal index table making circuit 1-10. The ECC converting table 11-22 is indexed by the ECC index table making circuit 11-23. The upper order data conversion is performed by the upper order data converting circuit 1-5 by using the index result of the longitudinal direction. The lower order data conversion is performed by the lower order data converting circuit 1-6 by using the index result of the transversal direction. The ECC conversion is performed by the ECC converting circuit 11-7. Further, an ECC error is checked by the ECC check circuit 11-15.

While the present invention has thus far been disclosed in conjunction with several embodiments thereof, it will be readily possible for those skilled in the art to put the present invention into practice in various other manners.

What is claimed is:

1. A disk array device, comprising:
a redundant array of independent disks controller configured to convert data by using a Galois field multiplying table symmetrical longitudinally and transversally and made by a multiplying calculation of the Galois field of $GF(2^4)$, and index table information of the transversal direction and index table information of the longitudinal direction are extracted from said Galois field multiplying table, and a failure of a circuit within the device is detected by comparing both the index table information,
wherein two kinds of index table information for data for making the multiplying calculation and index table information for a check code annexed to these data are generated as said index table information.

2. The disk array device according to claim 1, wherein the failure of the circuit is detected by arithmetically performing an XOR logic operation of a bit unit of said index table information, and detecting that it is a value except for zero.

3. The disk array device according to claim 1, wherein the data for making the multiplying calculation of the Galois field are decomposed into plural data, and processing is performed by dividing these data into decomposing data for performing the conversion by using said index table information of the longitudinal direction, and decomposing data for performing the conversion by using said index table information of the transversal direction.

4. The disk array device according to claim 1, wherein the check code annexed to the data for making the multiplying calculation of the Galois field is decomposed into plural check codes, and processing is performed by dividing these check codes into a decomposing check code for performing the conversion by using said index table information of the longitudinal direction, and a decomposing check code for performing the conversion by using said index table information of the transversal direction.

5. The disk array device according to claim 4, wherein the decomposing check code with respect to the decomposing data is converted by using the index table information of the longitudinal direction when these decomposing data are converted by using the index table information of the transversal direction, and the decomposing check code with respect to the decomposing data is converted by using the index table information of the transversal direction when these decomposing data are converted by using the index table information of the longitudinal direction, so that the decomposing data and the decomposing check code as a pair are converted by using the index table information different from each other.

6. The disk array device according to claim 1, wherein said index table information of the longitudinal direction is a longitudinal conversion table for data, and said index table information of the transversal direction is a transversal conversion table for data.

7. The disk array device according to claim 1, wherein said index table information of the longitudinal direction is a longitudinal conversion table for data and a longitudinal inverting table far a check code, and said index table information of the transversal direction is a transversal conversion table for data and a transversal inverting table for a check code.

8. The disk array device according to claim 1, wherein said check code is parity with respect to said data.

9. The disk array device according to claim 1, wherein said check code is error correcting code with respect to said data.

10. A Galois field multiplying circuit, comprising:
a Galois field multiplying table;
a longitudinal index table making circuit for generating the index table information of the longitudinal direction by indexing the Galois field multiplying table from the longitudinal direction by using a multiplication coefficient;
a transversal index table making circuit for generating the index table information of the transversal direction by indexing the Galois field multiplying table from the transversal direction by using the multiplication coefficient;
an upper order data converting circuit and a lower order data converting circuit for dividing data from the generated index table information into an upper order data portion and a lower order data portion and converting these data into data for redundant array of independent disks; and
an upper order parity inverting circuit and a lower order parity inverting circuit for dividing parity with respect to the data from the generated index table information into an upper order parity portion and a lower order parity portion and converting this parity into parity with respect to the data for redundant array of independent disks.

11. A Galois field multiplying circuit, comprising:
a Galois field multiplying table;
a longitudinal index table making circuit for generating the index table information of the longitudinal direction by indexing the Galois field multiplying table from the longitudinal direction by using a multiplication coefficient;
a transversal index table making circuit for generating the index table information of the transversal direct by indexing the Galois field multiplying table from the transversal direction by using the multiplication coefficient;
an even data converting circuit and an odd data converting circuit for dividing data from the generated index table information into an even data position and an odd data position and converting these data into data for redundant array of independent disks; and an even parity inverting circuit and an odd parity inverting circuit for dividing parity with respect to the data from the generated index table information into an even parity position and an odd parity position and converting this parity into parity with respect to the data for redundant array of independent disks.

12. A Galois field multiplying circuit, comprising:
a Galois field multiplying table;
a longitudinal index table making circuit for generating the index table information of the longitudinal direction by indexing the Galois field multiplying table from the longitudinal direction by using a multiplication coefficient;

a transversal index table making circuit for generating the index table information of the transversal direction by indexing the Galois field multiplying table from the transversal direction by using the multiplication coefficient; an upper order data converting circuit and a lower order data converting circuit for dividing data from the generated index table information into an upper order data portion and a lower order data portion and converting these data into data for redundant array of independent disks; and an error correcting code converting circuit for converting error correcting code with respect to the data into error correcting code with respect to the data for redundant array of independent disks.

13. A Galois field multiplying circuit comprising:

a Galois field multiplying table having a conversion table for data and a conversion table for parity;

a longitudinal index table making circuit for generating a longitudinal inverting table for parity and a longitudinal converting table for data by indexing said Galois field multiplying table from the longitudinal direction by using a multiplication coefficient;

a transversal index table making circuit for generating a transversal converting table for data and a transversal inverting table for parity by indexing said Galois field multiplying table from the transversal direction by using the multiplication coefficient;

an upper order data converting circuit for selecting the longitudinal converting table for data generated by said longitudinal index table making circuit by each decomposing data of an upper order data portion of data, and obtaining a multiplying result of the Galois field;

a lower order data converting circuit for selecting the transversal converting table for data generated by said transversal index table making circuit by each decomposing data of a lower order data portion of data, and obtaining a multiplying result of the Galois field;

an upper order parity inverting circuit for obtaining an inverting result of an upper order parity portion in which an XOR logic operation is performed with respect to each decomposing parity of the upper order parity portion of the parity and the multiplying result of the Galois field obtained by selecting the transversal inverting table for parity generated by said transversal index table making circuit by each decomposing data of the upper order data portion of the data; and a lower order parity inverting circuit for obtaining an inverting result of the lower order parity in which the XOR logic operation is performed with respect to each decomposing parity of the lower order parity portion of the parity and the multiplying result of the Galois field obtained by selecting the longitudinal inverting table for parity generated by said longitudinal index table making circuit by each decomposing data of the upper order data portion of the data.

14. A Galois field multiplying circuit comprising:

a Galois field multiplying table having a conversion table for data and a conversion table for parity;

a longitudinal index table making circuit for generating a longitudinal inverting table for parity and a longitudinal converting table for data by indexing said Galois field multiplying table from the longitudinal direction by using a multiplication coefficient;

a transversal index table making circuit for generating a transversal converting table for data and a transversal inverting table for parity by indexing said Galois field multiplying table from the transversal direction by using the multiplication coefficient;

an even data converting circuit for selecting the longitudinal converting table for data generated by said longitudinal index table making circuit by each decomposing data of an even data position of data, and obtaining a multiplying result of the Galois field;

an odd data converting circuit for selecting the transversal converting table for data generated by said transversal index table making circuit by each decomposing data of an odd data position of data, and obtaining a multiplying result of the Galois field;

an even parity inverting circuit for obtaining an inverting result of the even parity in which an XOR logic operation is performed with respect to each decomposing parity of the upper order parity portion of the parity and the multiplying result of the Galois field obtained by selecting the transversal inverting table for parity generated by said transversal index table making circuit by each decomposing data of the even data position of the data; and an odd parity inverting circuit for obtaining an inverting result of the odd parity in which the XOR logic operation is performed with respect to each decomposing parity of the lower order parity portion of the parity and the multiplying result of the Galois field obtained by selecting the longitudinal inverting table for parity generated by said longitudinal index table making circuit by each decomposing data of the odd data position of the data.

15. A Galois field multiplying circuit, comprising:

a Galois field multiplying table having a conversion table for data and a conversion table for parity;

an error correcting code converting table corresponding to each decomposing data of the data;

a longitudinal index table making circuit for generating a longitudinal inverting table for parity and a longitudinal converting table for data by indexing said Galois field multiplying table from the longitudinal direction by using a multiplication coefficient;

a transversal index table making circuit for generating a transversal converting table for data and a transversal inverting table for parity by indexing said Galois field multiplying table from the transversal direction by using the multiplication coefficient;

an error correcting code index table making circuit for generating a conversion table for error correcting code by indexing said error correcting code converting table by using the multiplication coefficient;

an upper order data converting circuit for selecting the longitudinal converting table for data generated by said longitudinal index table making circuit by each decomposing data of an upper order data portion of data, and obtaining a multiplying result of the Galois field;

a lower order data converting circuit for selecting the transversal converting table for data generated by said transversal index table making circuit by each decomposing data of a lower order data portion of data, and obtaining a multiplying result of the Galois field; and an error correcting code converting circuit for selecting the error correcting code converting table generated by said error correcting code index table making circuit by each decomposing data of the data, and converting the error correcting code with respect to the data into error correcting code with respect to data for redundant array of independent disks.

* * * * *